US011536897B1

(12) United States Patent
Thompson et al.

(10) Patent No.: US 11,536,897 B1
(45) Date of Patent: Dec. 27, 2022

(54) MULTI-CHIP PHOTONIC QUANTUM COMPUTER ASSEMBLY WITH OPTICAL BACKPLANE INTERPOSER

(71) Applicant: PsiQuantum, Corp., Palo Alto, CA (US)

(72) Inventors: Mark G. Thompson, San Jose, CA (US); Gabriel Mendoza, San Francisco, CA (US)

(73) Assignee: PsiQuantum, Corp., Palo Alto, CA (US)

( * ) Notice: Subject to any disclaimer, the term of this patent is extended or adjusted under 35 U.S.C. 154(b) by 0 days.

(21) Appl. No.: 17/248,652

(22) Filed: Feb. 1, 2021

Related U.S. Application Data

(60) Provisional application No. 62/968,124, filed on Jan. 30, 2020.

(51) Int. Cl.
| G02B 6/12 | (2006.01) |
| G02B 6/13 | (2006.01) |
| G02B 6/124 | (2006.01) |

(52) U.S. Cl.
CPC ......... *G02B 6/12004* (2013.01); *G02B 6/124* (2013.01); *G02B 6/13* (2013.01); *G02B 2006/12107* (2013.01)

(58) Field of Classification Search
CPC .................................................. G02B 6/12004
See application file for complete search history.

(56) References Cited

U.S. PATENT DOCUMENTS

| 6,477,286 B1* | 11/2002 | Ouchi ...................... G02B 6/10 257/433 |
| 2020/0301244 A1* | 9/2020 | Wang ........................ H03K 3/42 |
| 2021/0202562 A1* | 7/2021 | Chang ................... H01L 23/367 |

* cited by examiner

*Primary Examiner* — Charlie Y Peng
(74) *Attorney, Agent, or Firm* — Weaver Austin Villeneuve & Sampson LLP

(57) ABSTRACT

A system includes a plurality of wafer-scale modules and a plurality of optical fibers. Each wafer-scale module includes an optical backplane and one or more die stacks on the optical backplane. The optical backplane includes a substrate and at least one optical waveguide layer configured to transport and/or manipulate photonic quantum systems (e.g., photons, qubits, qudits, large entangled states, etc.). Each die stack of the one or more die stacks includes a photonic integrated circuit (PIC) die optically coupled to the at least one optical waveguide layer of the optical backplane. The plurality of optical fibers is coupled to the optical backplanes of the plurality of wafer-scale modules to provide inter-module and/or intra-module interconnects for the photonic quantum systems.

20 Claims, 42 Drawing Sheets

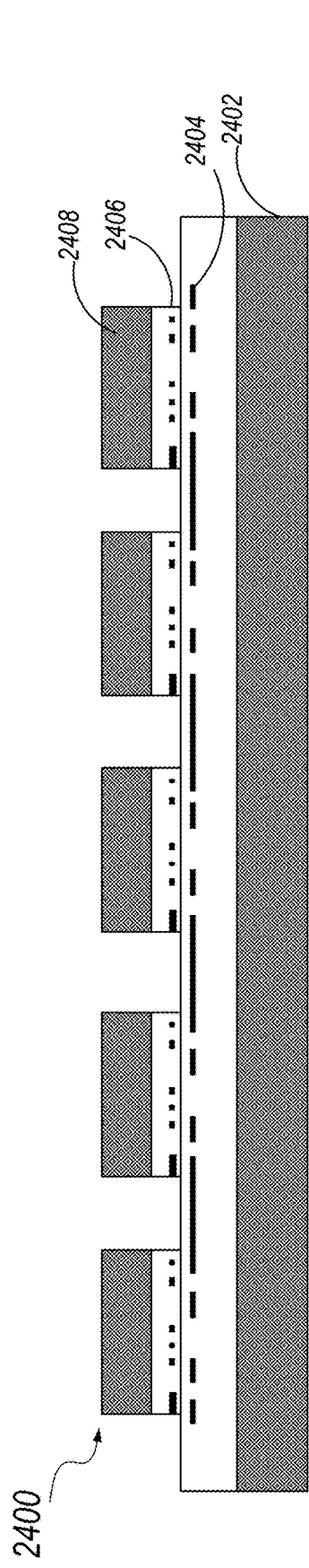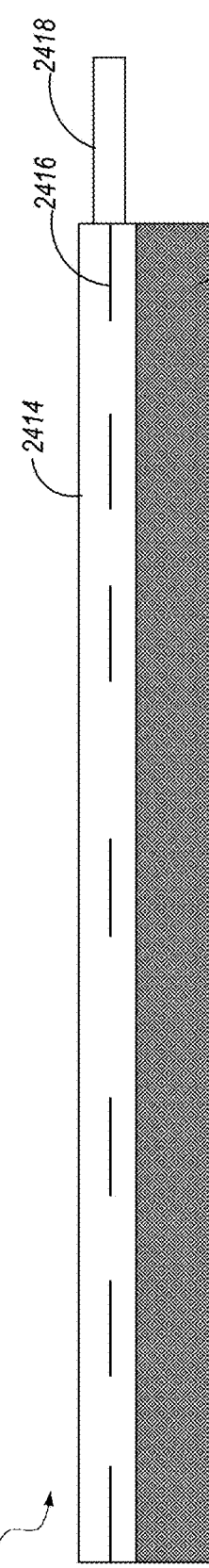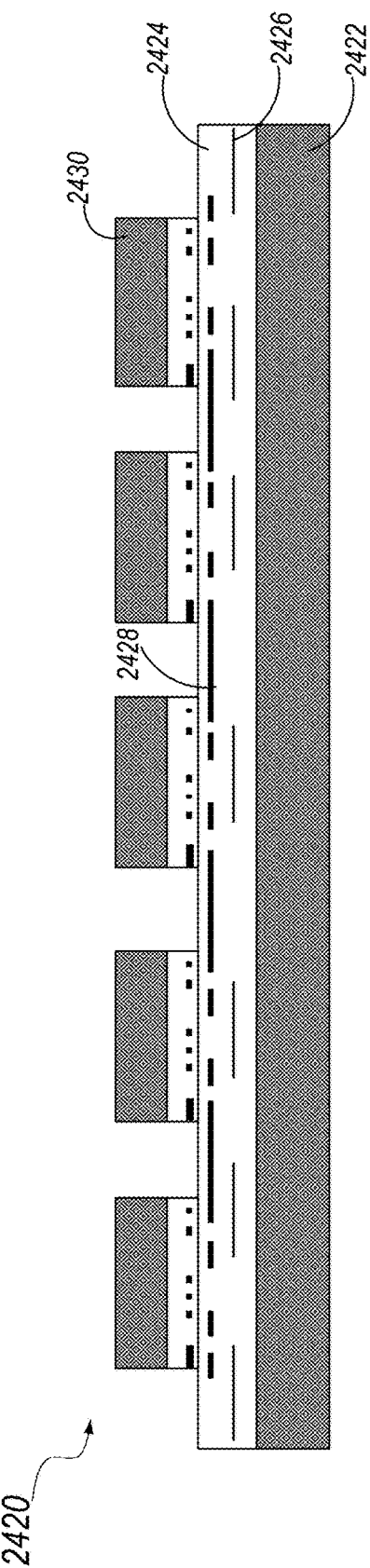

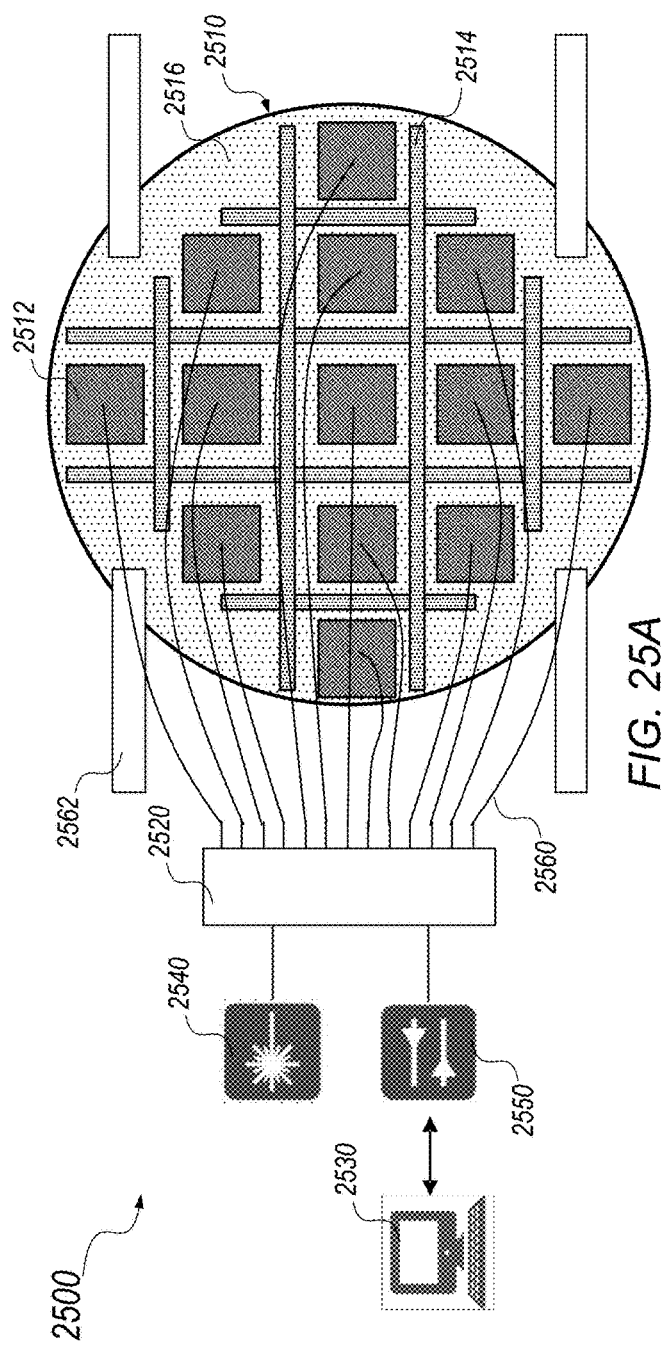
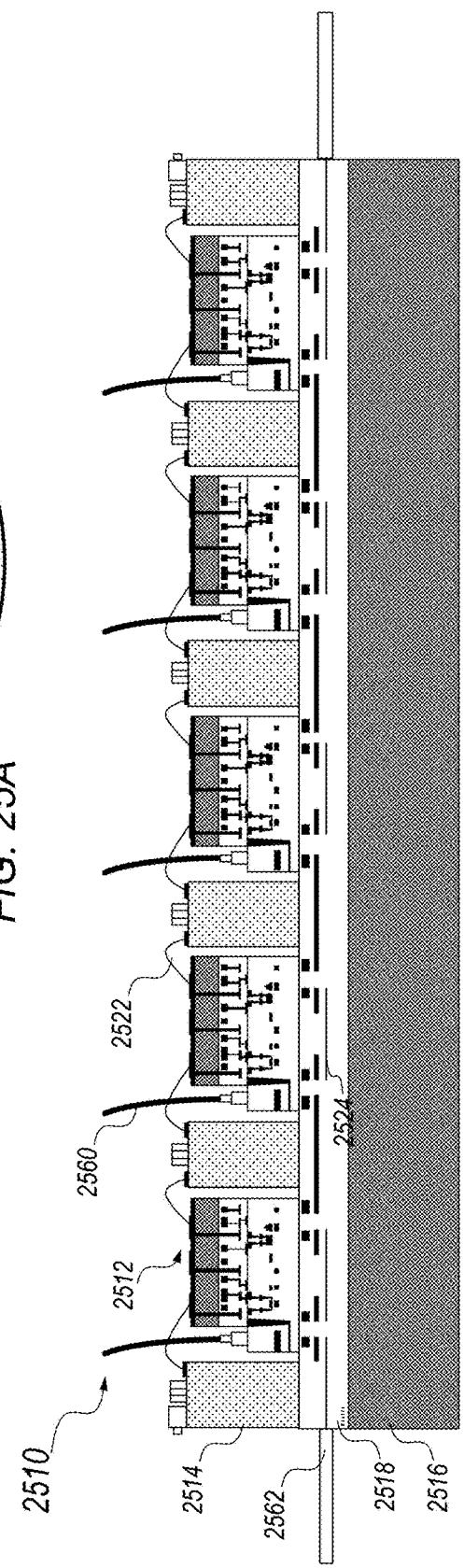
FIG. 25A
FIG. 25B

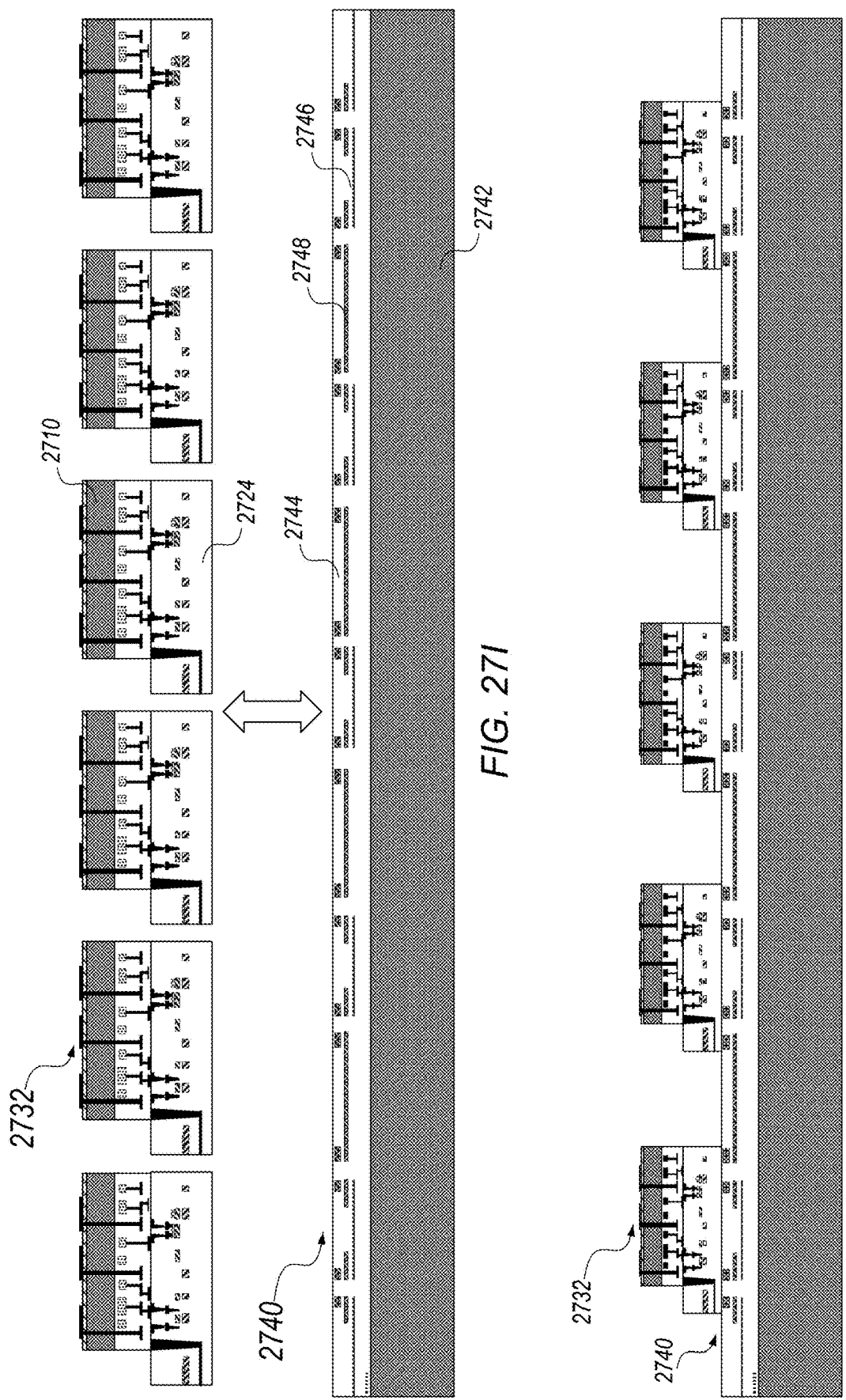

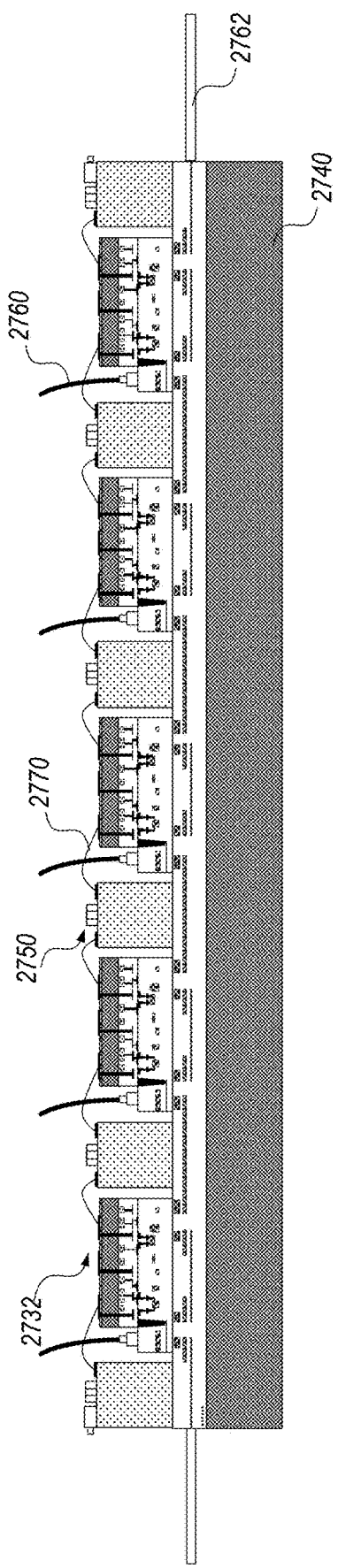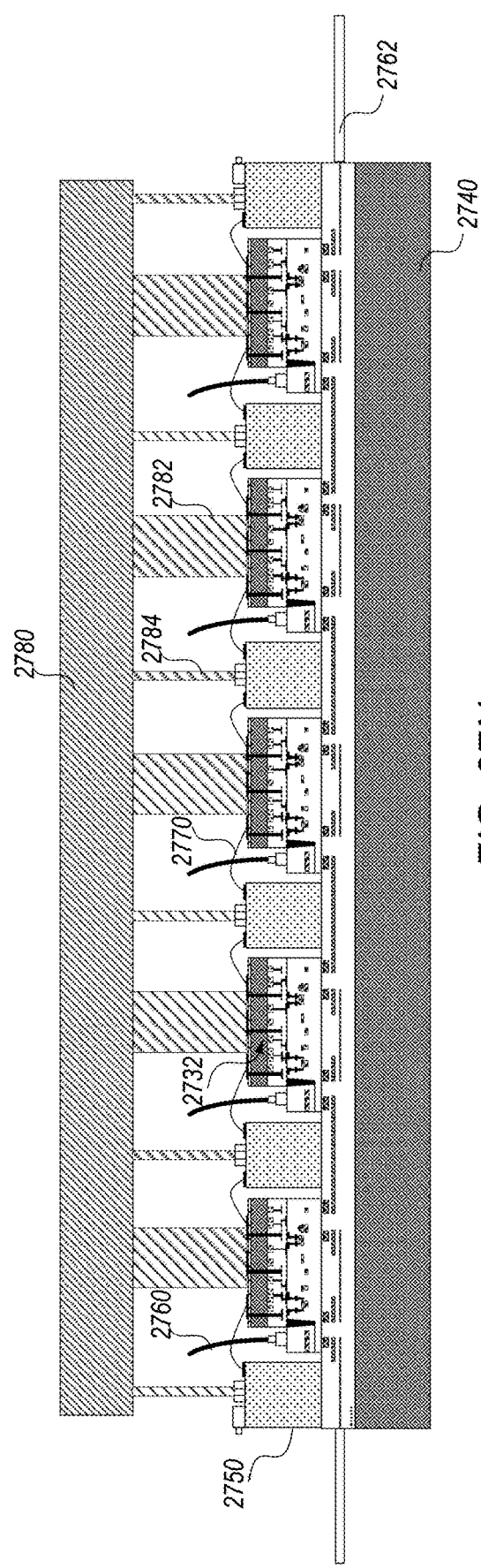
FIG. 27M
FIG. 27N

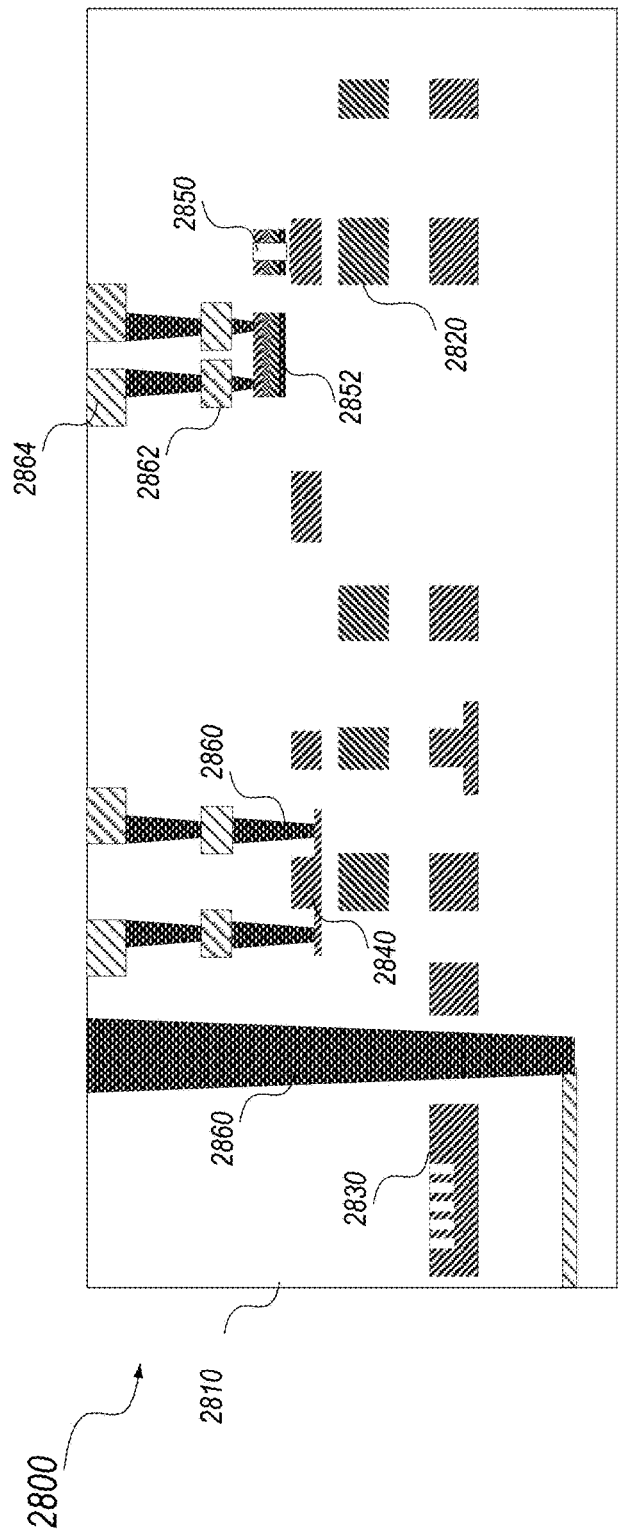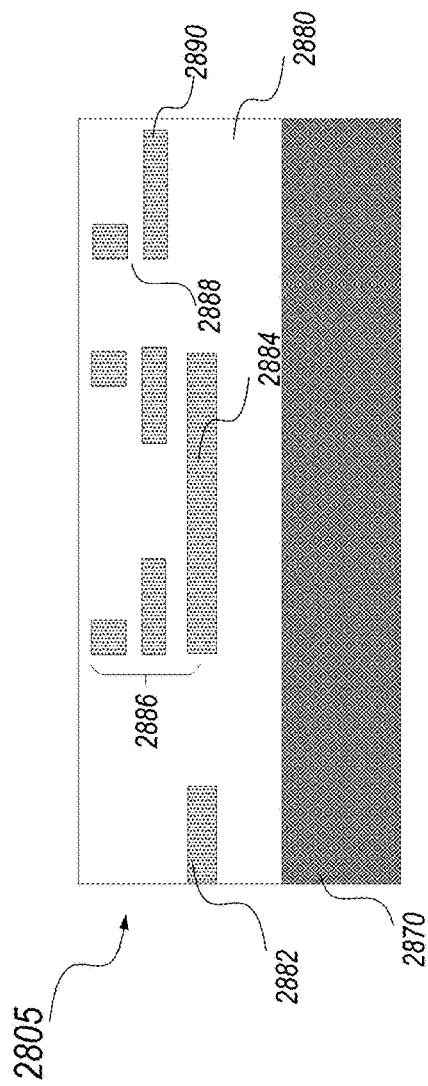
FIG. 28A
FIG. 28B

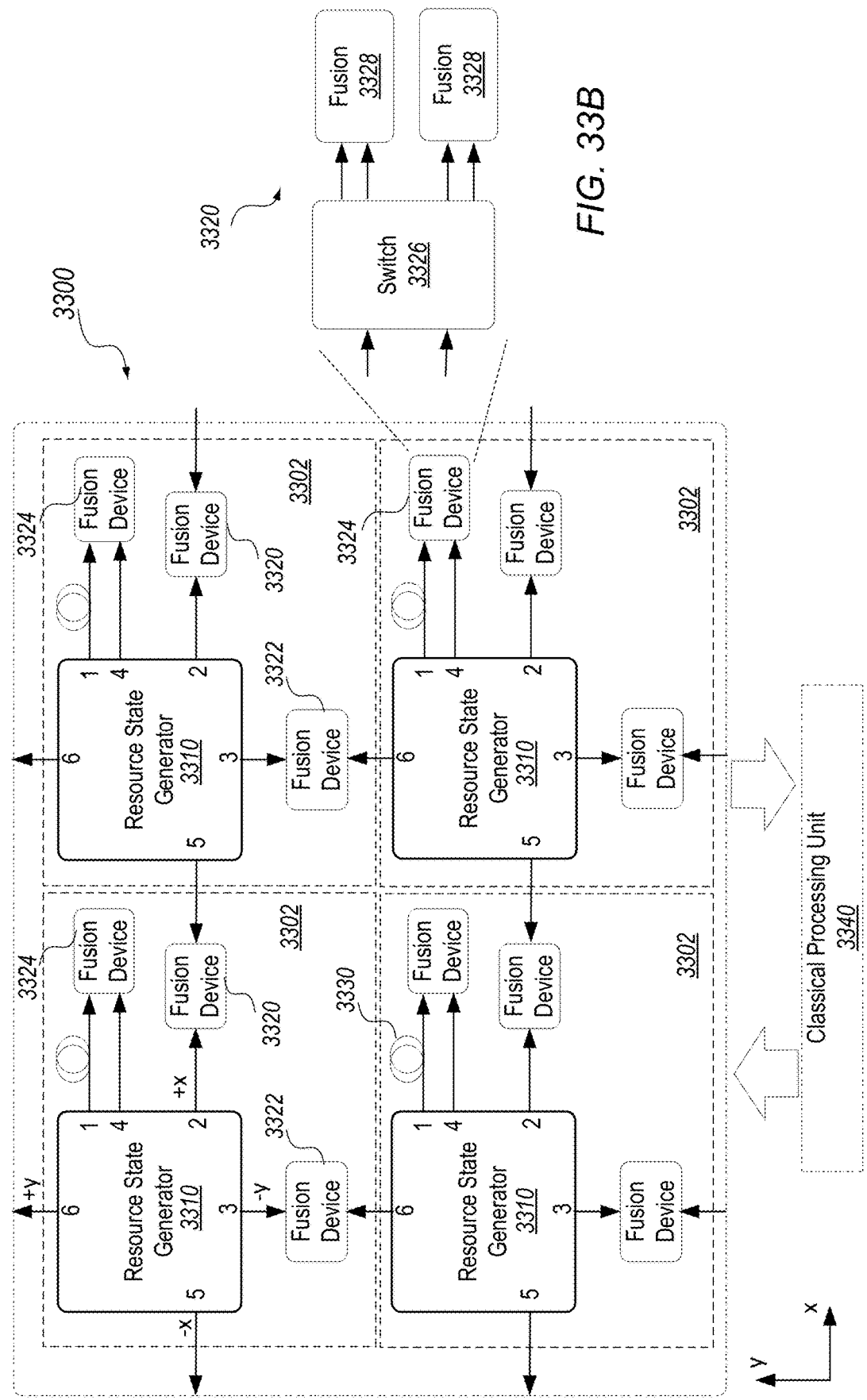

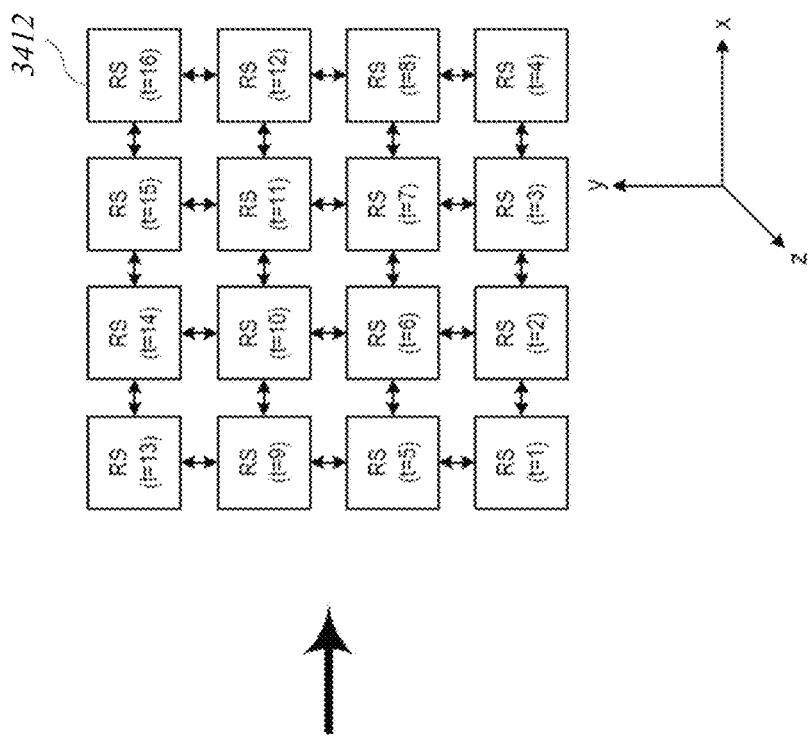
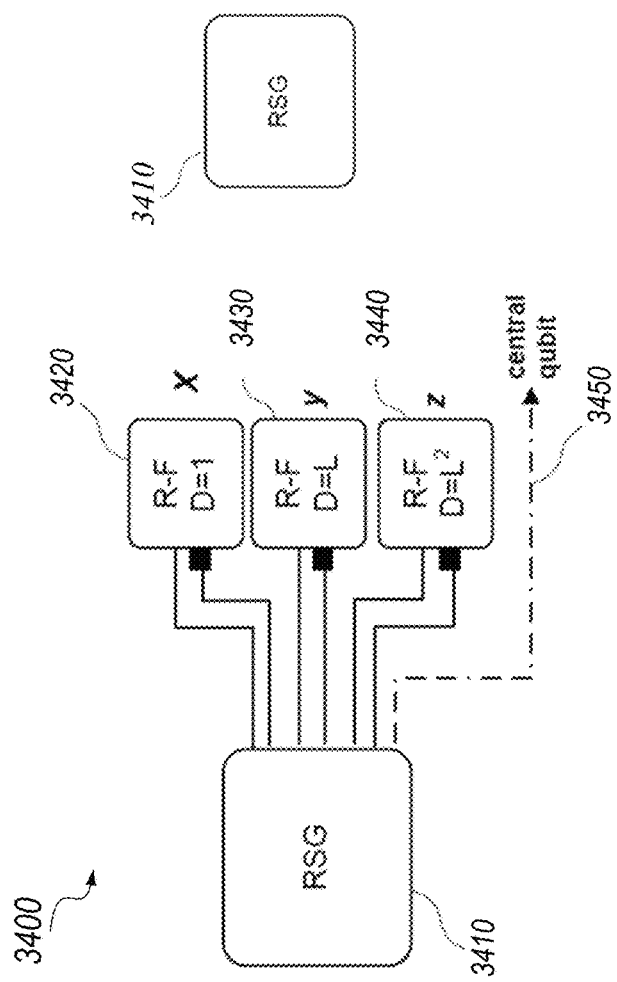
FIG. 34B
FIG. 34A

MULTI-CHIP PHOTONIC QUANTUM COMPUTER ASSEMBLY WITH OPTICAL BACKPLANE INTERPOSER

CROSS-REFERENCES TO RELATED APPLICATIONS

This patent application claims benefit of and priority to U.S. Provisional Patent Application Ser. No. 62/968,124, filed Jan. 30, 2020, entitled "MULTI-CHIP PHOTONIC QUANTUM COMPUTER ASSEMBLY WITH OPTICAL BACKPLANE INTERPOSER," which is assigned to the assignee hereof and is hereby incorporated by reference in its entirety for all purposes.

BACKGROUND

Photonic integrated circuits, such as silicon photonic integrated circuits, can be used in many systems, such as quantum communication systems and optical quantum computing systems. These quantum mechanics-based systems are distinguished from "classical" systems by their reliance on quantum states, such as quantum bits (qubits). To achieve the desired functions and performance, a quantum mechanics-based system may integrate many passive and active photonic devices, modules, and subsystems into the same system. For example, an optical quantum computer may need to integrate passive and active photonic integrated circuits and other optical and electrical components, such as optical fibers or other low-loss optical interconnects, control circuits, and classical processing units, into a same system to reliably generate, manipulate (e.g., entangle), and detect hundreds, thousands, or even millions of qubits for computing and error corrections, while achieving the desired functions and performance.

SUMMARY

Techniques disclosed herein relate generally to generating, manipulating, and detecting quantum states in systems such as optical quantum computers or quantum communication systems. Various inventive embodiments are described herein, including methods, processes, systems, devices, circuits, packages, modules, units, wafers, dies, networks, cells, and the like.

According to certain embodiments, a quantum photonic device may include an optical backplane that includes at least one optical waveguide layer, and a plurality of die stacks on the optical backplane. Each die stack of the plurality of die stacks may include a photonic integrated circuit (PIC) die and an electronic integrated circuit (EIC) die bonded to the PIC die. The PIC die may include a photonic integrated circuit optically coupled to the at least one optical waveguide layer of the optical backplane. The EIC die may include an electronic integrated circuit for controlling operations of the photonic integrated circuit of the PIC die. The at least one optical waveguide layer may include waveguides optically coupled to at least two die stacks of the plurality of die stacks. The waveguides may be configured to transport, between the at least two die stacks of the plurality of die stacks, a photonic quantum system that includes a photon in one of two or more quantum modes.

The two or more quantum modes may include, for example, two or more different frequencies, two or more different positions (e.g., a waveguide or superposition of waveguides a photon is propagating within), two or more different directions of propagation, two or more different polarization states, two or more different time windows, two or more different orbital angular momentums, or the like. In some embodiments, the photonic quantum system may include, for example, a single photon, a qubit, a qudit, an entangled state of qubits, or a logical qubit. In some embodiments, the photonic integrated circuit may include a single photon source configured to generate the photon. In some embodiments, the at least one optical waveguide layer may include at least one of a pair of waveguides or a waveguide configured to transport photons in two or more quantum modes.

In some embodiments, the at least one optical waveguide layer may include a first waveguide layer including a delay line, and a second waveguide layer including a routing waveguide optically coupled to the at least two die stacks of the plurality of die stacks. The delay line may be characterized by a time delay between about 10 ps and about 50 ns. The delay line may have a loss between about 0.03 dB/m and about 2 dB/m.

In some embodiments, the device may include an optical fiber, where both ends of the optical fiber are coupled to the optical backplane. The optical fiber may provide a time delay between about 10 ns and about 500 ns. In some embodiments, the device may include an optical fiber optically coupled to the PIC die of a die stack of the plurality of die stacks, where the PIC die may include a grating coupler configured to couple light from the optical fiber to at least one of a data communication photodetector or a single photon generator in the PIC die.

In some embodiments, the at least one optical waveguide layer may include a waveguide coupler configured to couple light from a first optical waveguide layer of the at least one optical waveguide layer to a second optical waveguide layer of the at least one optical waveguide layer. In some embodiments, the optical backplane may include a waveguide coupler configured to couple light between the at least one optical waveguide layer and the PIC die in a die stack of the at least two die stacks. The waveguide coupler may include at least one of an adiabatic waveguide coupler or an evanescent waveguide coupler. In some embodiments, the waveguide coupler may be configured to couple, between the at least one optical waveguide layer and the PIC die in a die stack of the at least two die stacks, the photonic quantum system that has the photon in one of two or more quantum modes. In some embodiments, the at least one optical waveguide layer may include two optical waveguide layers characterized by different respective layer thicknesses. The at least one optical waveguide layer may include, for example, a silicon or a silicon nitride waveguide layer.

In some embodiments, the optical backplane may include an optical port configured to couple light from free space or an optical fiber into the at least one optical waveguide layer. The optical port may include at least one of a grating coupler, an edge coupler, or a tapered structure. In some embodiments, the optical backplane may include at least one of a dispersion compensator, a polarization splitter, a polarization rotator, a light isolation structure, or a thermal isolation structure. In some embodiments, the PIC die may include at least one of a routing waveguide, a beam splitter, a grating coupler, a waveguide coupler, a filter, a delay line, a fusion gate, a polarization splitter, a polarization rotator, a switch, a single photon detector, a dispersion compensator, a photodetector for data communication, a heater, or a temperature sensor. In some embodiments, the device may include a printed circuit board (PCB) bonded to the optical backplane, the PCB electrically coupled to the EIC die of a die stack of the plurality of die stacks. In some embodiments, the device may include an electrical interposer electrically coupled to the PCB.

According to certain embodiments, a system may include a plurality of wafer-scale modules and a plurality of optical fibers. Each wafer-scale module of the plurality of wafer-scale modules may include an optical backplane including a substrate and at least one optical waveguide layer on the substrate, and may also include one or more die stacks on the optical backplane. Each die stack of the one or more die stacks may include a photonic integrated circuit (PIC) die optically coupled to the at least one optical waveguide layer of the optical backplane, and an electronic integrated circuit (EIC) die bonded to the PIC die and including an electronic integrated circuit for controlling operations of the PIC die. Each optical fiber of the plurality of optical fibers may be optically coupled to the optical backplanes of two wafer-scale modules of the plurality of wafer-scale modules. In some embodiments, the system may include an optical fiber delay line, where both ends of the optical fiber delay line are connected to the optical backplane of a wafer-scale module of the plurality of wafer-scale modules. The optical fiber delay line may be characterized by a time delay between about 10 ns and about 500 ns.

In some embodiments, the at least one optical waveguide layer may include waveguides configured to transmit at least one of single photons, qubits, qudits, entangled states of qubits, or logical qubits. In some embodiments, the one or more die stacks may include at least two die stacks, and the at least one optical waveguide layer of the optical backplane may optically connect the at least two die stacks. In some embodiments, the at least one optical waveguide layer of the optical backplane may include at least one of: one or more silicon nitride (or silicon) waveguide layers; two optical waveguide layers characterized by different respective layer thicknesses; at least one delay line characterized by a time delay between 10 ps and 50 ns; a first waveguide coupler configured to couple light from a first optical waveguide layer of the at least one optical waveguide layer to a second optical waveguide layer of the at least one optical waveguide layer; a coupler configured to couple light between an optical fiber of the plurality of optical fibers and the at least one optical waveguide layer; a second waveguide coupler configured to couple light between the at least one optical waveguide layer and a PIC die of the one or more die stacks; a dispersion compensation circuit; a polarization splitter; a polarization rotator; a light isolation structure; or a thermal isolation structure.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 24A is a cross-sectional view of an example of a wafer-scale module including multiple EPIC die stacks bonded to an optical backplane according to certain embodiments.

FIG. 24B illustrates an example of an optical backplane including low-loss waveguides and high performance couplers for coupling light between fibers and the low-loss waveguides according to certain embodiments.

FIG. 24C illustrates an example of a wafer-scale module including an optical backplane and EPIC die stacks bonded to the optical backplane according to certain embodiments FIG. 25A illustrates an example of a subsystem for generating entangled quantum states according to certain embodiments.

FIG. 25B is a cross-sectional view of an example of a wafer-scale module in a subsystem for generating entangled quantum states according to certain embodiments.

FIG. 28A illustrates an example of a PIC die of an EPIC die stack according to certain embodiments.

FIG. 28B illustrates a portion of an example of an optical backplane 2805 according to certain embodiments.

FIG. 33A includes a block diagram of an example of a network for generating entanglement structures from resource states according to some embodiments.

FIG. 33B includes a block diagram of an example of a fusion device according to certain embodiments.

FIG. 34A illustrates a schematic of an example of a circuit for generating entanglement structures from resource states using a single resource state generator and time-like fusion operations according to certain embodiments.

FIG. 34B illustrates a simplified example of generating a large entangled state of qubits using the circuit of FIG. 34A according to certain embodiments.

DETAILED DESCRIPTION

Figure 1:
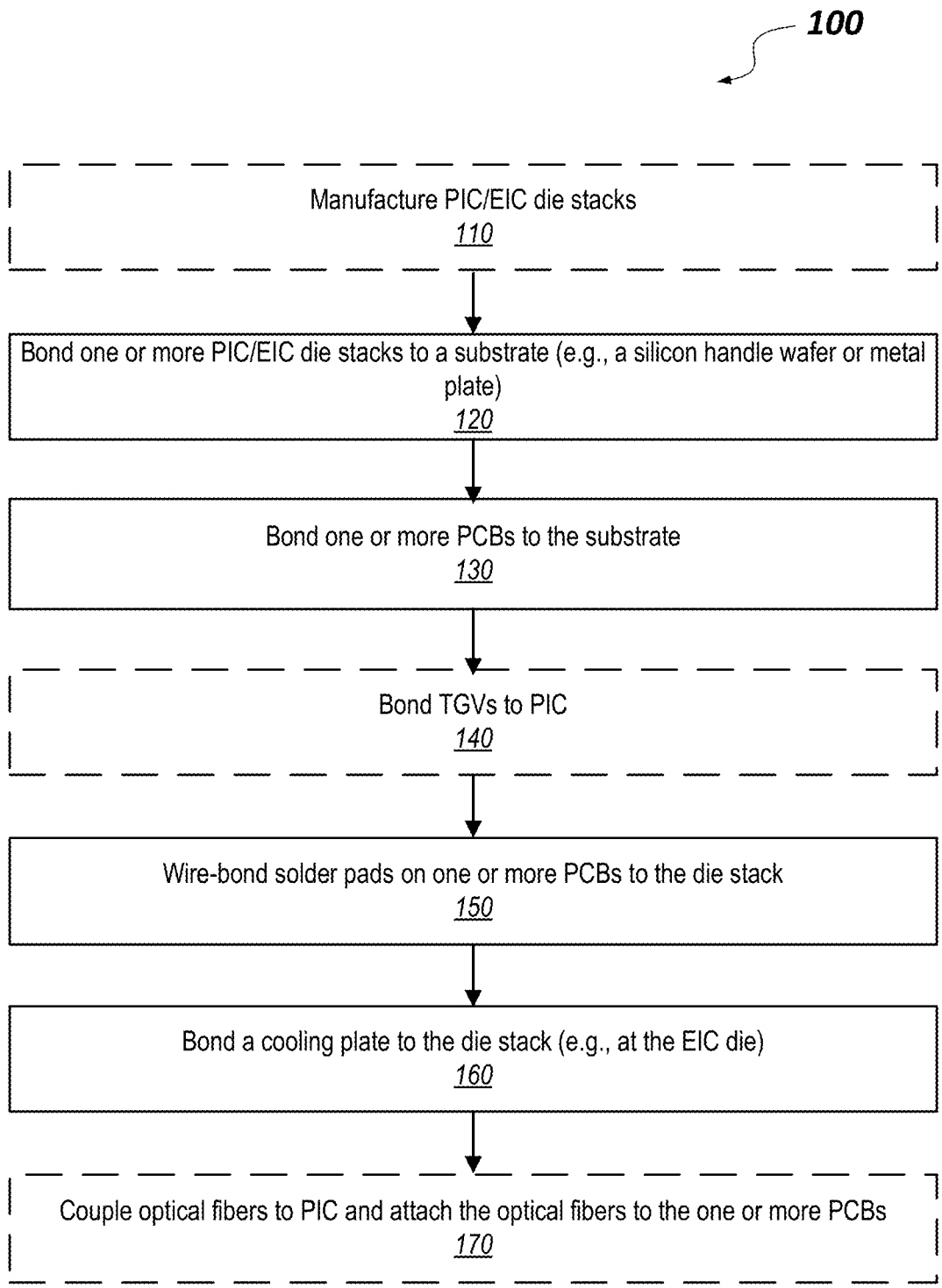
FIG. 1 is a flowchart illustrating an example of a process for integrating photonic integrated circuits and electronic integrated circuits in a single package according to certain embodiments.

Techniques disclosed herein relate generally to generating, manipulating, and detecting quantum states for systems such as optical quantum computers or quantum communication systems. Various inventive embodiments are described herein, including methods, processes, systems, devices, circuits, packages, modules, units, wafers, dies, networks, cells, and the like.

Quantum computing and quantum communication rely on the dynamics of quantum systems, such as photons, electrons, atoms, ions, molecules, nanostructures, and the like, which follow the rules of quantum theory. In quantum theory, the quantum state of a quantum system is described by a set of physical properties, the complete set of which is referred to as a quantum mode. A quantum mode can be defined by, for example, specifying the value (or distribution of values) of one or more properties of the quantum system. In cases where the quantum system is implemented using photons (referred to as "a photonic quantum system"), quantum modes may be defined by the frequency of the photon, the photon's position in space (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, orbital angular momentum, and the like. For the case of photons propagating in waveguides, the state of a photon may be represented by a quantum mode of a set of discrete spatiotemporal modes. For example, the spatial mode of the photon may be determined according to the waveguide in which the photon is propagating among a finite set of discrete waveguides, whereas the temporal mode of a photon may be determined based on the time period in which the photon is present among a set of discrete time periods. Other types of quantum mode, such as polarization modes, may also be used to specify the quantum state.

Many quantum computing or quantum communication systems may use quantum bits (qubits) that are each simultaneously in a coherent superposition of two states to manipulate information through quantum mechanics. Most technologies used to implement qubits have issues such as stability, decoherence, fault tolerance, and scalability issue. For example, one of the main challenges in realizing quantum computation is that decoherence and other quantum noise may destroy the information in a superposition of states in a quantum computer, and inaccuracies in quantum state transformations throughout the computation may accumulate, thus making long computations difficult. To overcome these issues, quantum error correction may be needed to achieve fault-tolerant quantum computation that can deal not only with noise on stored quantum information, but also with faulty quantum gates, faulty quantum preparation, and faulty measurements. In some systems, for the purposes of quantum error correction, many physical qubits may be used to produce an entity (referred to as a logical qubit) which behaves logically as a single qubit would in a quantum circuit or algorithm. Some quantum error correction techniques may store the information of one qubit onto a highly entangled state of multiple qubits, such as 7, 9, or more physical qubits. When more than one level of encoding is performed to provide better protection, thousands or more of physical qubits may be needed for each logical qubit. Thus, a logical qubit, such as an error-corrected photonic logical qubit or a fault tolerate photonic channel, may include many entangled physical qubits to provide the stability, error-correction, and fault tolerance needed to perform useful computations. For a quantum computer that may use many logical qubits for computing, thousands or millions of physical qubits may need to be generated, entangled, switched, and detected, which may need a large number of passive and active photonic circuits and components and electric circuits and components to implement. It can be very challenging to integrate these circuits and components into a system that can achieve the desired functions and performance.

According to certain embodiments, a quantum photonic device may include an optical backplane that includes at least one optical waveguide layer, and a plurality of die stacks on the optical backplane. Each die stack of the plurality of die stacks may include a photonic integrated circuit (PIC) die and an electronic integrated circuit (EIC) die bonded to the PIC die. The PIC die may include a photonic integrated circuit optically coupled to the at least one optical waveguide layer of the optical backplane. The EIC die may include an electronic integrated circuit for controlling operations of the photonic integrated circuit of the PIC die. The at least one optical waveguide layer may include waveguides optically coupled to at least two die stacks of the plurality of die stacks. The waveguides are configured to transport, between the at least two die stacks of the plurality of die stacks, a photonic quantum system that includes a photon in one of two or more quantum modes. The two or more quantum modes may include, for example, two or more different frequencies, two or more different positions (e.g., a waveguide or superposition of waveguides a photon is propagating within), two or more different directions of propagation, two or more different polarization states, two or more different time windows, two or more different orbital angular momentums, or the like. The photonic quantum system may include, for example, a single photon, a qubit, a qudit, an entangled state of qubits, or a logical qubit. The photonic integrated circuit may include a single photon source configured to generate the photon. In some embodiments, the at least one optical waveguide layer may include at least one of a pair of waveguides or a waveguide configured to transport photons in two or more quantum modes.

According to certain embodiments, a system may include a plurality of wafer-scale modules and a plurality of optical fibers. Each wafer-scale module of the plurality of wafer-scale modules may include an optical backplane including a substrate and at least one optical waveguide layer on the substrate; and one or more die stacks on the optical backplane. Each die stack of the one or more die stacks may include a photonic integrated circuit (PIC) die optically coupled to the at least one optical waveguide layer of the optical backplane, and an electronic integrated circuit (EIC) die bonded to the PIC die and including an electronic integrated circuit for controlling operations of the PIC die. Each optical fiber of the plurality of optical fibers may be optically coupled to the optical backplanes of two wafer-scale modules of the plurality of wafer-scale modules. In some embodiments, the system may include an optical fiber delay line, where both ends of the optical fiber delay line are connected to the optical backplane of a wafer-scale module of the plurality of wafer-scale modules. The optical fiber delay line may be characterized by a time delay between about 10 ns and about 500 ns.

As used herein, a "qubit" (or quantum bit) refers to a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of atoms, ions, nuclei, or photons. Other examples may include other engineered quantum systems such as flux qubits, phase qubits, or charge qubits (e.g., formed from a superconducting Josephson junction); topological qubits (e.g., *Majorana fermions*); or spin qubits formed from vacancy centers (e.g., nitrogen vacancies in diamond). A physical qubit may be a physical device that behaves as a two-state quantum system. In one example, a qubit can be "dual-rail encoded" such that the logical value of the qubit is encoded by the occupation of one of two modes of the quantum system.

As used herein, a "resource state" refers to an entangled state of a number of qubits in a non-separable entangled state (which is an entangled state that cannot be decomposed into smaller separate entangled states). In various embodiments, the number of qubits of a resource state can be a small number (e.g., two or more, or any number up to about 20) or a larger number (as large as desired).

As used herein, a "logical qubit" refers to a physical or abstract qubit that has a long enough coherence time to be usable by quantum logic gates. A logical qubit may specify how a single qubit should behave in a quantum algorithm, subject to quantum logic operations by quantum logic gates. Due to issues such as stability, decoherence, fault tolerance, and scalability associated with a physical qubit that includes a single two-state quantum system, physical qubits may not be used to reliably encode and retain information for a sufficiently long period of time to be useful. Therefore, quantum error correction may need to be used to produce scalable quantum computers, where many physical qubits may be used to create a single, error-tolerant logical qubit. Depending on the error-correction scheme used and the error rates of each physical qubit, a single logical qubit may be formed using a large number (e.g., tens, hundreds, thousands, or more) of physical qubits. As used in the following sections, the term "qubit" generally refers to a physical qubit, whereas all references to logical qubits include the qualifier "logical."

As used herein, a "quantum system" may include particles (such as atoms, ions, nuclei, and/or photons) or engineered quantum systems, such as flux qubits, phase qubits, or charge qubits (e.g., formed from a superconducting Josephson junction), topological qubits (e.g., *Majorana fermions*), spin qubits formed from vacancy centers (e.g., nitrogen vacancies in diamond), qubits otherwise encoded in multiple quantum systems (e.g., Gottesman-Kitaev-Preskill (GKP) encoded qubits), entangled states of qubits, and the like.

As used herein, "fusion" (or "a fusion operation" or "fusing") refers to a two-qubit entangling measurement. A "fusion gate" is a structure that receives two input qubits, each of which is typically part of an entangled state of qubits. The fusion gate may perform a projective measurement operation on the input qubits to produce either one (e.g., in "type I fusion") or zero (e.g., in "type II fusion") output qubit in a manner such that the initial two entangled states of qubits are fused into a single entangled state of qubits. Fusion gates are specific examples of a general class of two-qubit entangling measurements and are particularly suited for photonic architectures.

Several illustrative embodiments will now be described with respect to the accompanying drawings. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

A system that generates, manipulates, and/or detects quantum states for optical quantum computing or optical quantum communication may need to integrate passive and active photonic integrated circuits and other optical and electrical components, such as optical fibers or other low-loss optical interconnects, control circuits, and classical processing units, into a same system to reliably generate, manipulate (e.g., entangle), and detect hundreds, thousands, or even millions of qubits for computing and error corrections.

To achieve the desired functions and performance, the passive and active photonic integrated circuits and electronic integrated circuits may need to be integrated into one or more dies, one or more wafers, or one or more subsystems.

FIG. 1 is a flowchart 100 illustrating an example of a process for integrating photonic integrated circuits and electronic integrated circuits in a same package according to certain embodiments. Optionally, at block 110, die stacks that each include a PIC die and an EIC die bonded face-to-face may be manufactured. The die stacks may be manufactured by bonding a silicon PIC wafer and a silicon EIC wafer to form a wafer stack, and cutting the wafer stack (for example, by laser or plasma scribing or grinding) to separate each die area that includes a PIC die and an EIC die. More details of an example of a process for manufacturing the die stacks are described below with respect to FIG. 2.

At block 120, a substrate, such as a silicon handle wafer or a metal plate, may be bonded with the backside (i.e., the substrate) of the PIC die through, for example, fusion bonding as described in detail below. In other embodiments, the substrate can be bonded to the backside of the EIC die through similar means. In either case, the substrate (e.g., the silicon handle wafer), the PIC die, and the EIC die may all include a silicon substrate and may be bonded to form chemical bonds at the interfaces between adjacent substrates. Therefore, the CTEs of the three substrates may be matched and the total thermal resistance from the EIC die to the silicon handle wafer may be relatively low because the thermal resistance at the interfaces may be reduced by the bonding.

At block 130, PCBs that have been manufactured and tested may be cut (if needed), aligned, and attached to the substrate (e.g., silicon handle wafer or metal plate) at areas where no PIC/EIC die stacks are bonded. The bonding method may depend on the material of the PCBs. For example, if silicon is used for the PCBs, fusion bonding techniques may be used. If oxides (e.g., silicon dioxide) are used for the PCBs, a hybrid bonding technique may be used. If other materials are used for the PCBs, an epoxy or an adhesive may be used to attach the PCBs to the substrate. In some embodiments, multiple PCB boards may be used in the same package and may be arranged at different horizontal or vertical locations. For example, in some embodiments, one PCB may be positioned on each side of a die stack. In some embodiments, two or more PCB boards may be positioned vertically with one on top of another.

Optionally, at block 140, through-glass vias (TGVs) that have been manufactured and tested may be cut (if needed), aligned, and attached to the PIC, where the TGVs may be in electrical and physical contact with pads or electrical circuits (e.g., traces) on the PIC. The TGVs may be used to deliver power or data signals to the PIC and EIC in a die stack.

At block 150, solder pads on the PCBs may be wire-bonded to the die stack. In some embodiments, solder pads on the PCBs may be wire-bonded to the TGVs. In some embodiments, solder pads on the PCBs may be wire-bonded to bonding pads on the EIC die, where the bonding pads may be connected to circuits on the EIC die by through-silicon vias (TSVs). In some embodiments, solder pads on the PCBs may be wire-bonded to bonding pads on the PIC.

At block 160, a top cooling plate may be bonded to the die stack. For example, a silicon substrate or a metal plate with micro-machined or etched mesa structures may be bonded to the back side of the EIC die, where the mesa structures may be in contact with the substrate of the EIC die. In some embodiments, the mesa structures may be coated with one or more metal layers (such as a 3-D printed gold or gold alloy layer) or an epoxy. In some embodiments, the top cooling plate may be bond to the die stack after the assembled device is tested at, for example, room temperature.

Optionally, at block 170, optical fibers may be attached to the PIC die and the PCBs. For example, the optical fibers may be attached to V-grooves on the PIC die and attached to the PCBs through fiber harnesses. In some embodiments, more than 100 optical fibers or more than 200 optical fibers may be attached to each of two sides of the PIC die. In some embodiments, an additional PCB board may be placed above the optical fibers such that the optical fibers may be sandwiched by the two PCB boards. This may allow for easier attachment and more secure and reliable integration of the optical fibers with PIC die.

It should be appreciated that the specific operations illustrated in FIG. 1 provide a particular method of integrating photonic integrated circuits and electronic integrated circuits in a same package according to another embodiment. Other sequences of operations may also be performed according to alternative embodiments. For example, alternative embodiments may perform the operations outlined above in a different order. Moreover, the individual operations illustrated in FIG. 1 may include multiple sub-operations that may be performed in various sequences as appropriate to the individual step. Furthermore, additional operations may be added or removed depending on the particular applications. One of ordinary skill in the art would recognize many variations, modifications, and alternatives.

Figure 2:
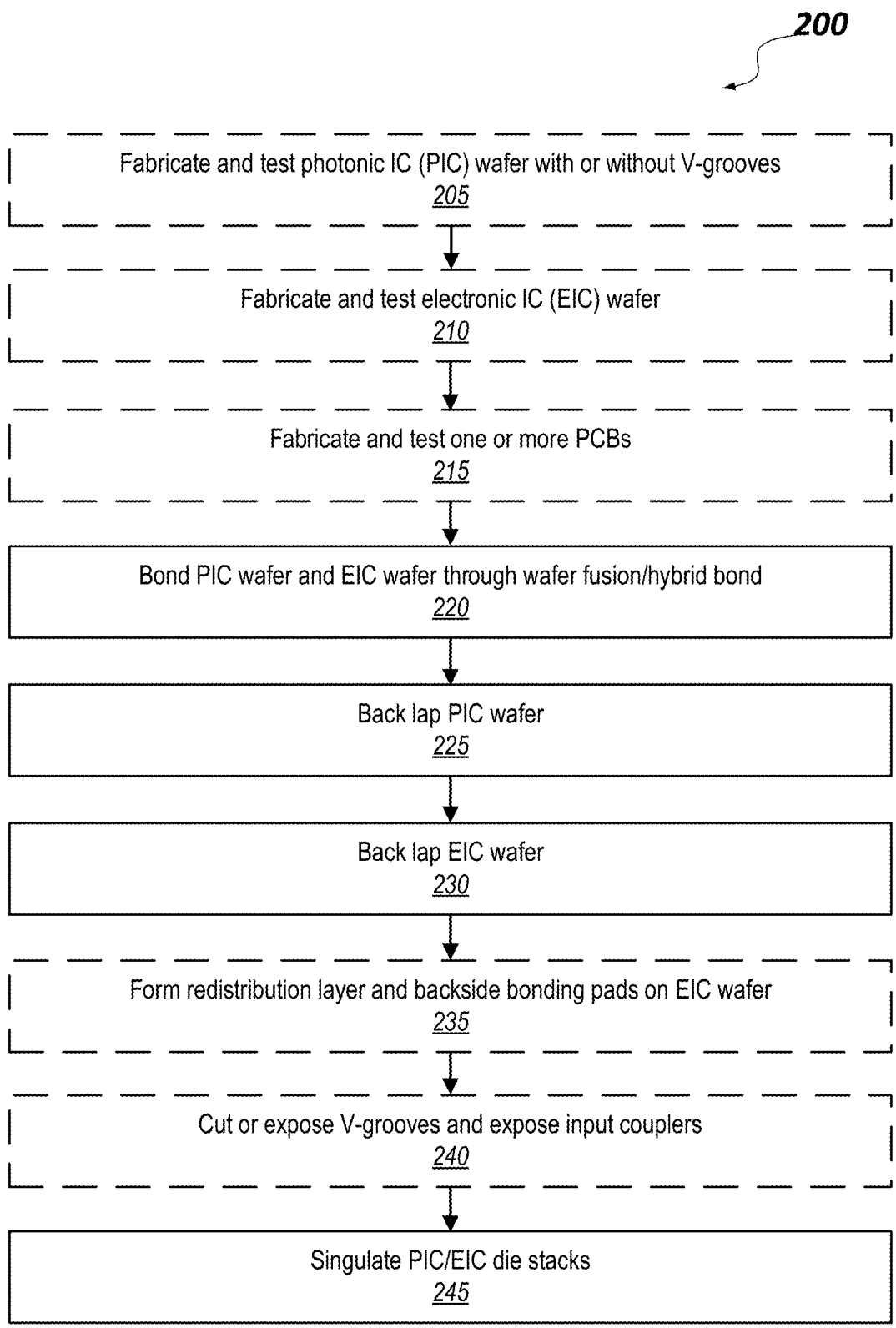
FIG. 2 is a flowchart illustrating an example of a process for integrating photonic integrated circuits and electronic integrated circuits in a die stack according to certain embodiments.
Figure 3A:
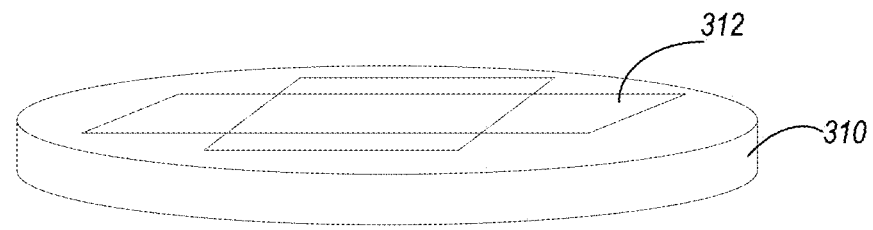
FIG. 3A illustrates an example of a silicon wafer with photonic integrated circuits fabricated thereon according to certain embodiments.

FIG. 2 is a flowchart illustrating an example of a process 200 for integrating photonic integrated circuits and electronic integrated circuits in a die stack (as described with respect to block 110 of FIG. 1) according to certain embodiments. Process 200 may include, at block 205, fabricating photonic integrated circuits on semiconductor wafers, such as silicon wafers, using semiconductor processing equipment and technology. The photonic integrated circuits may include, for example, waveguides, resonators, photon detectors, interferometers, gratings, and the like. In some embodiments the PICs are tested to exclude defective circuits before assembly because it may be more expensive to find and reject defective assembled devices that may include other properly functioning components at a later stage. Operations at block 205 may also include testing the photonic integrated circuits on the semiconductor wafers. For example, in some embodiments, additional couplers (e.g., grating couplers) may be manufactured on the semiconductor wafer and may be used as optical test ports for coupling light into or out of the photonic integrated circuits during testing. The additional couplers may be removed at a later stage of process 200 described below. In some embodiments, V-grooves for aligning and coupling optical fibers with waveguides in the PICs may also be fabricated on the semiconductor wafer. FIG. 3A illustrates an example of a silicon wafer 310 with photonic integrated circuits 312 fabricated thereon (with or without the V-grooves) according to certain embodiments.

Figure 3B:
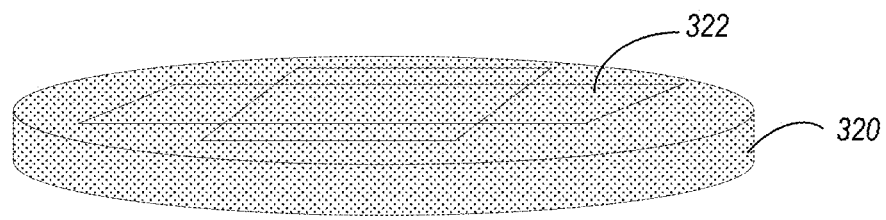
FIG. 3B illustrates an example of a silicon wafer with electrical integrated circuits fabricated thereon according to certain embodiments.

At block 210, electronic integrated circuits may be fabricated on semiconductor wafers, such as silicon wafers, using semiconductor processing equipment and technology (e.g., CMOS technology). The electronic integrated circuits may include, for example, control circuits, logic circuits, driver circuits, and the like. In some embodiments, through-silicon vias (TSVs) may be formed in EIC wafer. The manufactured integrated circuits on the electronic integrated circuit wafer may be tested to reject defective circuits before assembling with the PICs. FIG. 3B illustrates an example of a silicon wafer 320 with electrical integrated circuits 322 fabricated thereon according to certain embodiments.

At block 215, printed circuit boards (PCBs) may be fabricated and tested. The PCBs may be used to provide connections to an external system, to provide a power distribution network (e.g., power layers and ground layers), and to include some electronic components, such as voltage regulators and decoupling capacitors in the package. The PCBs may also include, for example, electrical cable connection ports, such as ribbon cable connectors, RF/microwave connectors (e.g., SMA connectors), and the like. In some embodiments, the PCBs may also include fiber cable harnesses and/or electric cable harnesses. In some embodiments, the PCBs may be made of a ceramic material, silicon, CTE-matched silicon dioxide, or an organic material (e.g., resin). In various embodiments, one or more PCB boards may be used in a package. For example, one PCB board may be below the fiber cable and another PCB board may be above the fiber cable to sandwich the fiber cable. This may allow for easier attachment and more secure and reliable integration of the fiber cable with the PICs.

Figure 3C:
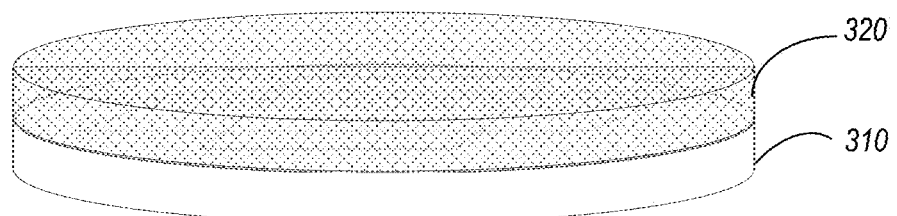
FIG. 3C illustrates an example of a wafer stack including a silicon wafer with photonic integrated circuits fabricated thereon and a silicon wafer with electrical integrated circuits fabricated thereon according to certain embodiments.

At block 220, a PIC wafer manufactured and tested at block 205 and an EIC wafer manufactured and tested at block 210 may be aligned and bonded through wafer-to-wafer fusion or hybrid bonding to form a wafer stack. Wafer-to-wafer fusion bonding may bond two wafers without any intermediate layers and is based on chemical bonds between the surfaces of two wafers that meet certain conditions. For example, fusion bonding may be used to bond two silicon wafers. Wafer-to-wafer fusion bonding may include wafer cleaning and other preprocessing, aligning and pre-bonding at room temperature, and annealing at elevated temperatures, such as about 250° C. or higher. Fusion bonding can significantly reduce or substantially eliminate the thermal resistance at the interface between two wafers. In some embodiments, wafer-level metal/adhesive hybrid bonding may be used to bond two wafers with dielectric materials (e.g., oxide) and/or metal at the surface of one or both wafers. Dielectric bonds and/or metal bonds may be formed at the interface between two wafers by the hybrid bonding. Hybrid bonding may include, for example, wafer cleaning, surface activation (e.g., plasma activation), pre-bonding, and annealing at, for example, 250-300° C. or higher. FIG. 3C illustrates an example of a wafer stack including silicon wafer 310 with photonic integrated circuits fabricated thereon and silicon wafer 320 with electrical integrated circuits fabricated thereon.

At blocks 225 and 230, the PIC wafer and the EIC wafer may be back-grinded (or back lapped) to make the wafer stack including the PIC wafer and EIC wafer thinner. For example, the PIC wafer may be back lapped from about 775 µm to about 100-600 µm. The EIC wafer may be back grinded from about 775 µm to about 50 µm or until the through-silicon vias (TSVs) are exposed.

Figure 3D:
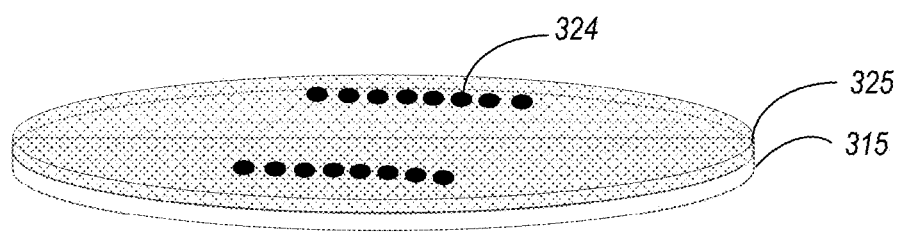
FIG. 3D illustrates an example of a wafer stack including two bonded silicon wafers after back lapping (or back grinding) and bonding pad formation according to certain embodiments.

At block 235, one or more redistribution layers (RDLs) may be formed on the backside of the EIC wafer, and bonding pads may be formed on the redistribution layer. The bonding pads may be used to make connections with the EIC. FIG. 3D illustrates an example of a wafer stack including two bonded silicon wafers 315 and 325 after back lapping (or back grinding) and bonding pad formation according to certain embodiments. Bonding pads 324 may be formed on the back side of back-grinded silicon wafer 325 according to a desired pattern.

Figure 4A:
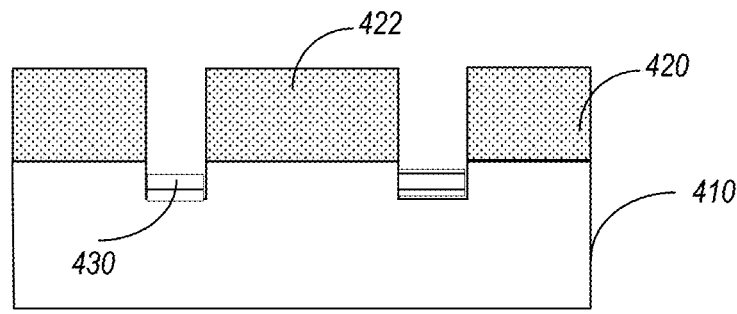
FIG. 4A illustrates an example of a stack including two bonded silicon wafers after a process that cuts or exposes V-grooves on the silicon wafer with photonic integrated circuits fabricated thereon according to certain embodiments.

At block 240, the EIC wafer and the PIC wafer may be etched to cut through portions of the thinned EIC wafer and/or form V-grooves on the PIC wafer. The V-grooves may be used to align and couple optical fibers with waveguides in the PIC. In some embodiments, the V-grooves may be formed before bonding the PIC wafer with the EIC wafer. In some embodiments in which optical test ports are fabricated on the PIC wafer for testing the PIC wafer, the optical test ports may be removed by the etching, and the input ports (e.g., edge couplers) to the waveguides may be exposed. FIG. 4A illustrates an example of a wafer stack including two bonded silicon wafers 410 and 420 after a process that cuts V-grooves 430 on silicon wafer 410 with photonic integrated circuits fabricated thereon according to certain embodiments, where the V-grooves are not fabricated on silicon wafer 410 as a part of the PIC fabrication process described above with respect to block 205. If V-grooves are fabricated on silicon wafer 410 as a part of the PIC fabrication process described above, portions of silicon wafer 420 may be cut through to expose the V-grooves on silicon wafer 410. Silicon wafer 420 may be cut into several EIC dies 422.

Figure 4B:
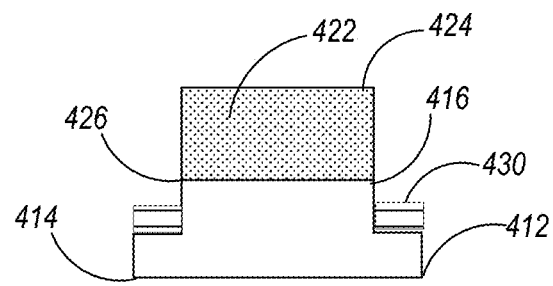
FIG. 4B illustrates an example of a singulated die stack including a photonic integrated circuit (PIC) die and an electronic integrated circuit (EIC) die according to certain embodiments.

At block 245, the wafer stack including the PIC wafer and the EIC wafer may be cut by, for example, laser or plasma scribing or grinding, to separate each die area that includes a PIC die and an EIC die. The cutting may be performed at areas where the V-grooves are formed as described above with respect to block 240. FIG. 4B illustrates an example of a singulated die stack including a PIC die 412 and an EIC die 422 according to certain embodiments. The V-shapes of V-grooves 430 extend into and out of the cross-sectional plane illustrated in FIG. 4, and fibers can be fit in V-grooves 430 from the two sides (e.g., left and right sides shown in FIG. 4B) of the singulated die stack. EIC die 422 may include a back surface 424 and a front surface 426 that may include circuits and contact pads. Back surface 424 of EIC die 422 may include bonding pads (not shown in FIG. 4B). PIC die 412 may include a back surface 414 and a front surface 416 that may include circuits and contact pads. Front surface 426 of EIC die 422 may be in contact with front surface 416 of PIC die 412, and thus EIC die 422 and PIC die 412 are bonded face-to-face.

It should be appreciated that the specific operations illustrated in FIG. 2 provide a particular method of integrating photonic integrated circuits and electronic integrated circuits in a die stack according to another embodiment. Other sequences of operations may also be performed according to alternative embodiments. For example, the alternative embodiments may perform the operations outlined above in a different order. Moreover, the individual operations illustrated in FIG. 2 may include multiple sub-operations that may be performed in various sequences as appropriate to the individual step. Furthermore, additional operations may be added or removed depending on the particular applications. One of ordinary skill in the art would recognize many variations, modifications, and alternatives.

Figure 4C:
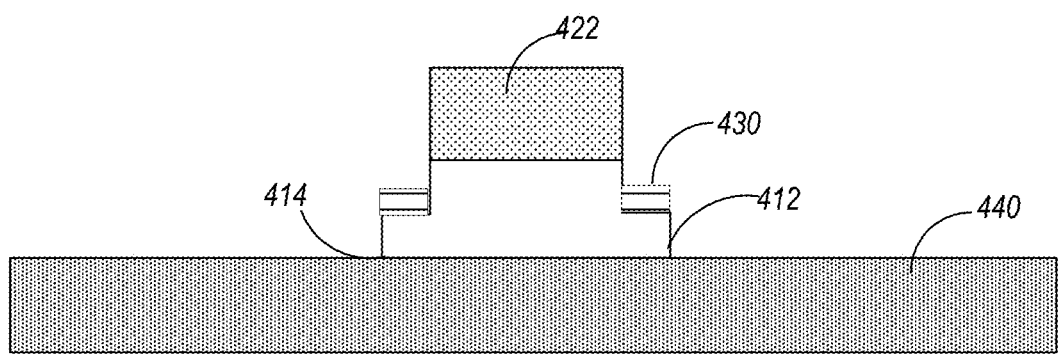
FIG. 4C illustrates an example of a singulated die stack including a PIC die and an EIC die and bonded on a silicon handle wafer according to certain embodiments.

As described above with respect to block 120 of FIG. 1, a semiconductor wafer, such as a silicon handle wafer, may be bonded with the backside (i.e., the substrate) of the PIC die though, for example, fusion bonding as described above. Thus, a stack may include the silicon handle wafer, the PIC die, and the EIC die, which may all include a silicon substrate and may be bonded to form chemical bonds at the interfaces between adjacent substrates. Therefore, the CTEs of the three substrates may be matched and the total thermal resistance from the EIC die to the silicon handle wafer may be relatively low because the thermal resistance at the interfaces is minimized. FIG. 4C illustrates an example of a singulated die stack including PIC die 412 and EIC die 422 and bonded on a silicon handle wafer 440 according to certain embodiments. As illustrated, silicon handle wafer 440 may be bonded with the substrate of PIC die 412 at back surface 414.

Figure 4D:
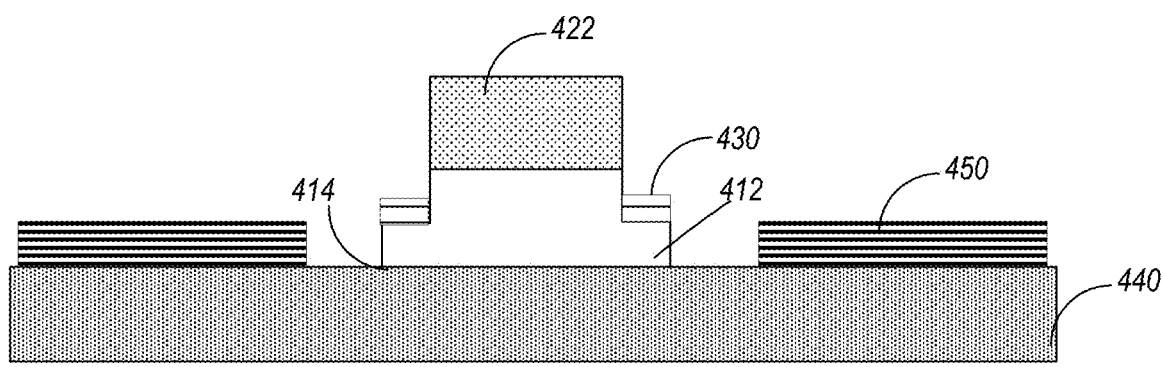
FIG. 4D illustrates an example of a package including a printed circuit board (PCB) and a die stack bonded on a silicon handle wafer according to certain embodiments.

The PCB manufactured and tested may be cut (if needed), aligned, and attached to the silicon handle wafer at areas where no PIC/EIC die stacks are bonded. The bonding method may depend on the material of the PCBs. For example, if silicon is used for the PCBs, fusion bonding techniques may be used. If oxides, such as silicon dioxide, are used for the PCBs, a hybrid bonding technique may be used. If other materials are used for the PCBs, an epoxy or an adhesive may be used to attach the PCBs to the silicon handle wafer. FIG. 4D illustrates an example of a package including a single printed circuit board (PCB) 450 and a die stack including PIC die 412 and EIC die 422 bonded on silicon handle wafer 440 according to certain embodiments. As described above, in some embodiments, multiple PCB boards may be used in the same package and may be arranged at different horizontal or vertical locations. For example, in some embodiments, one PCB may be positioned on each side of the die stack. In some embodiments, two or more PCB boards may be positioned vertically with one on top of another. In some embodiments, PCB 450 may include a semiconductor substrate, such as a silicon substrate.

Subsequently, the bonding pads on EIC die and the solder pads on PCB may be connected using bonding wires. In some embodiments, optical fibers may be attached to the PIC die and the PCB. For example, the optical fibers may be attached to the V-grooves on the PIC die and attached to the PCB through fiber harnesses. In some embodiments, more than 100 optical fibers or more than 200 optical fiber may be attached to each of two sides of the PIC die. In some embodiments, an additional PCB board may be placed above the optical fibers and PCB 450 such that the optical fibers may be sandwiched by the two PCB boards. This may allow for easier attachment and more secure and reliable integration of the optical fibers with PIC die 412.

Figure 5A:
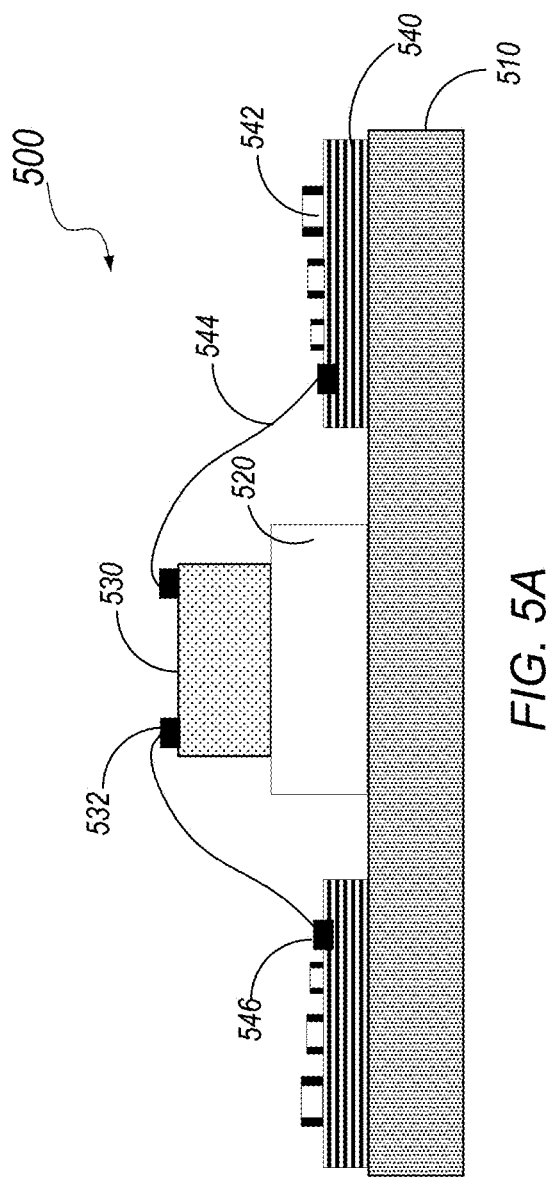
FIG. 5A is a cross-sectional view of an example of a package including a printed circuit board (PCB) and a die stack bonded on a silicon handle wafer, where the die stack is wire-bonded to the PCB according to certain embodiments.

FIG. 5A is a cross-sectional view of an example of a package 500 including a printed circuit board (PCB) 540 and a die stack including a PIC die 520 and an EIC die 530 bonded on a silicon handle wafer 510 according to certain embodiments. PCB 540 may include various electronic components soldered on it, such as decoupling capacitors 542 or cable connectors for ribbon cables or RF/microwave cables. FIG. 5A shows that bonding pads 532 on backside of EIC die 530 are connected to solder pad 546 on PCB 540 through bonding wire 544.

Figure 5B:
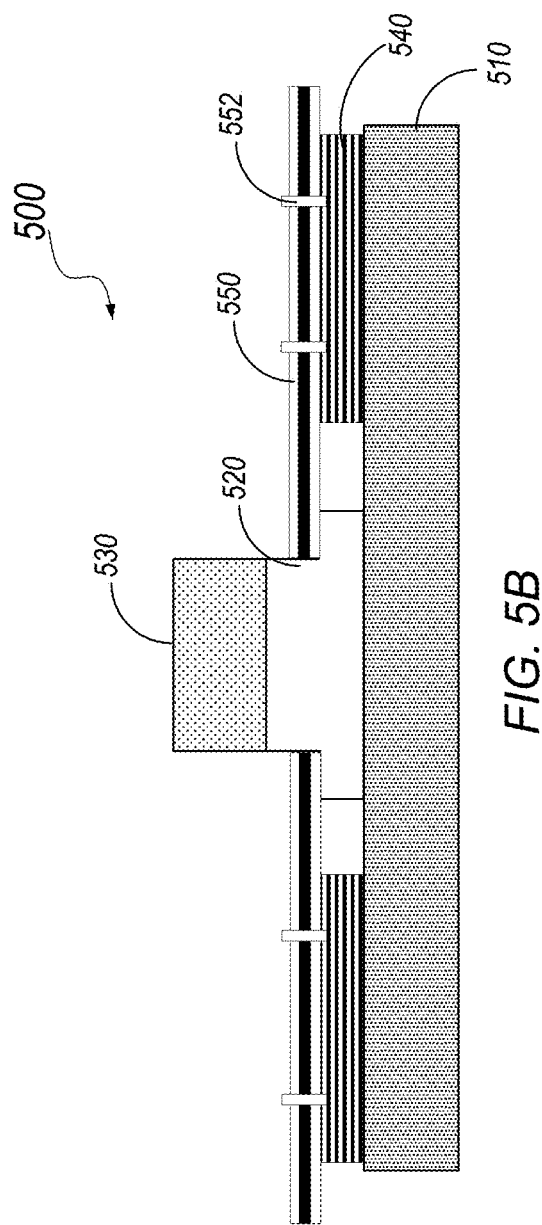
FIG. 5B is another cross-sectional view of an example of a package including a printed circuit board (PCB) and a die stack bonded on a silicon handle wafer, where optical fibers are coupled to the die stack and harnessed on the PCB according to certain embodiments.

FIG. 5B is another cross-sectional view of package 500 including printed circuit board (PCB) 540 and the die stack including PIC die 520 and EIC die 530 bonded on silicon handle wafer 510, where optical fibers 550 are coupled to PIC die 520 and attached to PCB 540 through a harness 552 according to certain embodiments. Optical fiber 550 may fit in the V-grooves on PIC die 520 and may be aligned with waveguides on PIC die 520 by the V-grooves on PIC die 520. Optical fiber 550 may be coupled to the waveguides through, for example, edge couplers as described above.

Figure 6:
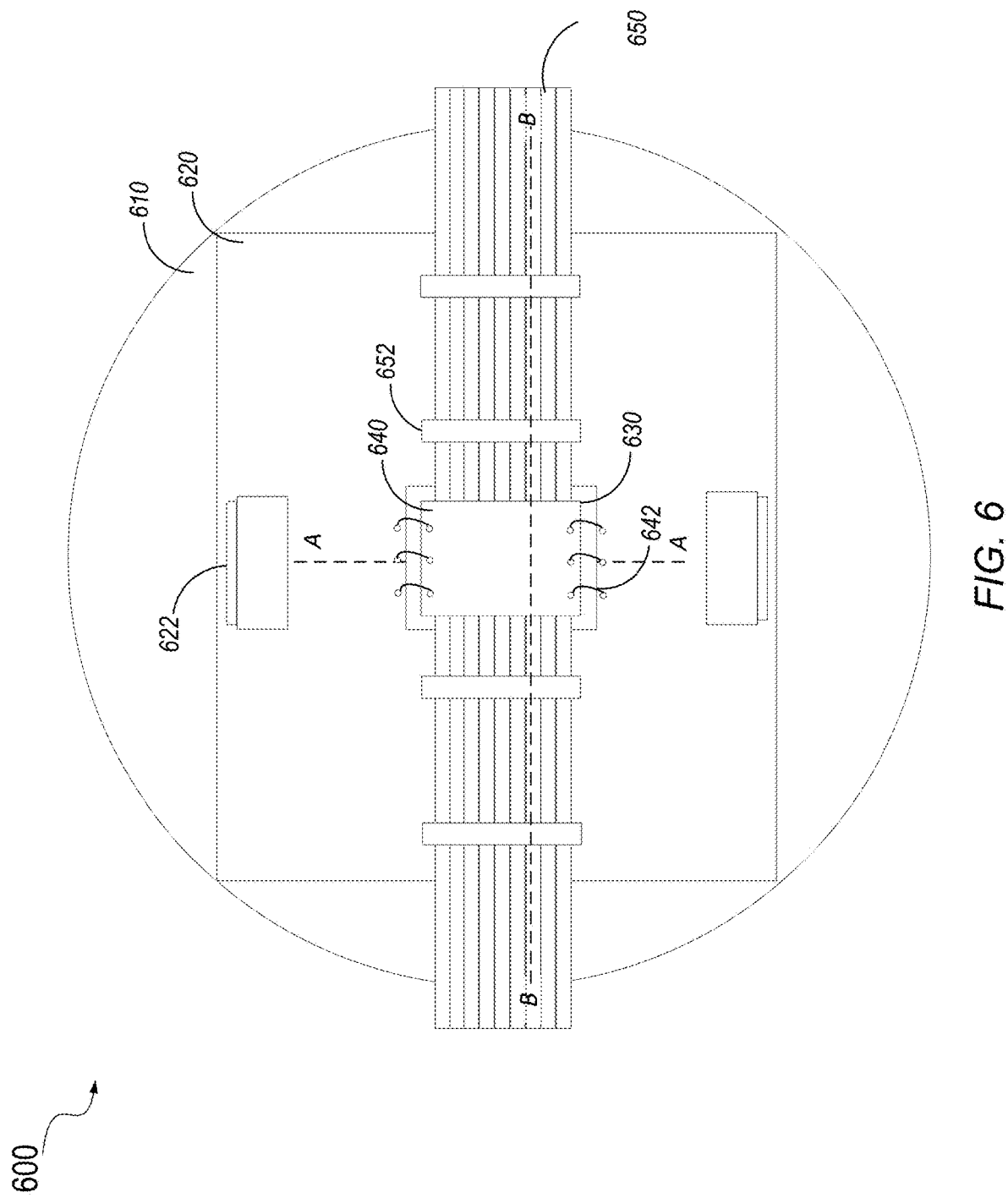
FIG. 6 is a top view of an example of a package that includes a PIC, an EIC, a PCB, electrical connectors, and optical fibers on a silicon handle wafer according to certain embodiments.

FIG. 6 is a top view of an example of a package 600 that includes a PIC die 630, an EIC die 640, a PCB 620, one or more electrical connectors 622, and optical fibers 650 on a silicon handle wafer 610. Even though FIG. 6 only shows one PIC/EIC die stack, multiple PIC/EIC die stacks may be included in package 600. As illustrated, a PCB 620 is attached to silicon handle wafer 610, e.g., using an epoxy or through fusion bonding or hybrid bonding, depending on the material of PCB 620. As described above, one or more PCBs 620 may be attached to silicon handle wafer 610 at different horizontal or vertical locations. A PIC/EIC die stack includes EIC die 640 bonded face-to-face with PIC die 630 (e.g., by fusion bonding or hybrid bonding) such that the PICS may directly face the EICs. The PIC/EIC die stack may be bonded to silicon handle wafer 610 by, for example, fusion bonding. EIC die 640 may be electrically connected to PCB 620 through bonding wires 642, where the bonding pads and bonding wires may only be at the top (north) and bottom (south) sides of the PIC/EIC die stack. The left (west) and right (east) sides of the PIC/EIC die stack may be coupled with optical fibers 650, where optical fibers 650 may be attached to PCB 620 through harnesses 652. PCB 620 may also include electrical connectors 622 and some other electronic components, such as voltage regulators, power management ICs, decoupling capacitors, etc.

Figure 7:
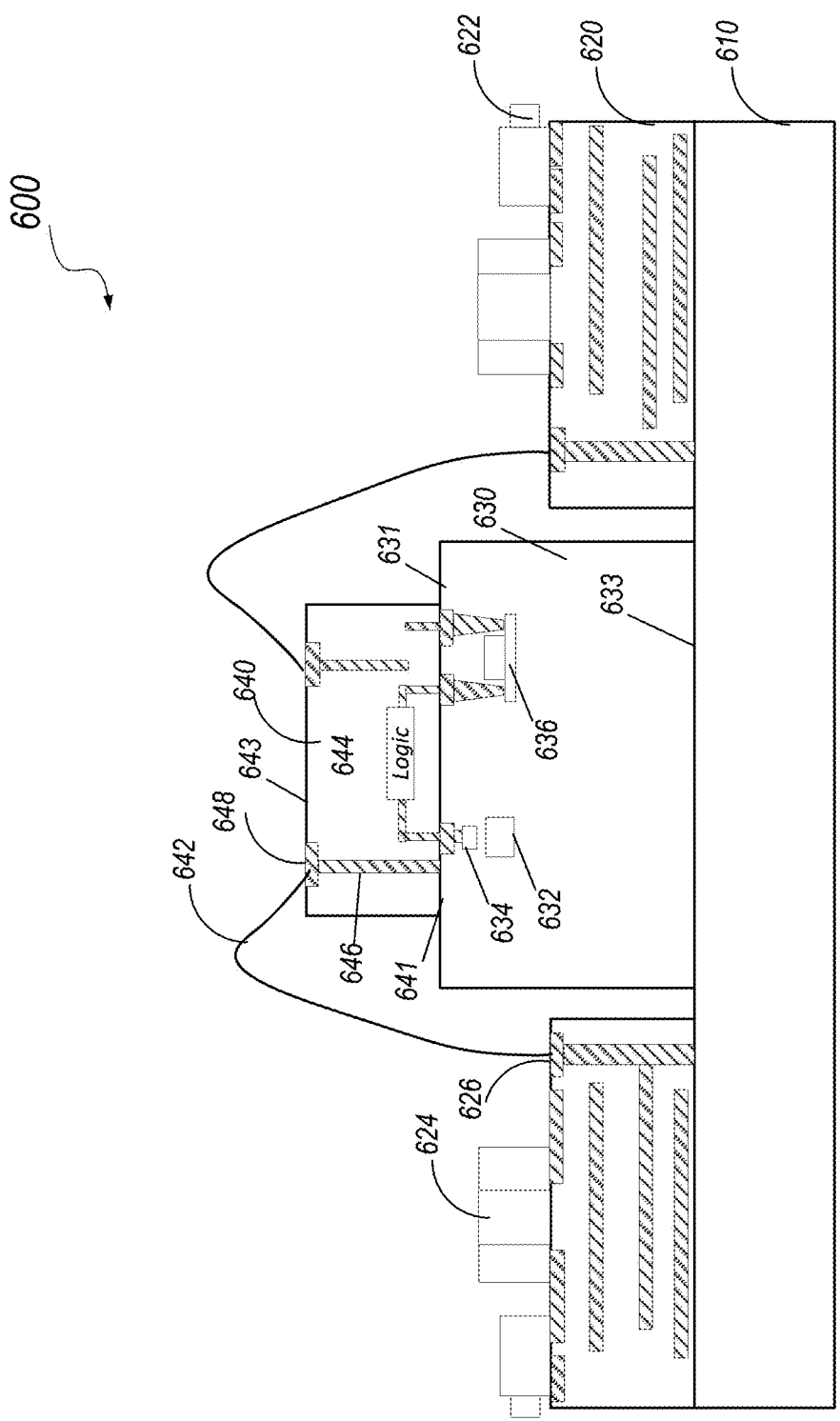
FIG. 7 is a cross-sectional view of the example package shown in FIG. 6 according to certain embodiments.

FIG. 7 is a cross-sectional view of package 600 along line A-A shown in FIG. 6 according to certain embodiments. FIG. 7 shows that PCB 620 and the PIC/EIC die stack are bonded to a top surface of silicon handle wafer 610. PCB 620 may include multiple layers of interconnect traces or planes connected through vias. Electronic components, such as electrical connector 622 and decoupling capacitors 624 may be soldered on the top surface of PCB 620. PCB 620 may also include solder pads 626 on the top surface of PCB 620. The PIC/EIC die stack may include PIC die 630 and EIC die 640. PIC die 630 may include a back surface 633 bonded to silicon handle wafer 610. PIC die 630 may also include a front surface 631 that may include circuits or pads. EIC die 640 may include a back surface 643 that may include a redistribution layers and bonding pads 648. EIC die 640 may also include a front surface 641 that may include circuits or pads. EIC die 640 and PIC die 630 may be bonded face-to-face with each other such that front surface 631 of PIC die 630 and front surface 641 of EIC die 640 may directly face each other and the interconnections can be short. PIC die 630 may include waveguides 632 and 636, and photodetectors 634. EIC die 640 may include some through-silicon vias (TSVs) 646 and control logic circuits 644. A photodetector 634 may detect a single photon from waveguide 632, and send the detection result to control logic circuit 644, which may determine whether and how to tune waveguide 636 (e.g., to turn on or off an optical switch). Bonding pads 648 may be connected to control logic circuits 644 through TSVs, and may also be connected to solder pads 626 on PCB 620 through bonding wires 642.

Figure 8:
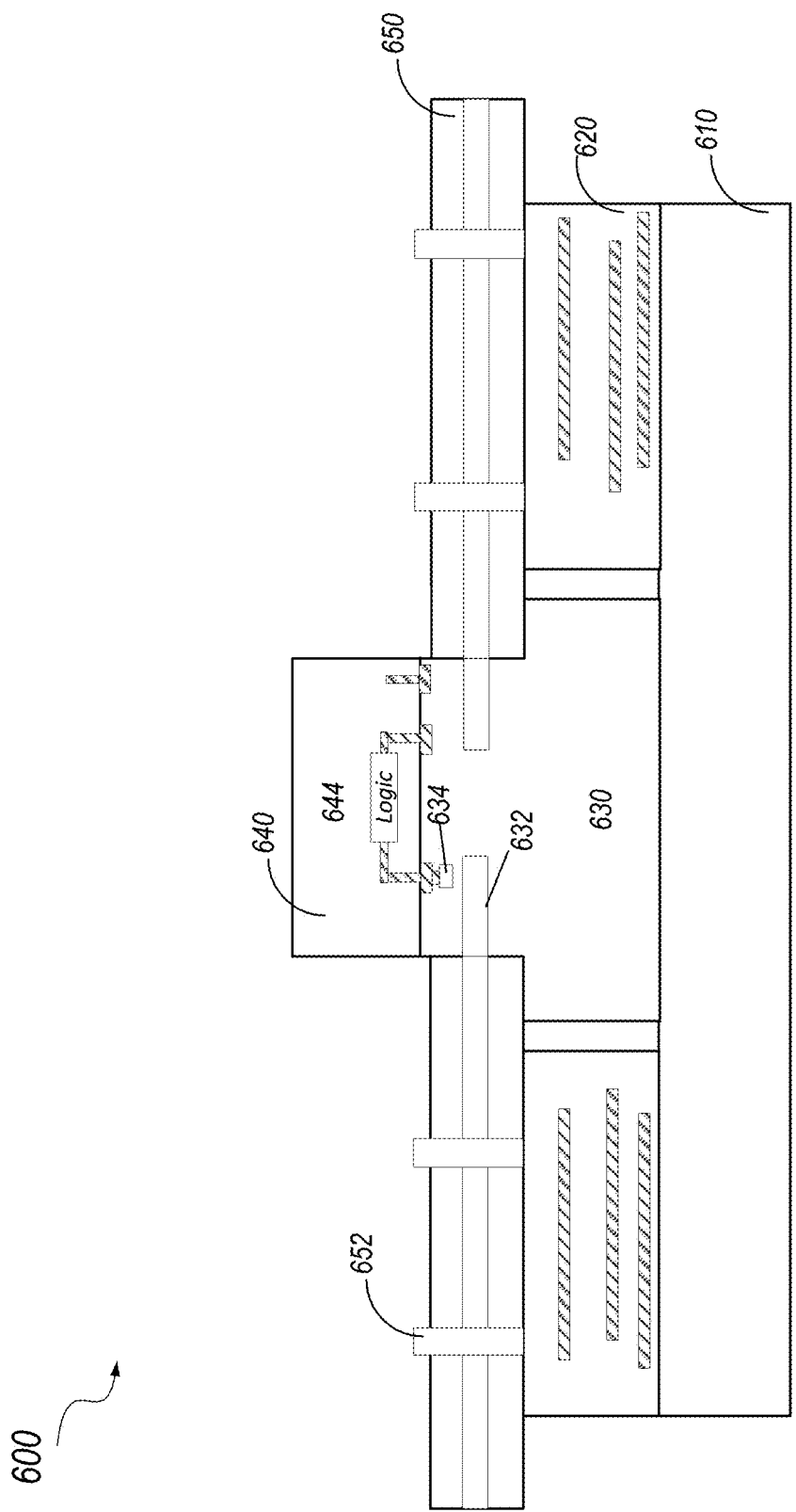
FIG. 8 is another across-sectional view of the example package shown in FIG. 6 according to certain embodiments.

FIG. 8 is another cross-sectional view of package 600 along line B-B shown in FIG. 6 according to certain embodiments. FIG. 8 shows that, in the B-B direction, optical fibers 650 may be attached to PCB 620 through harnesses 652. Optical fibers 650 may fit in V-grooves formed on PIC die 630, where the V-grooves may align with the waveguides on PIC die 630. Therefore, when assembled, the cores of optical fibers may align with corresponding cores of the waveguides on PIC die 630.

Figure 9:
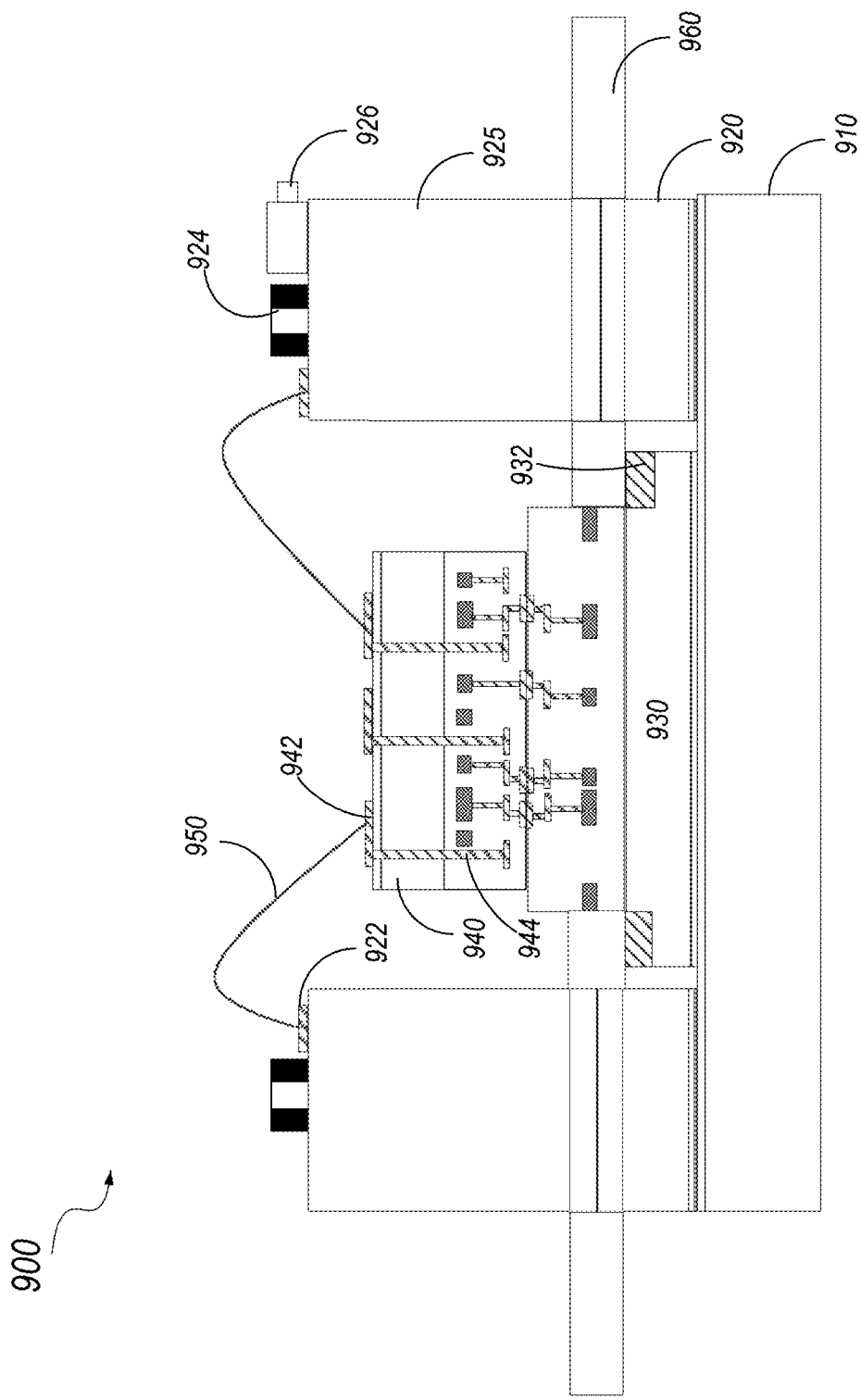
FIG. 9 is a cross-sectional view of an example of a package according to certain embodiments.

FIG. 9 is a cross-sectional view of an example of a package 900 according to certain embodiments. Package 900 may include a PIC die 930, an EIC die 940, and a PCB 920 on a silicon handle wafer 910. Even though FIG. 9 only shows one PIC/EIC die stack, multiple PIC/EIC die stacks can be included in package 900. As illustrated, PCB 920 may be attached to silicon handle wafer 910, e.g., using an epoxy or through fusion bonding or hybrid bonding, where the bonding method may depend on the material of PCB 920. As described above, one or more PCBs may be attached to silicon handle wafer 910 at different horizontal or vertical locations. For example, a second PCB 925 may be bonded on top of PCB 920. PCB 920 may also include electrical connectors 926 and some other electronic components, such as voltage regulators, power management ICs, decoupling capacitors 924, etc.

The PIC/EIC die stack may include EIC die 940 bonded face-to-face with PIC die 930 (e.g., by fusion bonding or hybrid bonding) such that the PICs may directly face the EICs and some pads or traces on the PICs and EICs may be in direct contact to minimize the lengths of the interconnects. The PIC/EIC die stack may be bonded to silicon handle wafer 910 by, for example, fusion bonding. EIC die 940 may include bonding pads 942 on the back side (i.e., substrate) of EIC die 940, where bonding pads 942 may be connected to the EICs on EIC die 940 through TSVs 944 as described above with respect to, for example, FIG. 7. EIC die 940 may be electrically connected to PCB 920 by bonding wires 950 that may connect solder pads 922 on second PCB 925 and bonding pads 942 on the back side of EIC die 940.

Optical fibers 960 may be attached to PCB 920 and may fit in V-grooves 932 formed on PIC die 930. V-grooves 932 may align with the waveguides on PIC die 930. Therefore, when assembled, the cores of optical fibers 960 may align with corresponding cores of the waveguides on PIC die 930. As shown in FIG. 9, optical fibers 960 may be sandwiched between and secured by PCB 920 and second PCB 925. For example, optical fibers 960 may first be attached to PCB 920 and fit in V-grooves 932 to align with waveguides on PIC dies 930, and second PCB 925 may then be bonded on top of PCB 920 and optical fibers 960 to secure optical fibers 960.

Figure 10:
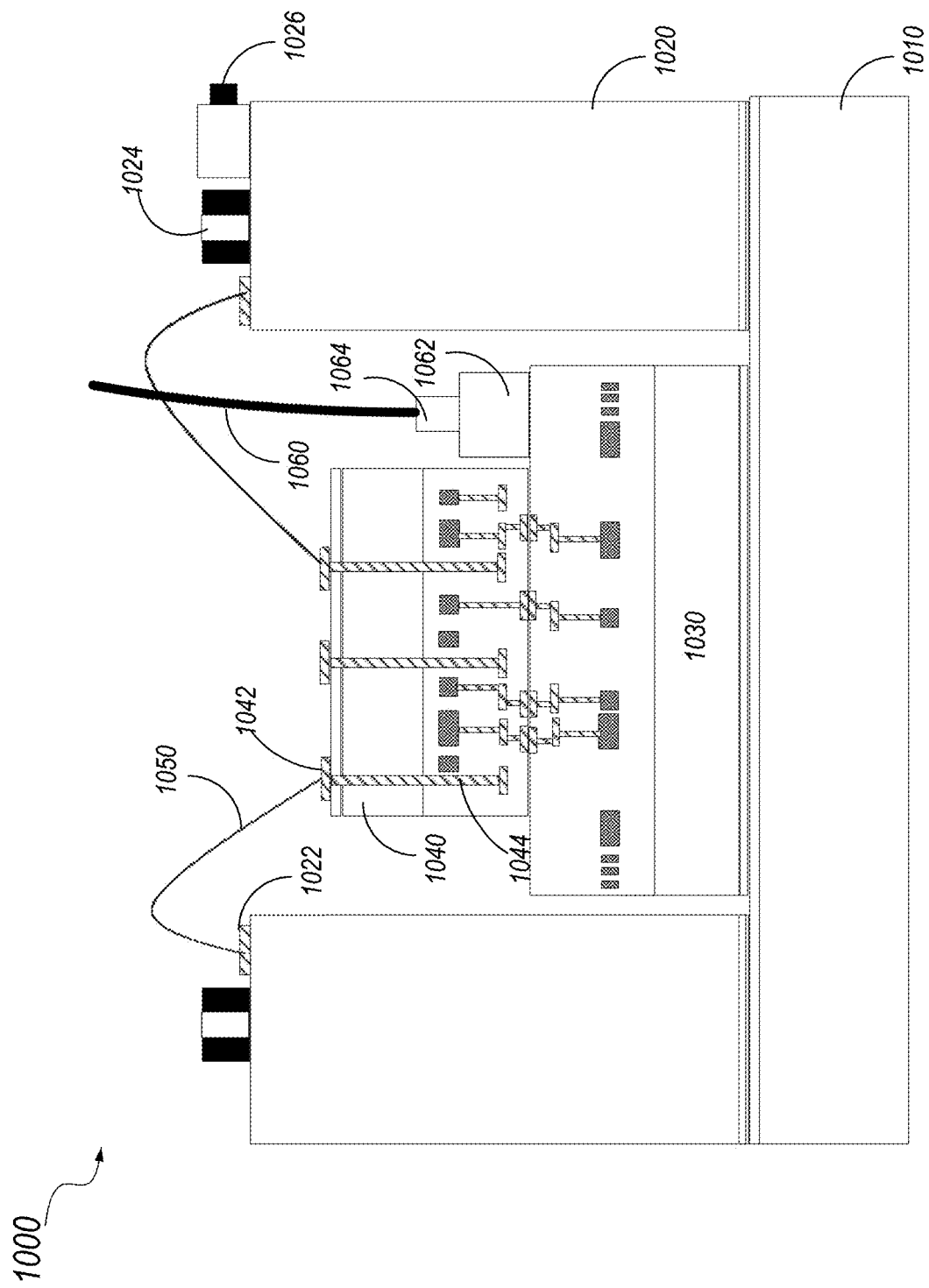
FIG. 10 is a cross-sectional view of an example of a package according to certain embodiments.

FIG. 10 is a cross-sectional view of an example of a package 1000 according to certain embodiments. Package 1000 may include a PIC die 1030, an EIC die 1040, and a PCB 1020 on a silicon handle wafer 1010. Even though FIG. 10 only shows one PIC/EIC die stack, multiple PIC/EIC die stacks can be included in package 1000. As illustrated, PCB 1020 may be attached to silicon handle wafer 1010, e.g., using an epoxy or through fusion bonding or hybrid bonding, where the bonding method may depend on the material of PCB 1020. PCB 1020 may have a height or thickness less than, equal to, or greater than the height or thickness of the PIC/EIC die stack that includes EIC die 1040 bonded with PIC die 1030. PCB 1020 may include electrical connectors 1026 and some other electronic components, such as voltage regulators, power management ICs, decoupling capacitors 1024, solder pads 1022, etc.

EIC die 1040 may be bonded face-to-face with PIC die 1030 (e.g., by fusion bonding or hybrid bonding) such that the PICs may directly face the EICs to reduce the length of the interconnects between the PICs and the EICs. The PIC/EIC die stack may be bonded to silicon handle wafer 1010 by, for example, fusion bonding. EIC die 1040 may include bonding pads 1042 on the back side of EIC die 1040, where bonding pads 1042 may be connected to the EICs on EIC die 1040 through TSVs 1044 as described above with respect to, for example, FIG. 7. EIC die 1040 may be electrically connected to PCB 1020 by bonding wires 1050, which may connect solder pads 1022 on PCB 1020 and bonding pads 1042 on the back side of EIC die 1040.

As shown in FIG. 10, optical fibers 1060 may be vertically coupled to the PICs on PIC die 1030 by one or more couplers 1062 (e.g., prisms). Couplers 1062 may be bonded to PIC die 1030 and may be aligned with the waveguides on PIC die 1030. Optical fibers 1060 may each include a collimation lens 1064 (e.g., a GRIN lens or a micro-lens) on one end, and may be coupled to couplers 1062 for coupling light from optical fibers 1060 into the waveguides on PIC die 1030.

Figure 11:
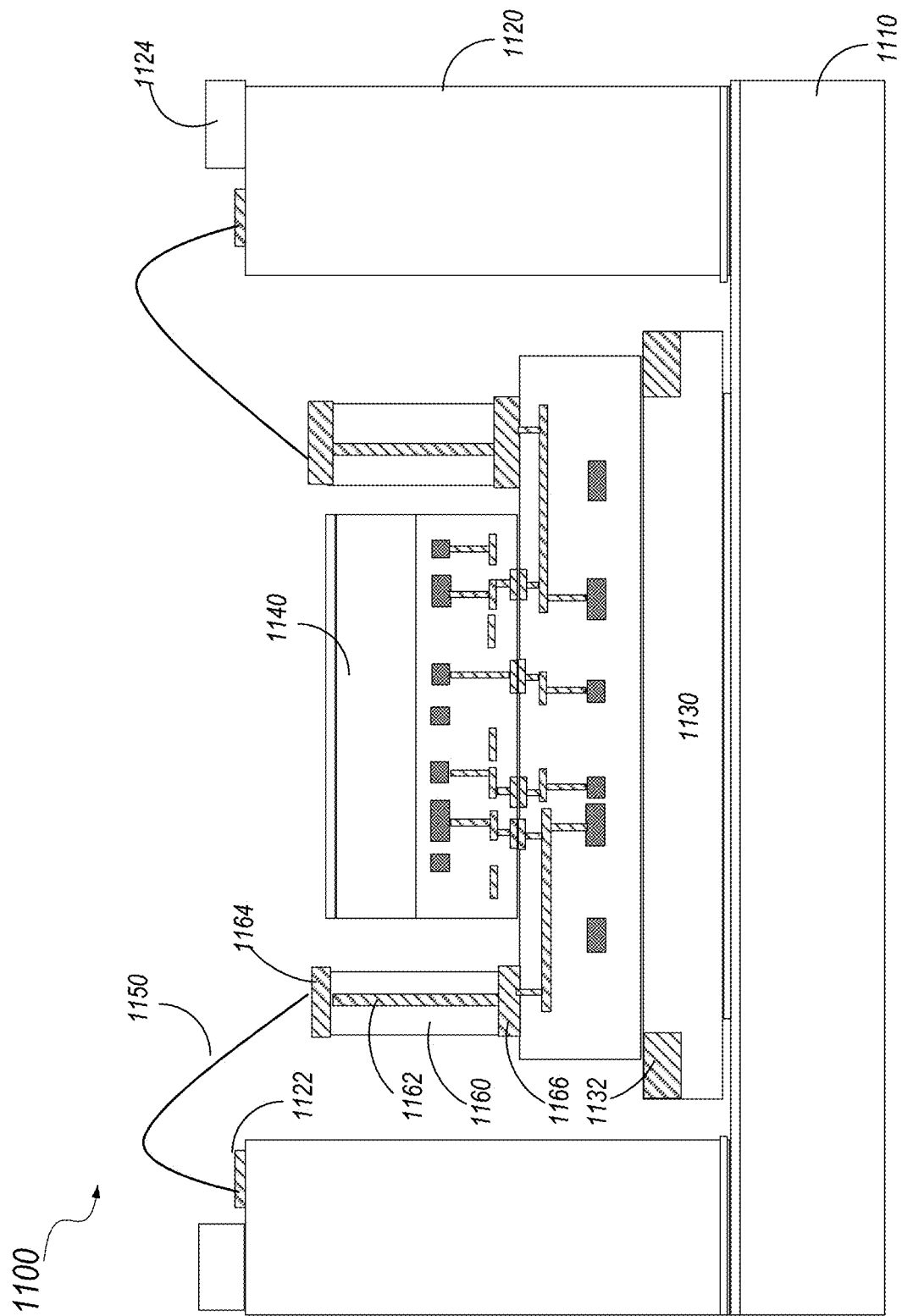
FIG. 11 is a cross-sectional view of an example of a package including through-glass vias (TGVs) according to certain embodiments.

FIG. 11 is a cross-sectional view of an example of a package 1100 including through-glass vias (TGVs) 1162 according to certain embodiments. Package 1100 may include a PIC die 1130, an EIC die 1140, and a PCB 1120 on a silicon handle wafer 1110. Even though FIG. 11 only shows one PIC/EIC die stack, multiple PIC/EIC die stacks can be included in package 1100 and bonded on silicon handle wafer 1110. As illustrated, PCB 1120 is attached to silicon handle wafer 1110, e.g., using an epoxy or through fusion bonding or hybrid bonding. As described above, one or more PCBs may be attached to silicon handle wafer 1110 at different horizontal or vertical locations. For example, PCB 1120 may include two or more PCBs bonded vertically as described above with respect to, for example, FIG. 9. PCB 1120 may also include some electronic components, such as voltage regulators, power management ICs, decoupling capacitors 1124, connectors, etc.

The PIC/EIC die stack may include EIC die 1140 bonded face-to-face with PIC die 1130 (e.g., by fusion bonding or hybrid bonding) such that the PICs may directly face the EICs. As described above, the PIC/EIC die stack may be bonded to silicon handle wafer 1110 by, for example, fusion bonding. EIC die 1140 may not include TSVs or bonding pads on the back side. Rather, a glass substrate 1160 with through-glass vias (TGVs) 1162 may be bonded to PIC die 1130. Contact pads 1166 on one side of glass substrate 1160 may be coupled to bonding pads 1164 on the other side of glass substrate 1160 through TGVs 1162. Contact pads 1166 may be coupled to the PICs on PIC die 1130 and/or the EICs on EIC die 1140. Bonding pads 1164 may be electrically connected to solder pads 1122 on PCB 1120 by bonding wires 1150. In some embodiments, glass substrate 1160 may have a length about 2-3 mm, a width about 1-3 mm, and a height about 20-25 mm.

Using TGVs instead of TSVs may leave more silicon areas for the EICs, and thus may reduce the size of EIC dies 1040. In addition, without TSVs on EIC die 1140, the processing steps for manufacturing EIC die 1140 may be significantly reduced, and thus may further reduce the cost of manufacturing EIC die 1140. Furthermore, glass (e.g., silicon dioxide) may be a much better insulator than silicon, and thus TGVs 1162 may have much lower RC losses than TSVs. In some embodiments, TGVs 1162 may include a power distribution network that may distribute electrical power from PCB 1120 to circuits or traces on PIC die 1130, which may then deliver the electrical power to circuits in EIC die 1140. For example, TGVs 1162 may distribute the electrical power from one bonding wire 1150 to multiple pads or traces on PIC die 1130 using multiple vias. In this way, the impedance of the power distribution network may be reduced and thus the IR losses (which may be converted to heat) can be reduced. In addition, the inductance of the power distribution network may be reduced and the response time of the power distribution network may be reduced (i.e., the bandwidth of the power distribution network may be increased).

Optical fibers may also be attached to PCB 1120 and may fit in V-grooves 1132 formed on PIC die 1130. V-grooves 1132 may align with the waveguides on PIC die 1130. Therefore, when assembled, the cores of the optical fibers in V-grooves 1132 may align with corresponding cores of the waveguides on PIC die 1130. As described above with respect to FIG. 9, the optical fibers may be sandwiched between and secured by PCB 1120.

The above described techniques can be used to assemble or package other circuits for the desired thermal and electrical performance. For example, the techniques can also be used to package one or more silicon ICs on a silicon-based package substrate, or package one or more ICs on a non-silicon package substrate.

Although not shown in the figures, in some embodiments, a cooling device (e.g., a cold head) may be attached to the silicon handle wafer (e.g., silicon handle wafer 440, 610, 910, 1010, or 1110) to cool down the PIC dies and/or the EIC dies such that the PICS and/or the EICs may work at the desired temperature, such as a cryogenic temperature.

In many circumstances, most of the thermal energy generated by the packaged device described above may be generated by the EICs on the EIC die. In some embodiments described above where the thermal energy generated by the EIC die may be dissipated through the PIC die and the handle wafer to the cooling device, the thermal energy generated by the EICs may affect the performance of the PICS. Thus, additional cooling mechanisms that can help to dissipate heat from the EIC through a more direct and shorter path, without going through the PICS, may help to maintain the cryogenic temperature at the PICS.

According to certain embodiments, an optional top cooling plate may be bonded to the EIC directly to conduct thermal energy from the EIC. The top cooling plate may be a silicon substrate similar to the silicon handle wafers described above, which may have a coefficients of thermal expansion (CTE) matching the CTE of the substrate of the EIC die. In some embodiments, the top cooling plate may include a metal plate or metal structure. The top cooling plate may include mesa structures formed thereon. For example, mesa structures may be formed on a silicon handle wafer or a metal plate by etching or micromachining. The top cooling plate may be bonded to one or more EIC dies through the mesa structures. In some embodiments, the mesa structures may be coated with one or more metal layers (e.g., gold, gold alloy, titanium, and nickel) or an epoxy layer to reduce the thermal resistance at the interface between the substrate of the EIC dies and the mesa structures.

Figure 12:
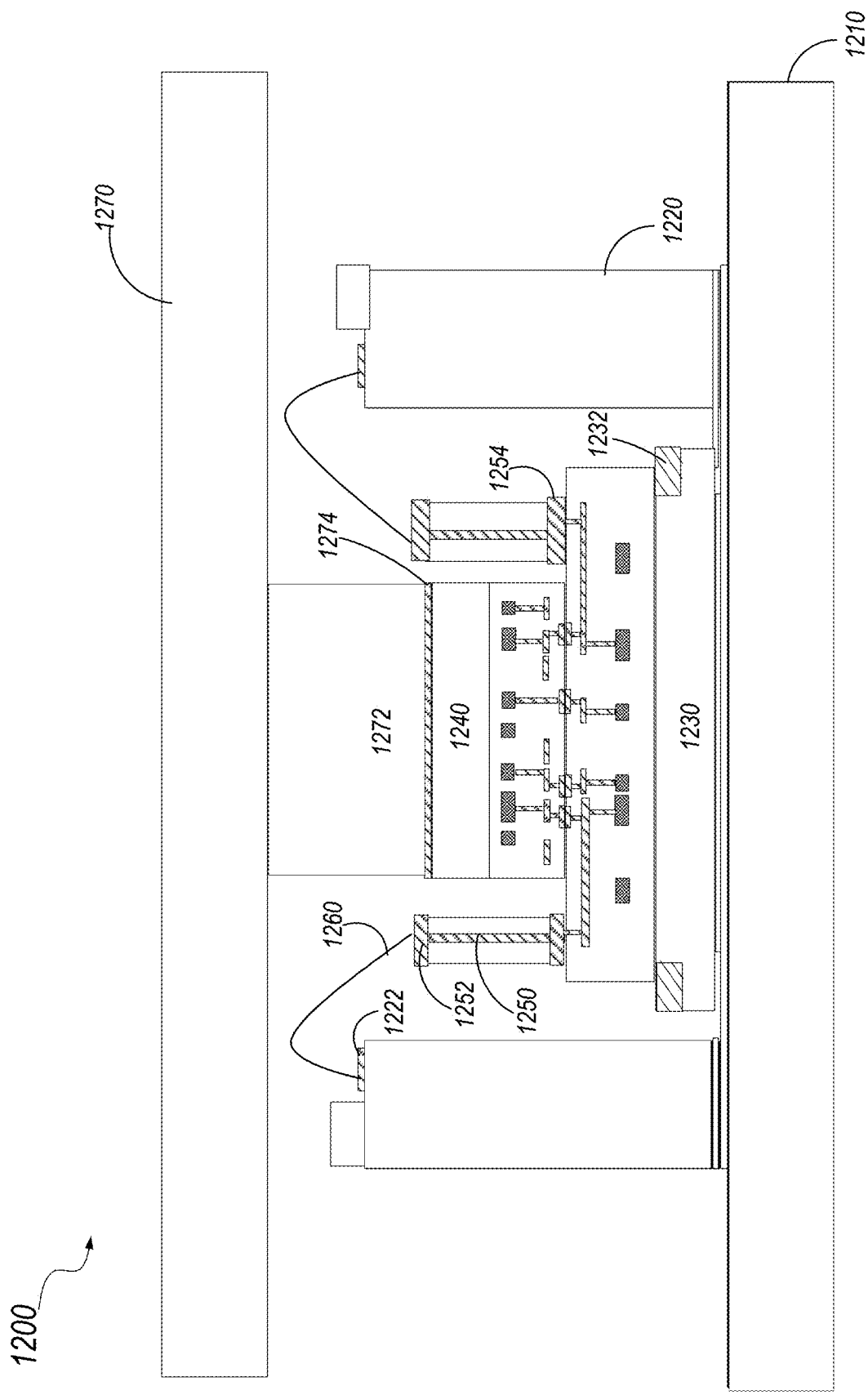
FIG. 12 is a cross-sectional view of an example of a package including TGVs and a top cooling plate according to certain embodiments.

FIG. 12 is a cross-sectional view of an example of a package 1200 including TGVs 1250 and a top cooling plate 1270 according to certain embodiments. As described above with respect to package 1100 of FIG. 11, package 1200 may also include a PIC die 1230, an EIC die 1240, and a PCB 1220 on a silicon handle wafer 1210. Even though FIG. 12 only shows one PIC/EIC die stack, multiple PIC/EIC die stacks can be bonded on silicon handle wafer 1210. As illustrated, PCB 1220 is attached to silicon handle wafer 1210, e.g., using an epoxy or through fusion bonding or hybrid bonding. As described above, one or more PCBs may be attached to silicon handle wafer 1210 at different horizontal or vertical locations. PCB 1220 may include some electronic components, such as voltage regulators, power management ICs, decoupling capacitors, connectors, etc.

EIC die 1240 and PIC die 1230 in the die stack may be bonded (e.g., by fusion bonding or hybrid bonding) face-to-face with each other such that the PICS may directly face the EICs. As described above, the PIC/EIC die stack may be bonded to silicon handle wafer 1210 by, for example, fusion bonding the substrate of PIC die 1230 to silicon handle wafer 1210. Through-glass vias (TGVs) 1250 may be bonded to PIC die 1230 as described above with respect to FIG. 11. Contact pads 1252 on one side of TGVs 1250 may be electrically connected to solder pads 1222 on PCB 1220 by bonding wires 1260. Contact pads 1254 on the other side of TGVs 1250 may be coupled to the PICS on PIC die 1230 and/or the EICs on EIC die 1240. PIC die 1230 may also include V-grooves 1232 aligned with the waveguides on PIC die 1130 for aligning optical fibers with the waveguides.

In some embodiments, package 1200 may also include a top cooling plate 1270 that includes one or more mesa structures 1272 formed thereon. In some embodiments, only mesa structures 1272 (e.g., a metal block) may be used. As described above, top cooling plate 1270 may be a silicon substrate similar to silicon handle wafer 1210, and may have a coefficients of thermal expansion (CTE) matching the CTE of the substrate of the EIC die 1240. In some embodiments, top cooling plate 1270 may include a metal plate. Mesa structures 1272 may be formed on top cooling plate 1270 (e.g., a silicon handle wafer or a metal plate) by etching or micromachining. Top cooling plate 1270 may be bonded to one or more EIC dies 1240 through mesa structures 1272. Because TGVs 1250, rather than TSVs in EIC die 1240, are used to connect PCB 1220 to the PICS and EICs, the contact area between EIC die 1240 and top cooling plate 1270 may be maximized to improve the thermal conductivity. In some embodiments, the surface of mesa structures 1272 may be coated with one or more metal layers 1274 (e.g., including 3-D printed gold or gold alloy, titanium, or nickel) or an epoxy layer to improve the thermal conductivity at the interface between the substrate of EIC dies 1240 and mesa structures 1272. In some embodiments, the area on EIC die 1240 that may contact a mesa structure 1272 may also be coated with a metal layer or an epoxy before bonding with mesa structure 1272. In some embodiments, a cooling device (e.g., a cold head) may be attached to the top cooling plate to take heat away from EIC die 1240.

Figure 13:
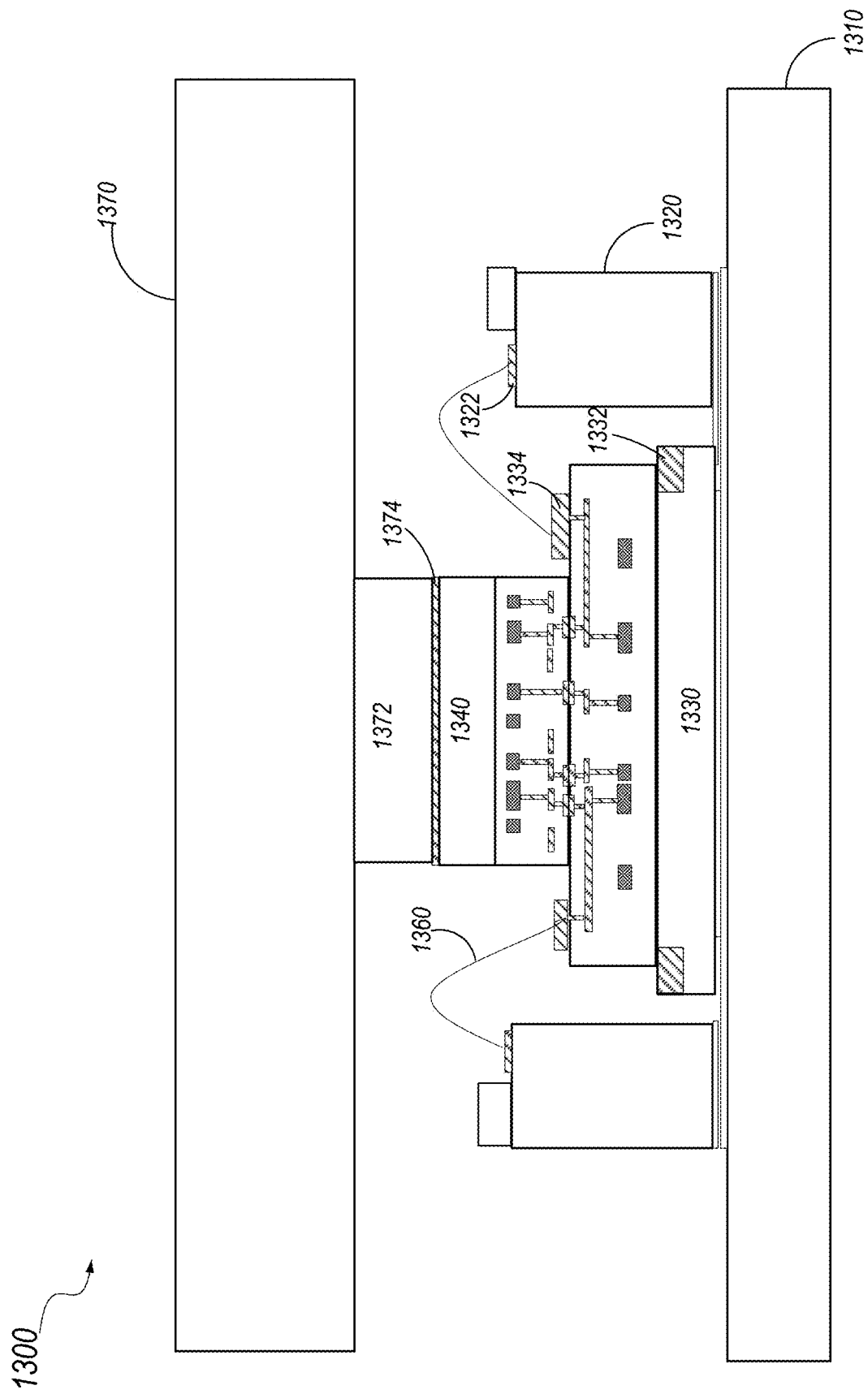
FIG. 13 is a cross-sectional view of an example of a package including a top cooling plate according to certain embodiments.

FIG. 13 is a cross-sectional view of an example of a package 1300 including a top cooling plate 1370 according to certain embodiments. Package 1300 may be similar to package 1200, but may not use TGVs. Package 1300 may also include a PIC die 1330, an EIC die 1340, and a PCB 1320 bonded on a handle wafer 1310. Even though FIG. 13 only shows one PIC/EIC die stack, multiple PIC/EIC die stacks can be bonded on handle wafer 1310. PCB 1320 may be attached to handle wafer 1310, e.g., using an epoxy or through fusion bonding or hybrid bonding. EIC die 1340 and PIC die 1330 in a die stack may be bonded (e.g., by fusion bonding or hybrid bonding) face-to-face with each other, and the PIC/EIC die stack may be bonded to handle wafer 1310 by, for example, fusion bonding the substrate of PIC die 1330 to handle wafer 1310. Contact pads 1334 on PIC die 1330 may be electrically connected to solder pads 1322 on PCB 1320 by bonding wires 1360. PIC die 1330 may also include V-grooves 1332 aligned with the waveguides on PIC die 1130 for aligning optical fibers with the waveguides.

Package 1300 may also include a top cooling plate 1370 that includes one or more mesa structures 1372 formed thereon. Top cooling plate 1370 may be similar to top cooling plate 1270, and may be bonded to one or more EIC dies 1340 through mesa structures 1372. In some embodiments, the surface of mesa structures 1372 may be coated with one or more metal layers 1374 (e.g., including 3-D printed gold or gold alloy, titanium, or nickel) or an epoxy layer to improve the thermal conductivity at the interface between the substrate of EIC dies 1340 and mesa structures 1372. In some embodiments, the area on the substrate of EIC die 1340 that may contact a mesa structure 1372 may also be coated with a metal layer or an epoxy before bonding with mesa structure 1372. In some embodiments, a cooling device (e.g., a cold head) may be attached to the top cooling plate to take heat away from EIC die 1340. Because no TSVs are used in EIC die 1340, the contact area between the substrate of EIC die 1340 and mesa structure 1372 may be maximized to improve the thermal conductivity at the interface between EIC die 1340 and mesa structure 1372.

Figure 14:
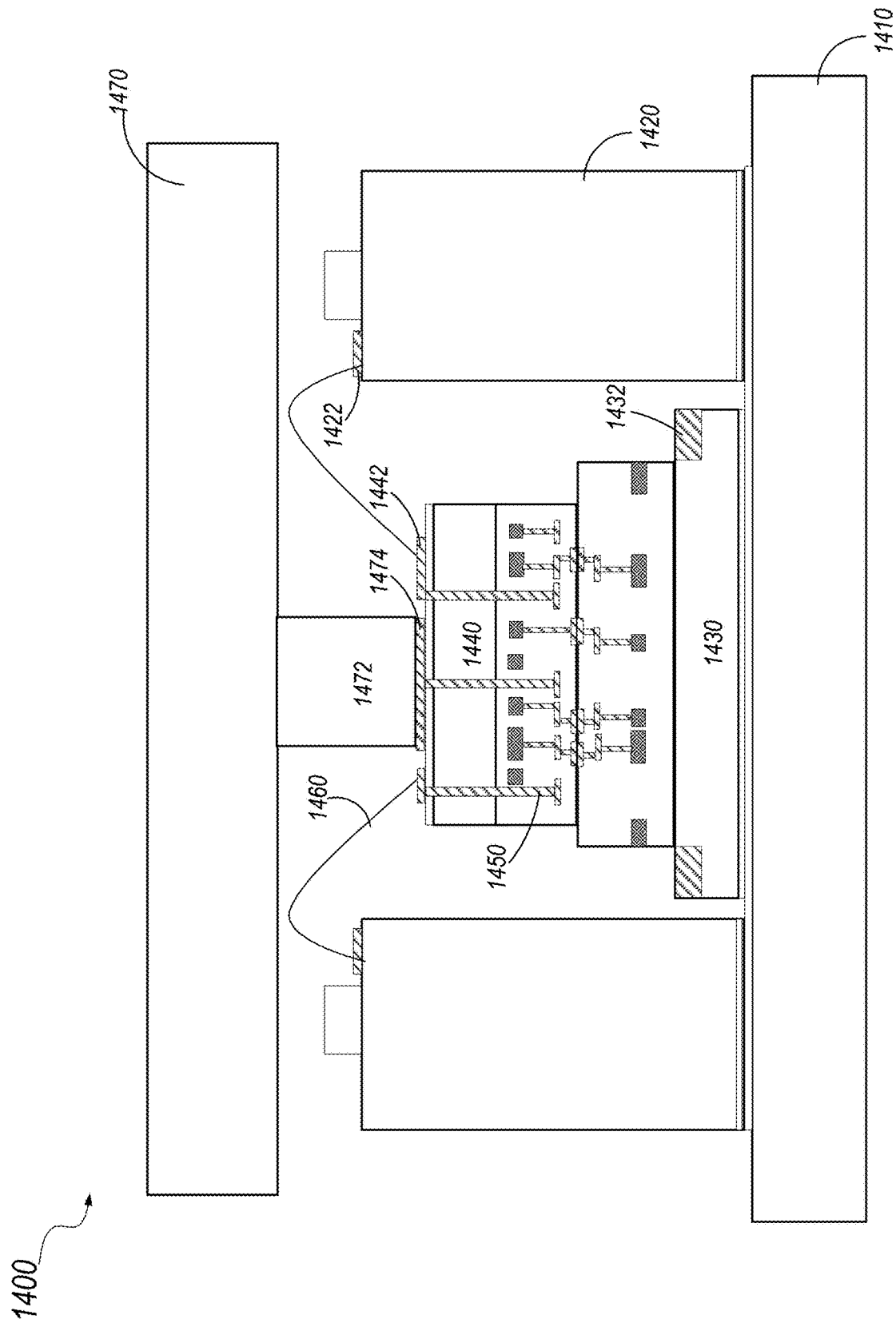
FIG. 14 is a cross-sectional view of an example of a package including a top cooling plate according to certain embodiments.

FIG. 14 is a cross-sectional view of an example of a package 1400 including a top cooling plate 1470 according to certain embodiments. Package 1400 may be similar to package 900, and may include a PIC die 1430, an EIC die 1440, and a PCB 1420 bonded on a handle wafer 1410. Even though FIG. 14 only shows one PIC/EIC die stack, multiple PIC/EIC die stacks can be bonded on handle wafer 1410. PCB 1420 may be attached to handle wafer 1410, e.g., using an epoxy or through fusion bonding or hybrid bonding. EIC die 1440 and PIC die 1430 in a die stack may be bonded (e.g., by fusion bonding or hybrid bonding) face-to-face with each other, and the PIC/EIC die stack may be bonded to handle wafer 1410 by, for example, fusion bonding the substrate of PIC die 1430 to handle wafer 1410. EIC die 1440 may include bonding pads 1442 on the back side (i.e., the substrate) of EIC die 1440, where bonding pads 1442 may be connected to the EICs on EIC die 1440 through TSVs 1450 as described above with respect to, for example, FIG. 7. EIC die 1440 may be electrically connected to PCB 1420 by bonding wires 1450 which may connect solder pads 1422 on PCB 1420 and bonding pads 1442 on the back side of EIC die 1440. PIC die 1430 may also include V-grooves 1432 aligned with the waveguides on PIC die 1130 for aligning optical fibers with the waveguides.

Package 1400 may also include a top cooling plate 1470 that includes one or more mesa structures 1472 formed thereon. Top cooling plate 1470 may be similar to top cooling plate 1270, and may be bonded to one or more EIC dies 1440 through mesa structures 1472. In some embodiments, the surface of mesa structures 1472 may be coated with one or more metal layers 1474 (e.g., including 3-D printed gold or gold alloy, titanium, or nickel) or an epoxy layer to improve the thermal conductivity at the interface between the substrate of EIC dies 1440 and mesa structures 1472. In some embodiments, the area on the substrate of EIC die 1440 that may contact a mesa structure 1472 may also be coated with a metal layer or an epoxy before bonding with mesa structure 1472. In some embodiments, a cooling device (e.g., a cold head) may be attached to the top cooling plate to take heat away from EIC die 1440.

In some embodiments, one or more die stacks may be bonded on a cooling plate (e.g., a handle wafer or a metal plate) through the substrates of the EIC dies, rather than the substrates of the PIC dies. For example, the EIC/PIC (EPIC) die stacks may be bonded on top of a handle wafer by fusion bonding the substrates of the EIC dies to the handle wafer. The EPIC die stacks may also be bonded on top of mesa structures formed on the handle wafer or the cooling plate, for example, using gold plating layers or other metal layers coated on the mesa structures and/or the substrates of the EIC dies. In this way, the heat generated by the EICs may be dissipated through the cooling plate without going through the more thermally sensitive PICS.

Figure 15:
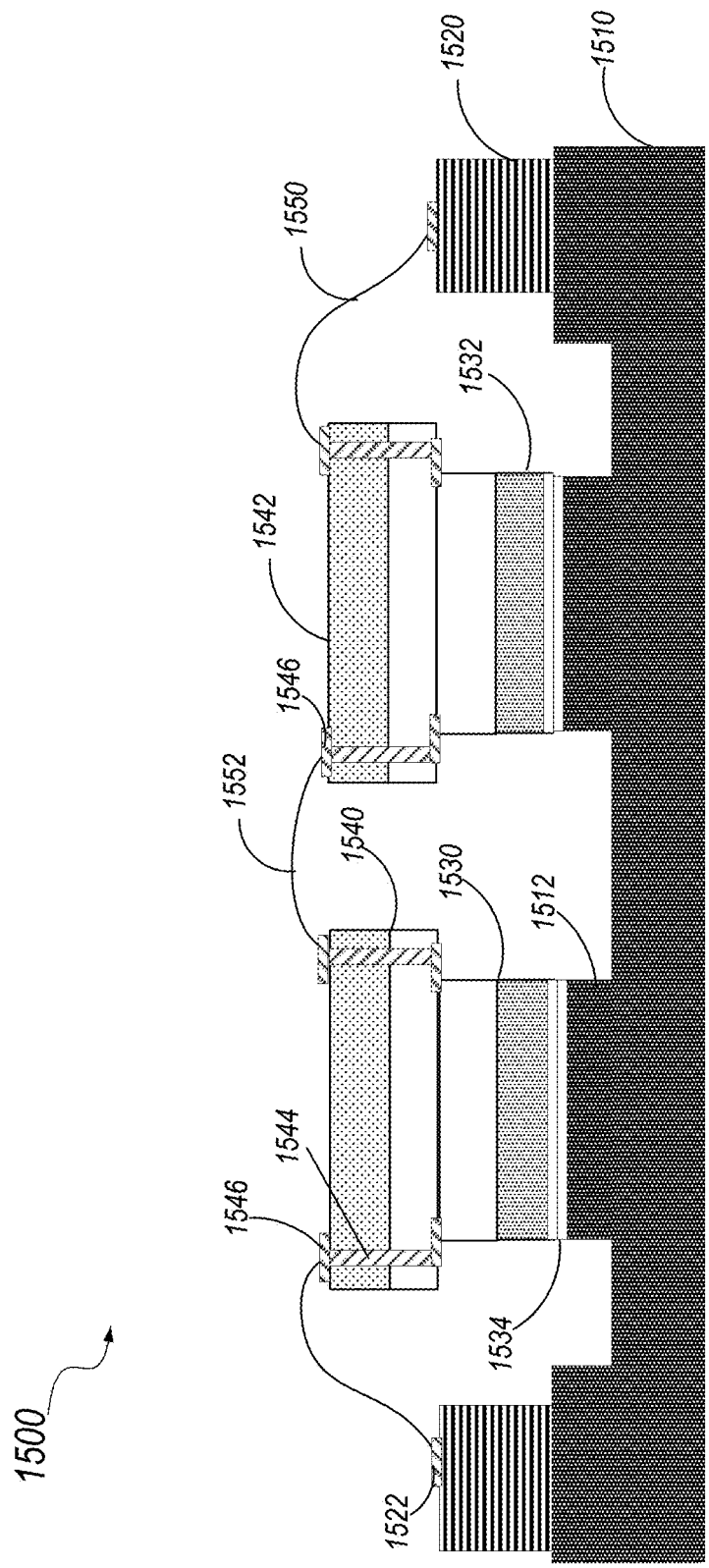
FIG. 15 is a cross-sectional view of an example of a package including multiple die stacks according to certain embodiments.

FIG. 15 is a cross-sectional view of an example of a package 1500 including multiple PIC/EIC die stacks bonded on a cooling plate 1510 according to certain embodiments. As described above, cooling plate 1510 may include a silicon handle wafer or a metal plate. In some embodiments, mesa structures 1512 may be formed on cooling plate 1510, for example, by dry or wet etching or micro-machining. Each PIC/EIC die stack may include an EIC die 1530 and a PIC die 1540 bonded face-to-face as described above (e.g., through fusion bonding or hybrid bonding) such that the length of the interconnects between the PICs and EICs can be minimized. Substrates 1532 of EIC dies 1530 may be bonded to cooling plate 1510 (e.g., mesa structures 1512 on cooling plate 1510) using an epoxy or through fusion bonding or hybrid bonding. For example, a metal layer 1534 (e.g., gold or other metal or metal alloy) or an epoxy layer may be formed on the top surfaces of mesa structures 1512 and/or substrates 1532 of EIC dies 1530 for bonding the die stacks to cooling plate 1510 and for improving the thermal conductivity at the interface. A cooling device (e.g., a cold head) may be attached to cooling plate 1510 to take away the thermal energy generated by the EICs through cooling plate 1510.

PCBs 1520 may also be bonded on cooling plate 1510, such as mesa structures 1512 of cooling plate 1510, using an epoxy or through fusion bonding or hybrid bonding. As described above, in some embodiments, PCBs 1520 may include a semiconductor substrate. Electric power and data signals may be delivered to the die stacks through PCBs 1520 and bonding wires 1550, which may be bonded to solder pads 1522 on PCBs 1520 and bonding pads 1546 on substrates 1542 of PIC dies 1540. Bonding pads 1546 on substrates 1542 of PIC dies 1540 may be connected to the photonic integrated circuits and the electronic integrated circuits through TSVs 1544. Different die stacks may be connected together through bonding wires 1552. In some embodiments, a top cooling plate, such as top cooling plate 1270, 1370, or 1470, may be bonded to substrates 1542 of PIC dies 1540.

The methods and processes described above are some example techniques for fabricating hybrid systems that include photonic integrated circuits and electronic integrated circuits in a same package. In other embodiments, different methods, processes, and/or interconnecting devices may be used to integrate photonic integrated circuits and electronic integrated circuits in a same package to achieve the desired functional, mechanical, thermal, and other performance. For example, as described in detail below, the silicon handle wafer with the die stacks bonded thereon may be coupled to a metal studs and a thicker platform wafer (e.g., a thick silicon wafer or metal wafer) to achieve the desired mechanical strength and thermal conductivity.

Figure 16:
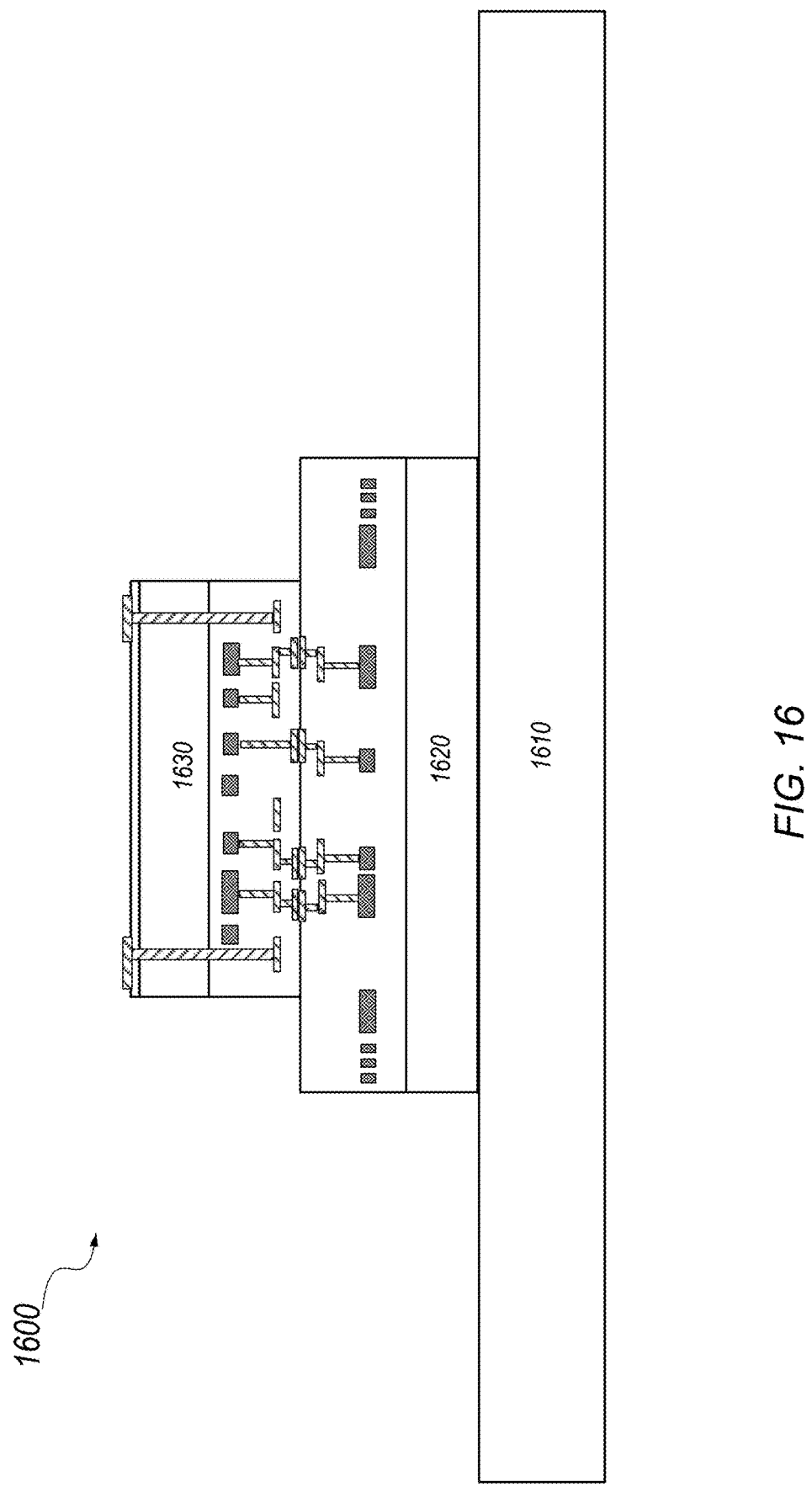
FIG. 16 is a cross-sectional view of an example of a package including a PIC and an EIC on a silicon handle wafer according to certain embodiments.

FIG. 16 is a cross-sectional view of an example of a package 1600 including a PIC 1620 and an EIC 1630 on a silicon handle wafer 1610 according to certain embodiments. Silicon handle wafer 1610 may include a thin silicon substrate with a thickness about, for example, 1 mm. As described above, PIC 1620 may include photonic integrated circuits, such as waveguides, photodetectors, optical couplers, switches, and the like. EIC 1630 may include, for example, controllers, logic circuits, device drivers, through silicon vias, bonding traces and/or pads, and the like. PIC 1620 and EIC 1630 may be bonded to form a die stack as described above with respect to, for example, FIGS. 1-4B. In the example shown in FIG. 16, silicon handle wafer 1610 may be bonded with the backside (i.e., the substrate) of PIC 1620 through, for example, fusion bonding as described above.

Figure 17:
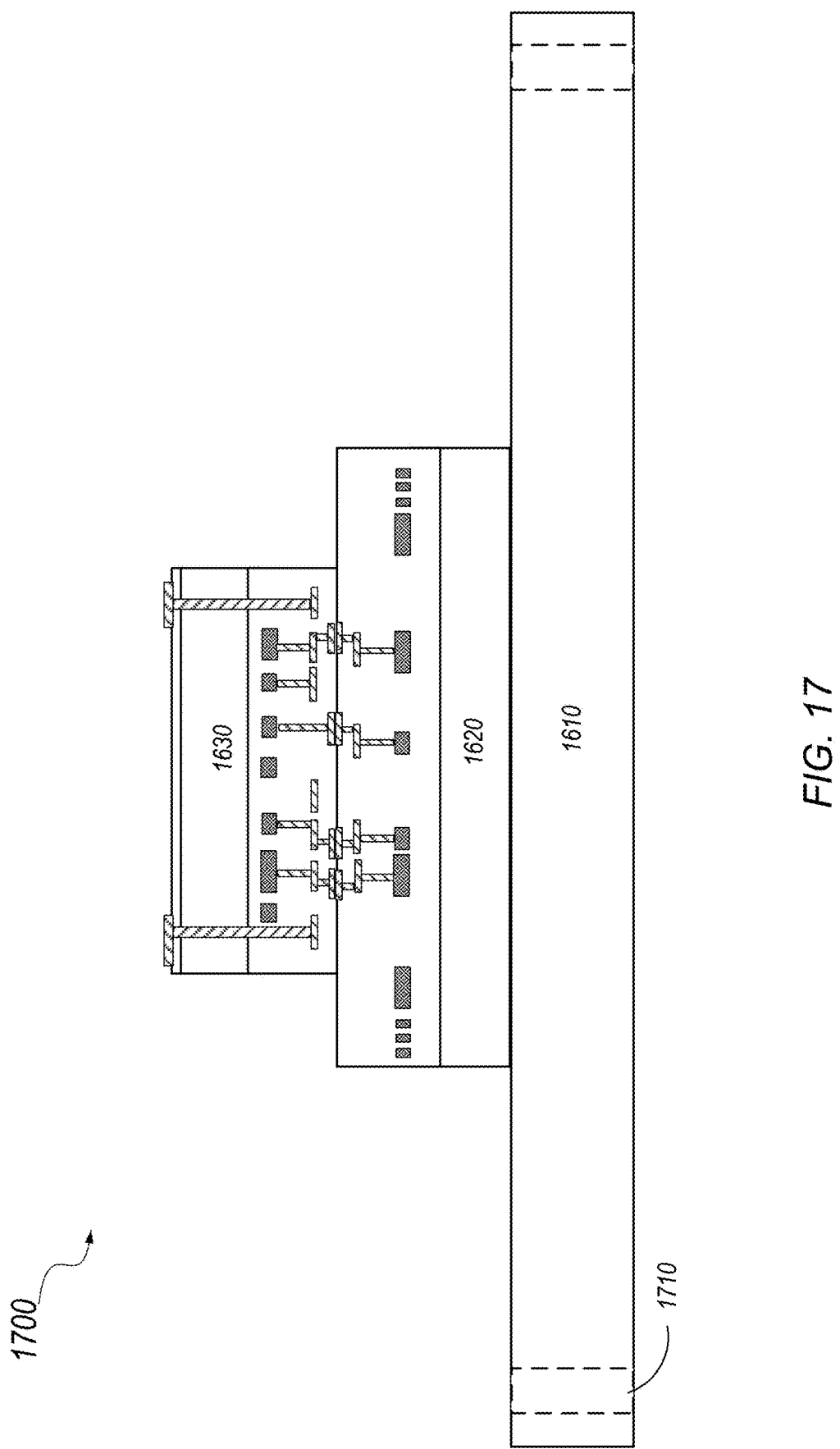
FIG. 17 is a cross-sectional view of an example of a package including a PIC and an EIC on a silicon handle wafer with holes formed thereon according to certain embodiments.

FIG. 17 is a cross-sectional view of an example of a package 1700 including PIC 1620 and EIC 1630 on silicon handle wafer 1610 with holes 1710 formed thereon according to certain embodiments. Package 1700 may be made from package 1600, where holes 1710 may be micro-machined (e.g., drilled) or etched in silicon handle wafer 1610 from the top side or bottom side. Holes 1710 may have a diameter less than, equal to, or greater than about 1 mm. Holes 1710 may be formed according to a pattern in silicon handle wafer 1610 at, for example, the edge of silicon handle wafer 1610.

Figure 18:
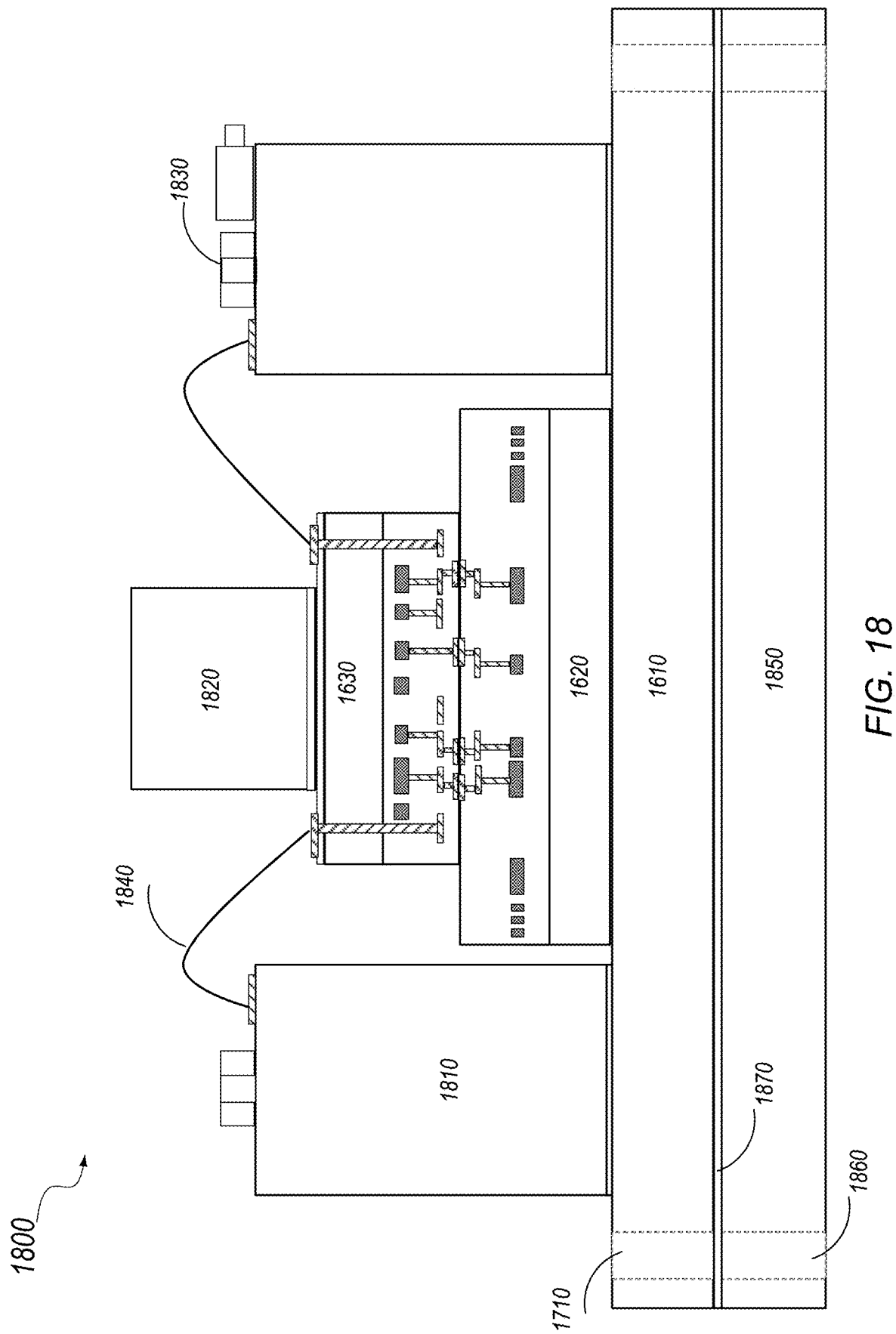
FIG. 18 is a cross-sectional view of an example of a package including a PIC, an EIC, a metal block, and PCBs 1810 on a silicon handle wafer and a platform wafer according to certain embodiments.

FIG. 18 is a cross-sectional view of an example of a package 1800 including PIC 1620, EIC 1630, a metal block 1820, and PCBs 1810 on silicon handle wafer 1610 and a platform wafer 1850 according to certain embodiments. Package 1800 may be made from package 1700. In the example shown in FIG. 18, PCBs 1810 may be bonded to silicon handle wafer 1610, various active or passive components may be installed on PCBs 1810, PCBs 1810 may be wire-bonded to EIC 1630, and a metal block 1820 (e.g., a copper block) may be bonded to EIC 1630.

As described above, PCBs 1810 may include, for example, organic materials, inorganic dielectric materials, or passive or active semiconductor materials, such as passive or active silicon interposers. PCBs 1810 may be bonded to silicon handle wafer 1610 using various techniques. For example, if silicon is used for PCBs 1810, fusion bonding techniques may be used. If oxides, such as silicon dioxide, are used for PCBs 1810, a hybrid bonding technique may be used. If other materials are used for PCBs 1810, an epoxy or an adhesive may be used to attach PCBs 1810 to the silicon handle wafer. Active or passive electrical components, such as power regulators, capacitors, inductors, or other components for power distribution, and connectors, may be installed (e.g., soldered) on PCBs 1810. PCBs 1810 may then be wire-bonded to EIC 1630. For example, metal wires 1840 may be bonded to bonding pads on PCBs 1810 and bonding pads on the back side of EIC 1630.

In some embodiments, metal block 1820, such as a copper block, may be bonded to the back side of EIC 1630. Metal block 1820 may be used as a heat sink for conducting heat from EIC 1630. In some embodiments, the surface of metal block 1820 may be coated with one or more metal layers, such as gold or gold alloy, titanium, or nickel, or an epoxy layer to improve the thermal conductivity at the interface between the substrate of EIC 1630 and metal block 1820.

In some embodiments, platform wafer 1850, which may have better mechanical strength and/or thermal conductivity, may be attached to silicon handle wafer 1610. For example, platform wafer 1850 may include a thick silicon wafer or metal substrate. In one example, platform wafer 1850 may include a silicon wafer with a thickness about 2 cm. In some embodiments, platform wafer 1850 may be attached to silicon handle wafer 1610 using an adhesive layer 1870, which may also improve the thermal conductivity at the interface between platform wafer 1850 and silicon handle wafer 1610. Platform wafer 1850 may include holes 1860 formed thereon. Holes 1860 may be, for example, drilled in platform wafer, and may align with holes 1710 in silicon handle wafer 1610.

Figure 19:
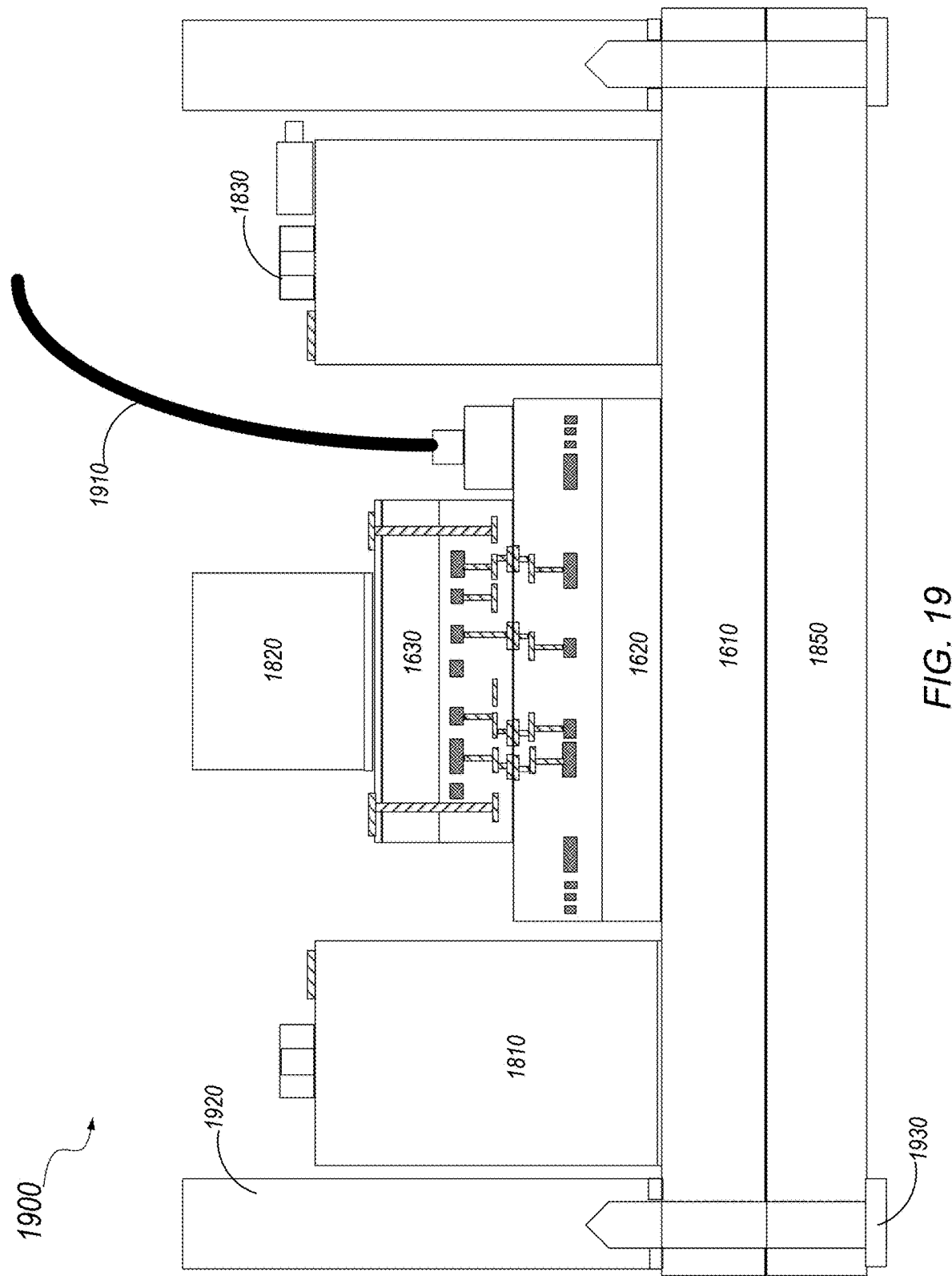
FIG. 19 is a cross-sectional view of an example of a package including a silicon handle wafer and a platform silicon wafer coupled to metal studs through fasteners according to certain embodiments.

FIG. 19 is a cross-sectional view of an example of a package 1900 including silicon handle wafer 1610 and platform wafer 1850 coupled to metal studs 1920 through fasteners 1930 according to certain embodiments. The view angle of the cross-sectional view shown in FIG. 19 may be orthogonal to the view angle of the cross-sectional view shown in FIG. 18. In the illustrated example, optical fibers 1910 may be bonded to PIC 1620, for example, through a gradient index lens, a micro-lens, and/or a coupler (e.g., a grating, a prism, a tapering waveguide, etc.).

Metal studs 1920 (e.g., copper studs) may be attached to silicon handle wafer 1610. Metal studs 1920 may include drilled holes with threads formed therein, and may align with holes 1710 in silicon handle wafer 1610 and holes 1860 in platform wafer 1850. Metal studs 1920, silicon handle wafer 1610, and platform wafer 1850 may be securely coupled together by fasteners 1930, such as screws. Metal studs 1920 and platform wafer 1850 may help to improve the mechanical strength of the packaged device and the thermal conductivity from silicon handle wafer 1610 to a heat sink.

Figure 20:
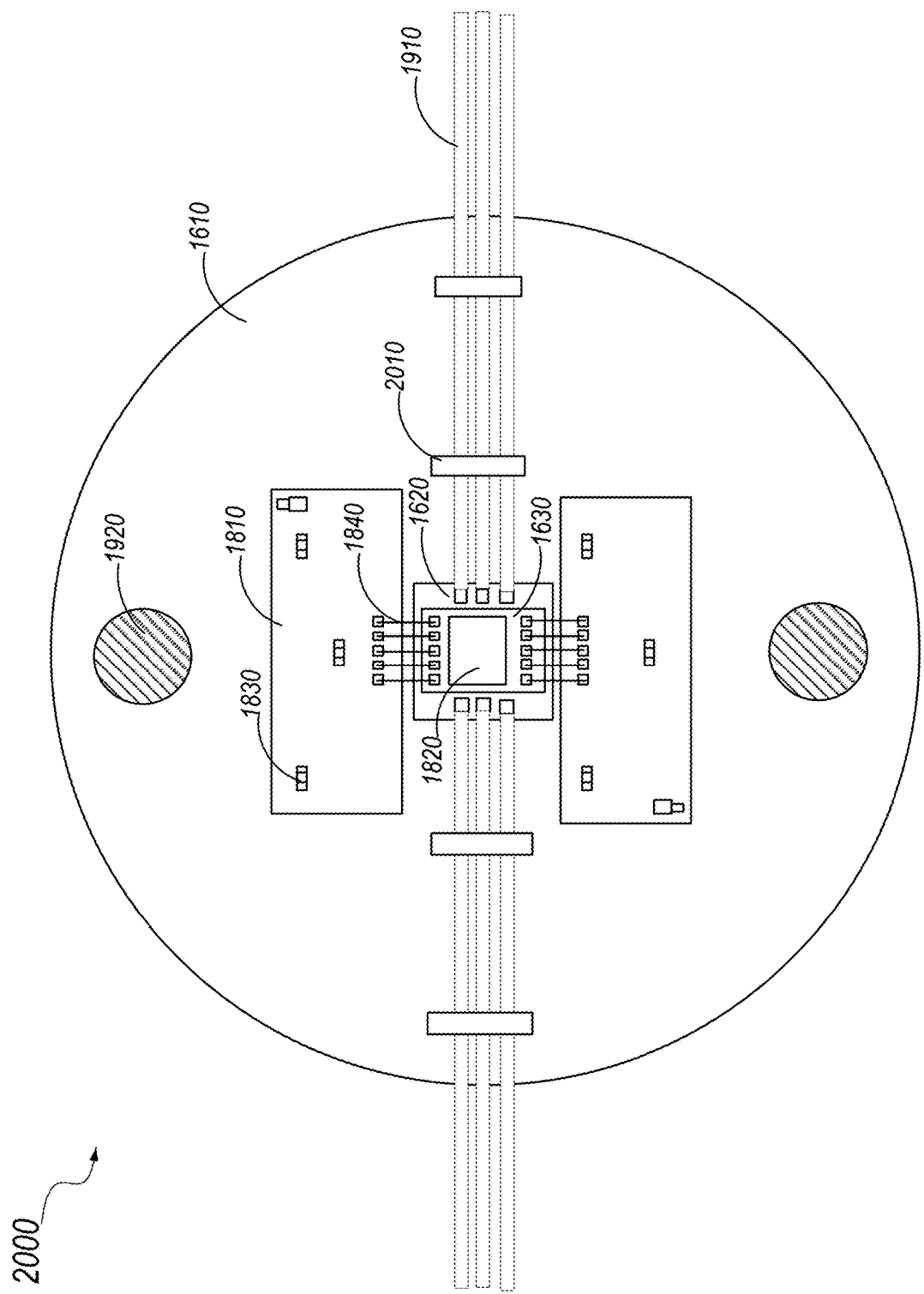
FIG. 20 is a top view of an example of a package including a silicon handle wafer and a platform silicon wafer coupled to metal studs through fasteners according to certain embodiments.

FIG. 20 is a top view of the example of package 1900 including silicon handle wafer 1610 and platform wafer 1850 coupled to metal studs 1920 according to certain embodiments. In the illustrated example, PCBs 1810 may be on two opposite sides of the die stack that may include PIC 1620 and EIC 1630, where metal block 1820 may be bonded on top of EIC 1630. PCBs 1810 may include electrical components 1830 installed thereon, and may be connected to EIC 1630 through metal wires 1840. Optical fibers 1910 may be routed on the other two opposite sides of the die stack and coupled to PIC 1620. Optical fibers 1910 may be secured to silicon handle wafer 1610 or other PCBs bonded on silicon handle wafer 1610 using harnesses 2010. FIG. 20 also shows metal studs 1920 that are positioned on silicon handle wafer 1610 and secured to silicon handle wafer 1610 using, for example, fasteners 1930 (not shown in FIG. 20).

Even though FIG. 20 only shows two PCBs 1810 and two metal studs 1920, it is noted that one or more PCBs 1810 may be bonded to silicon handle wafer 1610 and three or more metal studs 1920 may be used in a packaged hybrid system. The one or more PCBs 1810 may be arranged at any suitable locations on silicon handle wafer 1610. The three or more metal studs 1920 may also be positioned at any suitable locations on silicon handle wafer 1610. In addition, as described above with respect to, for example, FIG. 15, one or more die stacks may be bonded on silicon handle wafer 1610.

As described above, a plurality of EPIC die stacks may be bonded to a handle wafer, for example, by fusion bonding or oxide bonding, to form a wafer-scale module. The plurality of EPIC die stacks may be used to, for example, generate, manipulate, and detect qubits for optical quantum computing. In some embodiments, multiple wafer-scale modules may be connected through fiber cables, free-space optical interconnects, or other optical interconnects to form a subsystem or a system for larger scale quantum state generation, manipulation, and detection.

Figures 21A, 21B:
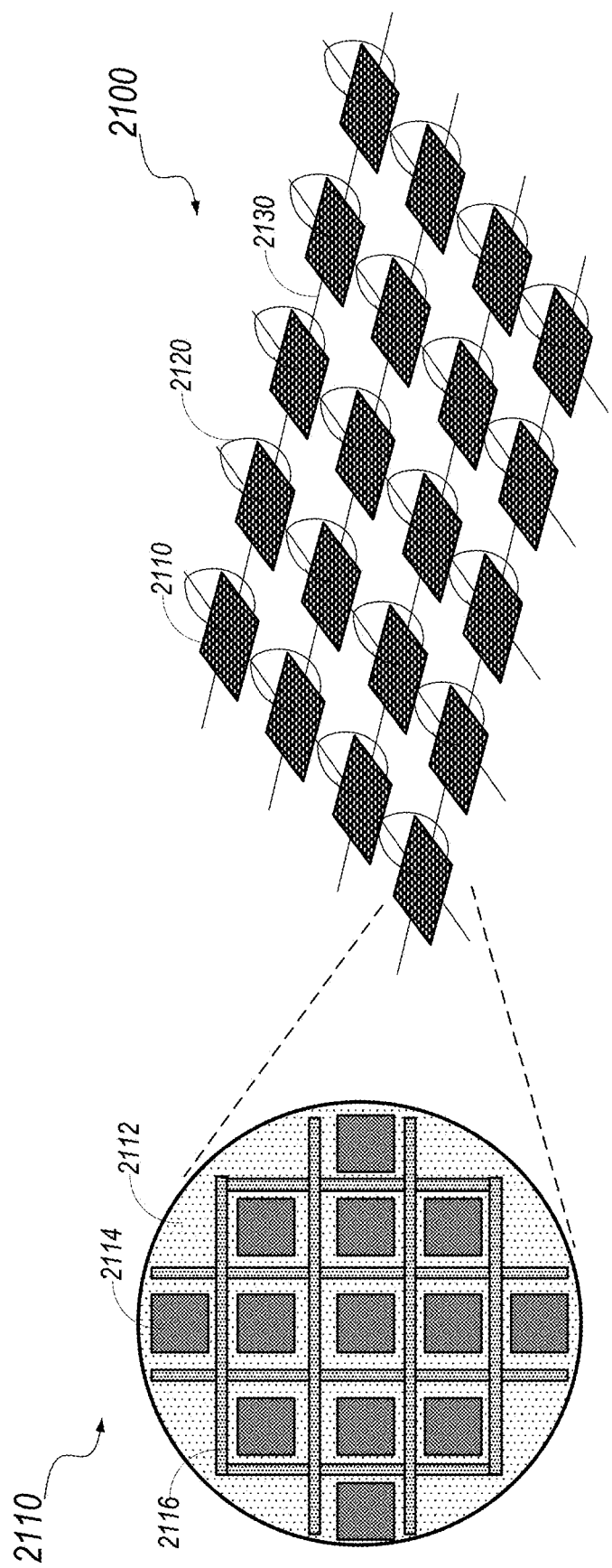
FIG. 21A is a top view of an example of a wafer-scale module including multiple EIC/PIC (EPIC) die stacks on a handle wafer according to certain embodiments.
FIG. 21B illustrates an example of a system including multiple interconnected wafer-scale modules according to certain embodiments.

FIG. 21A is a top view of an example of a wafer-scale module 2110 including multiple EPIC die stacks 2114 on a handle wafer 2112 according to certain embodiments. EPIC die stacks 2114 may each include a PIC die and an EIC die, and may be manufactured and bonded to handle wafer 2112 (e.g., including an optical backplane or another optical interposer) as described above and below. An EPIC die stack 2114 may be optically connected to another EPIC die stack 2114 through one or more optical fibers, one or more optical waveguides in the optical interposer, one or more free-space optical interconnects, or other optical interconnects. Wafer-scale module 2110 may also include a plurality of PCBs 2116. The EIC dies in EPIC die stacks 2114 may be electrically connected to PCBs 2116 using, for example, wire bonding. EPIC die stacks 2114 may be used to, for example, generate, manipulate, and/or detect qubits (e.g., photonic qubits that employ one or more photons) or entangled states of qubits for optical quantum computing.

FIG. 21B illustrates an example of a system 2100 including multiple wafer-scale modules 2110 interconnected using optical fibers according to certain embodiments. As described above with respect to FIG. 21A, each wafer-scale module 2110 may include multiple EPIC die stacks. Optical fibers may be used to provide inter-wafer and/or intra-wafer optical interconnects. For example, optical fibers 2120 may be used to connect EPIC die stacks 2114 on a same wafer-scale module 2110, while optical fibers 2130 may be used as interconnects between wafer-scale modules 2110. System 2100 may be used to perform, for example, qubit generation, manipulation, and/or detection at a larger scale.

Figure 22A:
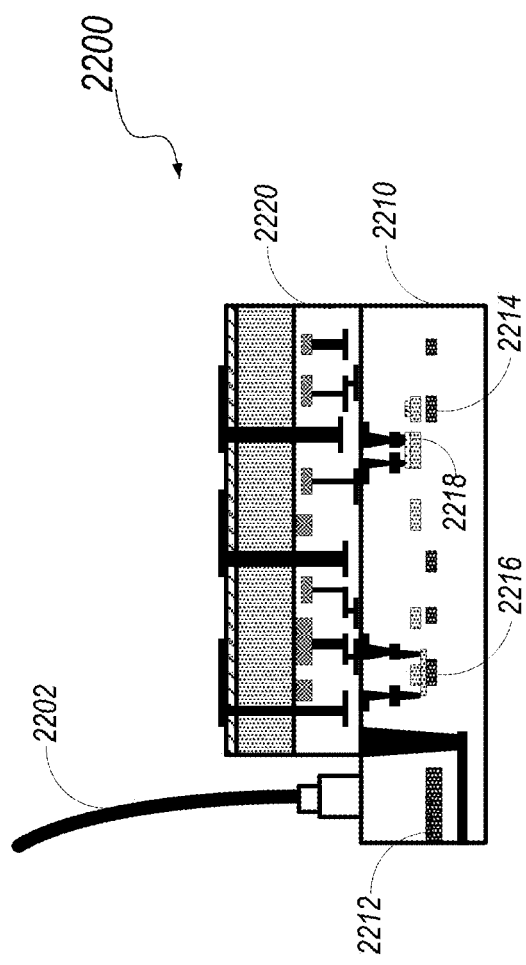
FIG. 22A illustrates an example of a structure including an optical fiber coupled to an EPIC die stack via a grating coupler according to certain embodiments.

FIG. 22A illustrates an example of a structure 2200 including an optical fiber 2202 coupled to an EPIC die stack via a grating coupler 2212 according to certain embodiments. The EPIC die stack may be an example of an EPIC die stack 2114. As describe above, the EPIC die stack may include a PIC die 2210 and an EIC die 2220. PIC die 2210 may include various passive and active photonic components, such as grating couplers 2212, waveguides 2214, delay lines, switches 2216, filters, photodetectors (e.g., Ge photodiode-based photodetectors), single photon generation circuits, single photon detectors 2218, resource state generation circuits, logical qubit detection circuits, and the like, as described above and below. In some embodiments, PIC die 2210 may also include other structures, such as heating or cooling structures, temperature sensors, and thermal and/or optical isolation structures, for controlling and/or improving the performance of certain photonic components. EIC die 2220 may include logic and/or control circuits that may be used to, for example, control and/or improve the performance of the photonic integrated circuits, provide inputs to the photonic integrated circuits, and readout outputs from the photonic integrated circuits (e.g., the photodetectors and single photon detectors).

FIG. 22A shows that optical fiber 2202 may be used to send light (e.g., pump laser pulses for single photon generation or optical data communication signals) into PIC die 2210 of the EPIC die stack through grating coupler 2212. Grating coupler 2212 may include, for example, a straight or slanted grating that can couple light from optical fiber 2202 into waveguide 2214 in PIC die 2210. Light coupled into PIC die 2210 by grating coupler 2212 may be delivered to other photonic integrated circuits in PIC die 2210. The light coupled into PIC die 2210 may be used, for example, to provide data communication or to pump a single photon generator. In some embodiments, optical fiber 2202 may be qubit and/or quantum state of light interconnects and may be used to send photons, qubits, or entangled states of qubits into or out of PIC die 2210.

Figure 22B:
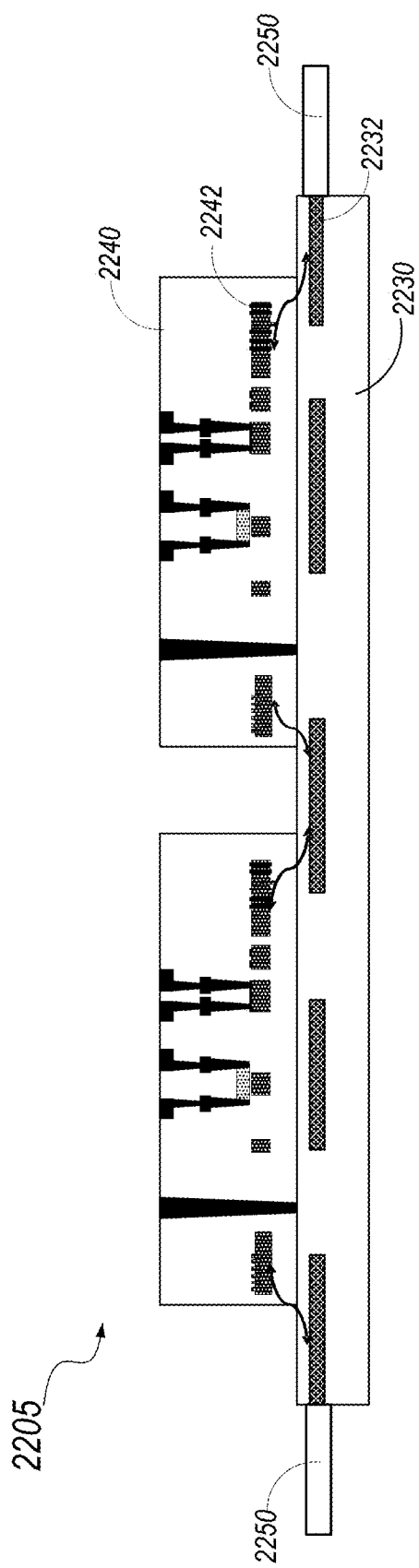
FIG. 22B illustrates an example of a structure including multiple EPIC die stacks optically coupled together via an optical backplane according to certain embodiments.

FIG. 22B illustrates an example of a structure 2205 including multiple PIC dies 2240 (and the corresponding EIC dies, not shown in FIG. 22B) that are bonded to and are optically coupled together via an optical backplane 2230 according to certain embodiments. Optical backplane 2230 may be used as an optical interposer and may include, for example, a silicon wafer with a silicon dioxide layer formed thereon. One or more waveguide layers, such as silicon, silicon nitride (SiN), or other waveguide layers of various thicknesses, may be formed in the silicon dioxide layer. The one or more waveguide layers may include waveguides

2232, which may be low-loss waveguides. In some embodiments, waveguides 2232 may be used as delay lines.

One or more optical fibers 2250 may be coupled to waveguides 2232 through, for example, edge couplers or tapered structures (e.g., an adiabatically tapered structure), such that light may be coupled from optical fibers 2250 to waveguides 2232 or from waveguides 2232 to optical fibers 2250. PIC dies 2240 may include photonic integrated circuits as described above and below. For example, PIC dies 2240 may include waveguide couplers 2242. Waveguide couplers 2242 can be any type of waveguide coupler, such as adiabatic and/or evanescent waveguide couplers. As used herein, the term adiabatic refers to an optical element (e.g., a coupler or a bend) that has the property that as the fundamental mode propagates through the optical element, the excitation of higher order modes, radiative modes, back reflection modes, and the like, are reduced or suppressed, thereby reducing optical loss. In embodiments where a qubit is implemented using a pair of waveguides, the waveguide couplers may include pairs of adiabatic and/or evanescent waveguide couplers for coupling qubits or other entangled states of qubits. Light propagating in waveguides 2232 may be coupled into waveguides in PIC dies 2240 by waveguide couplers 2242. Some waveguide couplers 2242 may be used to couple light from PIC dies 2240 into waveguides 2232 in optical backplane 2230. In this way, photons may propagate, via waveguides 2232, from optical fibers 2250 to PIC dies 2240, from one PIC die 2240 to another PIC die 2240, and/or from PIC dies 2240 to optical fibers 2250.

Figures 23A, 23B:
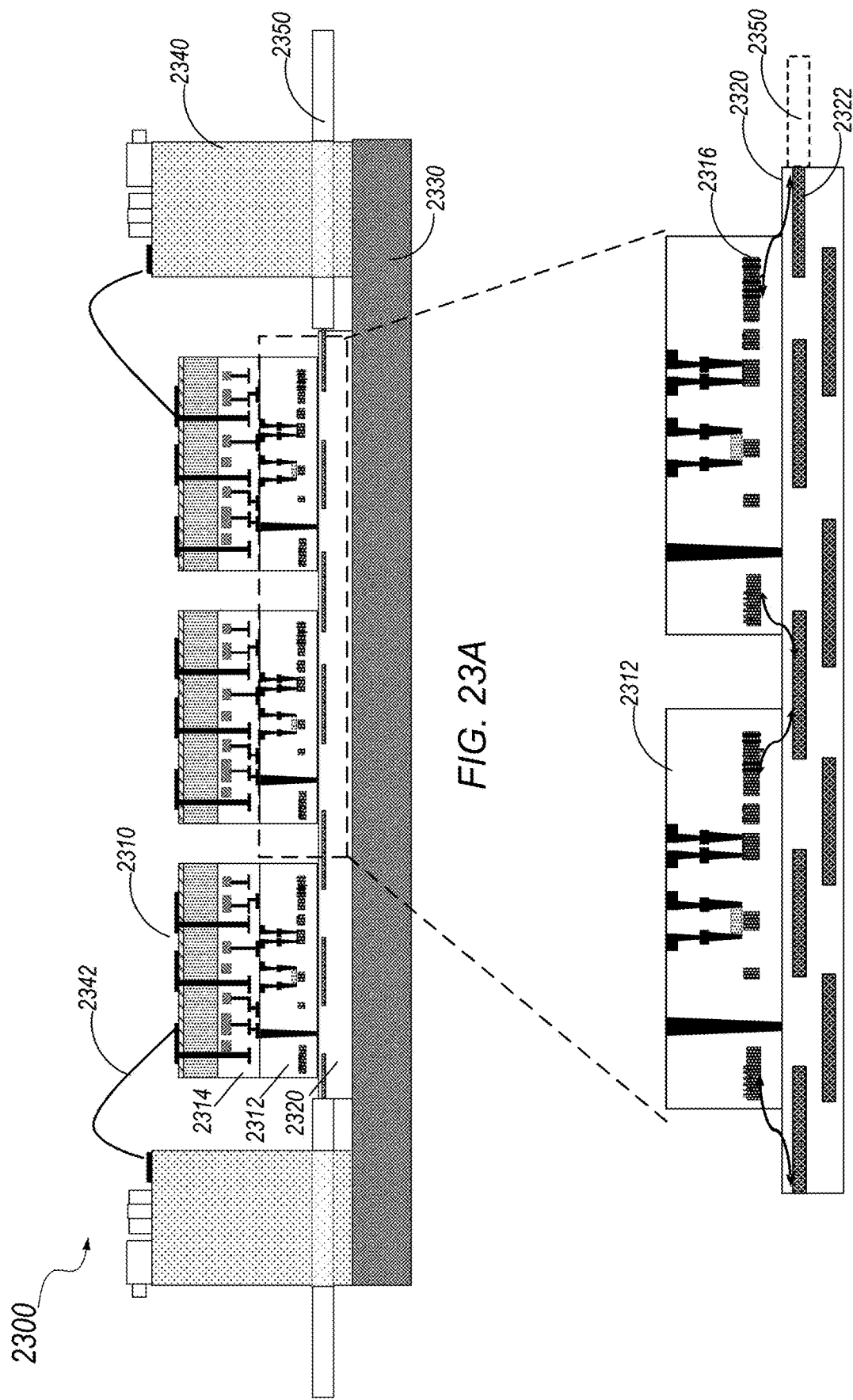
FIG. 23A is a cross-sectional view of an example of a wafer-scale module including multiple EPIC die stacks coupled to an optical backplane according to certain embodiments.
FIG. 23B is a zoom-in view of a portion of the example of the wafer-scale module of FIG. 23A according to certain embodiments.

FIG. 23A is a cross-sectional view of an example of a wafer-scale module 2300 including multiple EPIC die stacks 2310 coupled to an optical backplane 2320 according to certain embodiments. Wafer-scale module 2300 may be an example of wafer-scale module 2110. FIG. 23B is a zoom-in view of the example of wafer-scale module 2300 according to certain embodiments. FIG. 23B shows the optical coupling between PIC dies 2312 and optical backplane 2320. Optical backplane 2320 may be used as an optical interposer for bonding EPIC die stacks 2310 to a substrate and for optically connecting EPIC die stacks 2310.

Wafer-scale module 2300 may be used in, for example, optical quantum computers, communication systems, and other electrical-optical hybrid systems. In the illustrated example, wafer-scale module 2300 includes a handle wafer 2330 (a silicon wafer) with optical backplane 2320 formed or bonded thereon. Multiple EPIC die stacks 2310 may be bonded to optical backplane 2320, for example, through oxide-to-oxide bonding. Each EPIC die stack 2310 includes an EIC die 2314 and a PIC die 2312 bonded together through bonding pads or bonding bumps on the EIC die and the PIC die such that the electrical interconnects between the EIC and the PIC can be short. Electrical backplane devices 2340 (e.g., PCBs) may be bonded to handle wafer 2330 or optical backplane 2320. Electrical backplane devices 2340 may be electrically connected to EPIC die stacks 2310 through, for example, bonding wires 2342. Optical fibers 2350 may be coupled to optical backplane 2320 through, for example, edge couplers, tapered structures, and/or alignment structures (e.g., V-grooves formed on handle wafer 2330).

Wafer-scale module 2300 may be used to, for example, generate single photons using a pump laser pulse, waveguides, optical switches, ring oscillators, couplers, wavelength-division multiplexing (WDM) beam splitter, single photon detectors (e.g., for detecting heralding photons), and the like, through a nonlinear process, such as spontaneous parametric down conversion (SPDC) or spontaneous four wave mixing (SFWM). In some embodiments, coherent spatial and/or temporal multiplexing of several non-deterministic photon sources may be performed to increase the probability of generating one photon in a given cycle. Wafer-scale module 2300 may also be used to generate resource states or other entangled states of qubits from the single photons using, for example, waveguides, delay lines, couplers, splitters, switches, modulators, fusion gates, and the like.

Wafer-scale module 2300 may also be used to detect photons or qubits using, for example, single photon detectors, waveguides, delay lines, and the like. Single photon detectors, such as superconductive nanowire single photon detectors (SNSPDs), may be used to detect a herald photon that signals the generation of a single photon in a single photon generator, or may be used to detect single photons within entangled states (e.g., resource states) in order to detect or perform logical operations on logical quits. In some embodiments, wafer-scale module 2300 may include optical isolation structures for scattering mitigation, such that stray light scattered by other circuits in wafer-scale module 2300 may not reach the single photon detectors. For example, PIC die 2312 may include opaque structures surrounding the single photon detectors to prevent stray light from reaching the single photon detectors. The single photon detectors may also need to operate at very low temperature, such as cryogenic temperatures. Thus, wafer-scale module 2300 may also include cooling structures and thermal isolation structures such that heat generated in other regions would not reach regions that need to operate at low temperatures (e.g., cryogenic temperatures). For example, PIC die 2312 may include cooling structures, such as metal conductors or microfluidic channels. In some embodiments, PIC die 2312 may also include heating elements. In some embodiments, PIC die 2312 may also include thermal isolation structures to isolate photonic circuits that may need to operate at low temperatures or to prevent heat loss of heating elements.

In some embodiments, wafer-scale module 2300 may include photodetectors or optical transceivers to receive and/or transmit optical communication signals, such as data and timing signals. In one example, wafer-scale module 2300 may include Ge photodiode-based photodetectors for receiving data and timing signals from a control unit. In another example, PIC die 2312 and EIC die 2314 may include optical transceivers for communicating with, for example, a control unit. In some embodiments, PIC die 2312 and EIC die 2314 may include optical modulators.

FIG. 23B shows the optical coupling between PIC dies 2312 and optical backplane 2320. Optical backplane 2320 may include one or more waveguide layers that include multiple waveguides 2322. In some embodiments, one waveguide layer may include routing waveguides for optically connecting PIC dies 2312 and another waveguide layer may include delay lines. Light from an optical fiber 2350 or a PIC die 2312 may be coupled into a waveguide 2322. The light may propagate in waveguide 2322 and may be coupled into PIC dies 2312 by a waveguide coupler 2316. In some embodiments, the light signals may also be coupled into waveguides in different waveguide layers in optical backplane 2320. In some embodiments, light may also be coupled from a PIC die 2312 to a waveguide 2322 in optical backplane 2320 by a waveguide coupler 2316, and may then be coupled from waveguide 2322 to another PIC die 2312 by another waveguide coupler 2316. Thus, waveguides 2322 may be used for light signal routing, layer-to-layer transition, and the like.

FIG. 24A is a cross-sectional view of an example of a wafer-scale module 2400 including multiple EPIC die stacks optically interconnected by an optical backplane 2402 according to certain embodiments. The EPIC die stacks may each include a PIC die 2406 and an EIC die 2408. PIC dies 2406 may include the photonic integrated circuits described above and below, such as waveguides (e.g., Si or SiN waveguides), waveguide couplers, delay lines, and other passive and active integrated optical devices. In some cases, it may be difficult to make low-loss SiN waveguides in PIC dies 2406 because the high temperature and long-time annealing used to reduce the loss of the SiN waveguides may degrade the performance of some active photonic integrated circuits. Optical backplane 2402 may include a waveguide layer 2404 (e.g., a SiN waveguide layer) formed on a substrate (e.g., a silicon wafer). Even though not shown in FIG. 24A, optical backplane 2402 may also include optical input/output ports, such as grating couplers, edge couplers, or tapered couplers, for coupling to, for example, optical fibers. The EPIC die stacks may be aligned with and bonded to optical backplane 2402 through, for example, fusion bonding or hybrid bonding, where the dielectric material (e.g., $SiO_2$) of PIC dies 2406 may be bonded with the dielectric material (e.g., $SiO_2$) of optical backplane 2402. Light may be coupled between waveguide layer 2404 in optical backplane 2402 and waveguides in PIC dies 2406 by, for example, the waveguide couplers described above and below. Thus, optical backplane 2402 may provide optical interconnects between PIC dies 2406 of the EPIC die stacks in a same wafer-scale module 2400 and/or between PIC dies 2406 in different wafer-scale modules.

FIG. 24B illustrates an example of an optical backplane 2410 including low-loss waveguides 2416 and low-loss couplers for coupling light between fibers 2418 and low-loss waveguides 2416 according to certain embodiments. Optical backplane 2410 may include a substrate 2412 and a dielectric material layer 2414 (e.g., a $SiO_2$ layer). Low-loss waveguides 2416 may be formed within dielectric material layer 2414 and may include, for example, SiN waveguides. Low-loss waveguides 2416 may have a loss, for example, between about 0.03 dB/m and about 2 dB/m, between about 0.04 dB/m and about 1 dB/m, or between about 0.05 dB and about 0.5 dB/m. For example, in some embodiments, low-loss waveguides 2416 may have a loss lower than about 0.5 dB/m, lower than about 0.4 dB/m, lower than 0.3 dB/m, or lower than 0.1 dB/m. As described above, low-loss waveguides 2416 can be made at high temperature and through long-time annealing to reduce the loss of the waveguides because, in some embodiments, optical backplane 2410 may not include active photonic integrated circuits (e.g., the optical backplane may include only passive components). In some embodiments, low-loss waveguides 2416 may include optical delay lines of various time delays, such as greater than about 10-100 ps, greater than about 1 ns, or greater than about 50 ns. In some embodiments, low-loss waveguides 2416 may include pairs of waveguides for implementing and transporting qubits or entangled states of qubits. The low-loss couplers for coupling light between fibers 2418 and low-loss waveguides 2416 may include, for example, a V-groove alignment structure, a tapered structure, a planar lens, a subwavelength grating, and the like.

FIG. 24C illustrates an example of a wafer-scale module 2420 including an optical backplane 2422 and EPIC die stacks 2430 bonded to optical backplane 2422 according to certain embodiments. Optical backplane 2422 may be used as an optical interposer and may include a dielectric layer 2424 (e.g., a $SiO_2$ layer) formed on a substrate (e.g., a silicon wafer). Two or more waveguide layers, such as waveguides 2428 and low-loss waveguides 2426, may be formed in dielectric layer 2424. Low-loss waveguides 2426 may be similar to low-loss waveguide 2416. The waveguide layers may include, for example, SiN layers with different thicknesses. The interconnects between EPIC die stacks 2430 in wafer-scale module 2420 and the interconnects between EPIC die stacks 2430 in wafer-scale module 2420 and EPIC die stacks in other wafer-scale modules may be achieved through optical backplane 2422. For example, the waveguides in optical backplane 2422 and/or the waveguides in EPIC die stacks 2430 may include waveguide couplers that can couple light or photons from one waveguide to another waveguide, or from one waveguide layer to another waveguide layer. As described above, the waveguide couplers can be any type of waveguide coupler, e.g., adiabatic and/or evanescent waveguide couplers. In embodiments where a qubit is implemented using a pair of waveguides, the waveguide couplers may include pairs of adiabatic and/or evanescent waveguide couplers for coupling qubits or other entangled states of qubits.

Optical backplane 2422 may also include low-loss couplers as described above for coupling light between optical fibers and the waveguides (e.g., waveguides 2426) in optical backplane 2422, where the optical fibers may be coupled back to optical backplane 2422 (e.g., forming an intra-module delay loop) or may be coupled to the optical backplane of another wafer-scale modules (e.g., for inter-module interconnection). Waveguides 2426 and 2428 may be used for light signal routing, layer-to-layer transition, and the like. In some embodiments, optical backplane 2422 (e.g., low-loss waveguides 2426) may also be used for delaying single photons, delaying or storing qubits, and the like. For example, low-loss waveguides 2426 may include, for example, individual or pairs of low-loss delay lines characterized by time delays between about 10 ps and about 50 ns or longer. In some embodiments, optical backplane 2422 may also include some other circuits or structures, such as dispersion compensators, polarization beam splitters/rotators, scattering mitigation structures, thermal management and local cooling structures, thermal isolation structures, and the like.

As described above, a qubit may be physically realized using a pair of waveguides into which a single photon is introduced. Qubits can be operated upon using mode couplers (e.g., beam splitters), variable phase shifters, photon detectors, and the like. For instance, entanglement between two (or more) qubits can be created by providing mode couplers between waveguides associated with different qubits. As also described above, physical qubits may suffer from loss and noise. Consequently, relying on single physical qubits (e.g., a photon propagating in a pair of waveguides) when performing a quantum computation may result in an unacceptably high error rate. To provide fault tolerance, photonic quantum computers can be designed to operate on one or more logical qubits, where a logical qubit is a multi-qubit quantum system in an entangled state that enables error correction (also referred to herein as an error correcting code). For example, in some embodiments, the structure of the error correcting code can be represented as a graph in three dimensions. In the context of quantum computing, logical qubits can improve robustness by supporting error detection and error correction. Logical qubits may also be used in other contexts, such as quantum communication.

FIG. 25A illustrates an example of a subsystem 2500 for generating entangled quantum states (e.g., resource states or logical qubits) according to certain embodiments. Subsystem 2500 may include a wafer-scale module 2510 that includes multiple EPIC die stacks 2512 bonded to an optical backplane 2516. Wafer-scale module 2510 may be an example of wafer-scale module 2110 or 2420. EPIC die stacks 2512 may be manufactured and bonded to optical backplane 2516 as described in details above and below. Wafer-scale module 2510 may also include a plurality of PCBs 2514 (e.g., an electrical backplane). The EIC dies in EPIC die stacks 2512 may be electrically connected to PCBs 2514 using, for example, wire bonding. EPIC die stacks 2512 may be used to, for example, generate, manipulate, and detect qubits or entangled states of qubits for optical quantum computing or optical quantum communication. For example, EPIC die stacks 2512 may include single photon generators, mode couplers, fusion gates, beam splitters, switches, single photon detectors or multi-photon detectors, waveguides, delay lines, modulators, optical switches, ring oscillators, couplers, photodiode-based photodetectors for receiving data and timing signals, and the like, as described above and below. EPIC die stacks 2512 may be optically connected together through optical fibers, optical waveguides in optical backplane 2516, free-space optical interconnects, and/or other optical interconnects.

Wafer-scale module 2510 may be connected to a distribution network 2520 through optical fibers 2560. Optical fibers 2560 may be coupled to EPIC die stacks 2512 through grating couplers (or edge couplers) and/or optical backplane 2516. Distribution network 2520 may be connected to one or more pump laser sources 2540 and a control unit 2530 (e.g., through an optical transceiver 2550). Control unit 2530 may include, for example, a classical computing system. In some embodiments, control unit 2530 and/or distribution network 2520 may be used to control two or more wafer-scale modules 2510. Optical fibers 2560 may be used to, for example, send pump laser pulses from pump laser sources 2540 to EPIC die stacks 2512 for single photon generation, send control data from control unit 2530 and optical transceiver 2550 to EPIC die stacks 2512 (e.g., to control the switches), send measurement data from EPIC die stacks 2512 to optical transceiver 2550 and control unit 2530, and the like.

In one example, each EPIC die stack 2512 may include a single photon generator that includes waveguides, ring oscillators, interferometers, couplers, optical switches, WDM filters, single photon detectors, and the like that form multiple multiplexed photon pair sources to deterministically generate single photons through a nonlinear optical process (e.g., SFWM, SPDC, second harmonic generation, etc.). In one embodiment, each photon pair source may include a micro-ring-based SFWM heralded photon source (HPS), where the detection of one photon of a pair of photons generated during the nonlinear process by a single photon detector (e.g., an SNSPD) may herald the existence of the other photon in the pair that may be used to implement a qubit or generate an entangled resource state. Other classes of photon sources that do not use a nonlinear material may also be employed, such as those that employ atomic and/or artificial atomic systems (e.g., quantum dot sources, color centers in crystals, etc.). The operations of some photon sources may be non-deterministic (also sometimes referred to as "stochastic") such that a given pump pulse may or may not produce a pair of photons. In such photon sources, coherent spatial and/or temporal multiplexing of several non-deterministic photon sources may be performed to increase the probability of having one photon in any given cycle. When the number of multiplexed non-deterministic photon sources is large, the probability of having one photon in any given cycle may be about 100%.

As illustrated in FIG. 25A, wafer-scale module 2510 may also be coupled to one or more optical fibers 2562. The one or more optical fibers 2562 may be used to transmit single photons, qubits, or entangled states of qubits between different wafer-scale modules 2510 or may be used to loop qubits back to the same wafer-scale module after a delay. As described above and below, in some embodiments, optical fibers 2562 may be coupled to waveguides in optical backplane 2516 through low-loss couplers. In some embodiments, optical fibers 2562 may be used as a long delay line for delaying the qubits to perform time-like resource state fusion operations as described in details below. In some embodiments, optical fibers 2562 may also be used for data communication or for transmitting pump laser pulses.

FIG. 25B is a cross-sectional view of the example of wafer-scale module 2510 according to certain embodiments. As shown in FIGS. 25A and 25B, wafer-scale module 2510 may include multiple EPIC die stacks 2512, multiple PCBs 2514, and optical fiber bundles. EPIC die stacks 2512 may be optically connected to each other or other wafer-scale modules through an optical backplane 2516, and may be electrically connected to PCBs 2514 through bonding wires 2522. Optical backplane 2516 may include a dielectric layer 2518 that includes one or more waveguide layers formed therein. The one or more waveguide layers may include low-loss waveguides 2524 for transmitting, delaying, or storing single photons, qubits, qudits, resource states, or other entangled states. For example, waveguides 2524 may include pairs of waveguides used to implement or transmit qubits and/or entangled qubits (e.g., resource states or larger entangled states of qubits). Photons may be coupled from one waveguide to another waveguide or from one waveguide layer to another waveguide layer through, for example, waveguide couplers. Photons may also be coupled from waveguides 2524 in optical backplane 2516 to waveguides in EPIC die stacks 2512 through other waveguide layers and waveguide couplers in optical backplane 2516 and/or EPIC die stacks 2512. The waveguide couplers can be any type of waveguide coupler, e.g., adiabatic and/or evanescent waveguide couplers.

In the illustrated example, each EPIC die stack 2512 may include a grating coupler as described above with respect to, for example, FIG. 22A, for receiving pump light and/or data communication signals from an optical fiber 2560. Optical fibers 2562 may be coupled to waveguides 2524 in optical backplane 2516 through optical input/output ports that may include, for example, V-groove alignment structures and low-loss couplers, such as a tapered structure, a subwavelength grating, an edge coupler, and the like. Optical fibers 2562 may be connected to other wafer-scale modules 2510 or may be connected to different portions of wafer-scale module 2510 (e.g., loop photons or qubits from wafer-scale module 2510 back to wafer-scale module 2510 after a delay).

Figure 26:
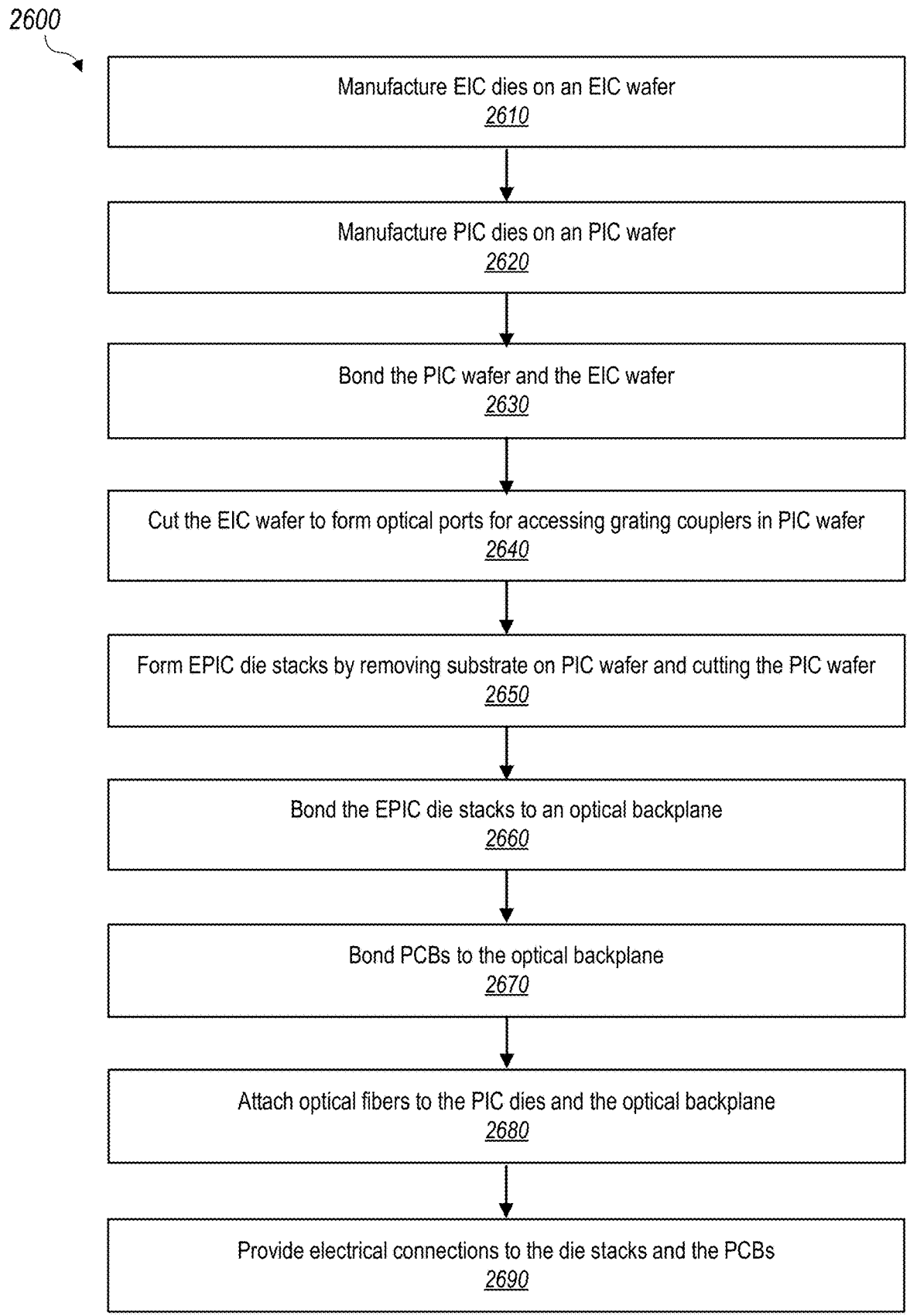
FIG. 26 is a simplified flowchart illustrating an example of a process for making a wafer-scale module including multiple EPIC die stacks that are optically connected through an optical backplane according to certain embodiments.

FIG. 26 is a simplified flowchart 2600 illustrating an example of a process for making a wafer-scale module including multiple EPIC die stacks that are optically interconnected through an optical backplane according to certain embodiments. It should be appreciated that the specific operations illustrated in FIG. 26 provide a particular method of making a wafer-scale module according to certain embodiments. Other sequences of operations may also be performed according to alternative embodiments. For example, alternative embodiments may perform the operations outlined above in a different order. Moreover, the individual operations illustrated in FIG. 26 may include multiple sub-operations that may be performed in various sequences as appropriate to the individual step. Furthermore, additional operations may be added or removed depending on the particular applications. One of ordinary skill in the art would recognize many variations, modifications, and alternatives.

At block 2610, the operations may include manufacturing electronic integrated circuits on semiconductor wafers, such as silicon wafers, using semiconductor processing equipment and technology (e.g., CMOS technology). The electronic integrated circuits may include, for example, control circuits, logic circuits, driver circuits, and the like. In some embodiments, through-silicon vias (TSVs) may be formed in EIC wafer. The manufactured integrated circuit dies on the electronic integrated circuit wafer may be tested to reject defective dies.

At block 2620, the operations may include fabricating photonic integrated circuits on semiconductor wafers, such as silicon wafers, using semiconductor processing equipment and technology as described above and in detail below. The photonic integrated circuits may include, for example, grating couplers, waveguides, resonators, photon detectors, photodetectors, interferometers, gratings, switches, beam splitters or mode couplers, waveguide couplers, delay lines, filters, phase shifters, fusion gates, dispersion compensators, polarization splitters, polarization rotators, and the like.

At block 2630, a PIC wafer manufactured at block 2620 and an EIC wafer manufactured and tested at block 2610 may be aligned and bonded together through wafer-to-wafer fusion or hybrid bonding to form a wafer stack. Wafer-to-wafer fusion bonding may bond two wafers without any intermediate layers and is based on chemical bonds between the surfaces of two wafers that meet certain conditions. For example, fusion bonding may be used to bond two silicon wafers. Wafer-to-wafer fusion bonding may include wafer cleaning and other preprocessing, aligning and pre-bonding at room temperature, and annealing at elevated temperatures, such as about 250° C. or higher. In some embodiments, wafer-level hybrid bonding may be used to bond two wafers with dielectric materials (e.g., oxide) and metal at the surface of one or both wafers. Dielectric bonds and/or metal bonds may be formed at the interface between two wafers by the hybrid bonding. Hybrid bonding may include, for example, wafer cleaning, surface activation (e.g., plasma activation), pre-bonding, and annealing at, for example, 250-300° C. or higher.

At block 2640, the wafer stack may be etched or otherwise cut, for example, by laser or plasma scribing or grinding, to form optical ports for accessing grating couplers in the PIC wafer. The optical ports may be used to couple light into the PIC wafer through the grating couplers in the PIC wafer to test individual PIC dies. PIC dies that include defects may be identified and may be excluded in subsequent processes.

At block 2650, the wafer stack including the PIC wafer and the EIC wafer may be cut by, for example, laser or plasma scribing or grinding, to separate each die area that includes a PIC die and an EIC die (referred to as an EPIC die stack). In some embodiments, the substrate of the PIC wafer may be thinned or removed before the cutting. EPIC die stacks that include defects in the PIC die and/or the EIC die may be discarded.

At block 2660, a substrate (e.g., a silicon wafer) with an optical backplane formed thereon may be bonded with the backside of the PIC die (with the substrate removed) through, for example, fusion bonding or oxide-oxide thermocompression direct bonding between oxide layers. The optical backplane may include, for example, any combination of one or more silicon or SiN waveguide layers (e.g., crystalline silicon or amorphous SiN waveguide layers), two optical waveguide layers characterized by different respective layer thicknesses, at least one delay line characterized by a delay between about 10 ps and about 50 ns, a waveguide coupler (e.g., adiabatic and/or evanescent waveguide couplers) configured to couple light from one optical waveguide layer to another optical waveguide layer, a low-loss coupler (e.g., an edge coupler or a tapered coupler) configured to couple light between an optical fiber and the optical backplane, a waveguide coupler configured to couple light between the optical backplane and a PIC die, a dispersion compensator, a polarization splitter, a polarization rotator, a light isolation structure, or a thermal isolation structure. In embodiments where a qubit is implemented using a pair of waveguides, the waveguide couplers may include pairs of adiabatic and/or evanescent waveguide couplers for coupling qubits or other entangled states of qubits. The optical backplane may be used to transmit, delay, and/or store single photons, qubits, qudits, entangled states of qubits, and/or logical qubits.

At operation 2670, printed circuit boards (PCBs) or silicon dies may be attached to the substrate with the optical backplane at areas where no EPIC die stacks are bonded. The PCBs may be used to provide electrical connections to an external system, to provide a power distribution network (e.g., power layers and ground layers), and to include some electronic components, such as voltage regulators and decoupling capacitors in the package. The PCBs may also include, for example, electrical cable connection ports, such as ribbon cable connectors, RF/microwave connectors (e.g., SMA connectors), and the like. In some embodiments, the PCBs may also include fiber cable harnesses and/or electric cable harnesses. In some embodiments, the PCBs may be made of a ceramic material, silicon, CTE-matched silicon dioxide, or an organic material (e.g., resin). The method of bonding the PCBs to the substrate may depend on the material of the PCBs. For example, if oxides (e.g., silicon dioxide) are used for the PCBs, an oxide-to-oxide bonding technique may be used. If other materials are used for the PCBs, an epoxy or an adhesive may be used to attach the PCBs to the substrate.

At block 2680, optical fibers may be attached to the PIC dies and the optical backplane. For example, the optical fibers may be attached to the optical ports at the top of the PIC dies and may be aligned with the grating couplers in the PIC dies, such that the grating couplers may couple light from the optical fibers into waveguides in the PIC dies. The optical fibers attached to the top of the PIC dies may be used to deliver pump laser pulses and/or data communication signals to the PIC dies. One or more optical fibers may also be attached to the optical backplane and aligned with one or more low-loss couplers (e.g., an edge coupler or a tapered coupler) for coupling light between the optical fibers and the optical backplane. In some embodiments, both ends of an optical fiber may be coupled to the optical backplane, where the optical fiber may be used as, for example, a delay line.

At operation 2690, electrical connections to the die stacks and the PCBs may be made. For example, the EIC dies of the die stacks may be connected to the PCBs using bonding wires and bonding pads on the EIC dies and the PCBs. In some embodiments, an electrical interposer may be attached to the PCBs and/or the EIC dies. In some embodiments, a heat sink may be attached to the EIC die of each die stack to dissipate heat or keep at least a portion of the EPIC die stacks at low temperatures, such as at cryogenic temperatures or temperatures below about 100 K.

Figure 27A:
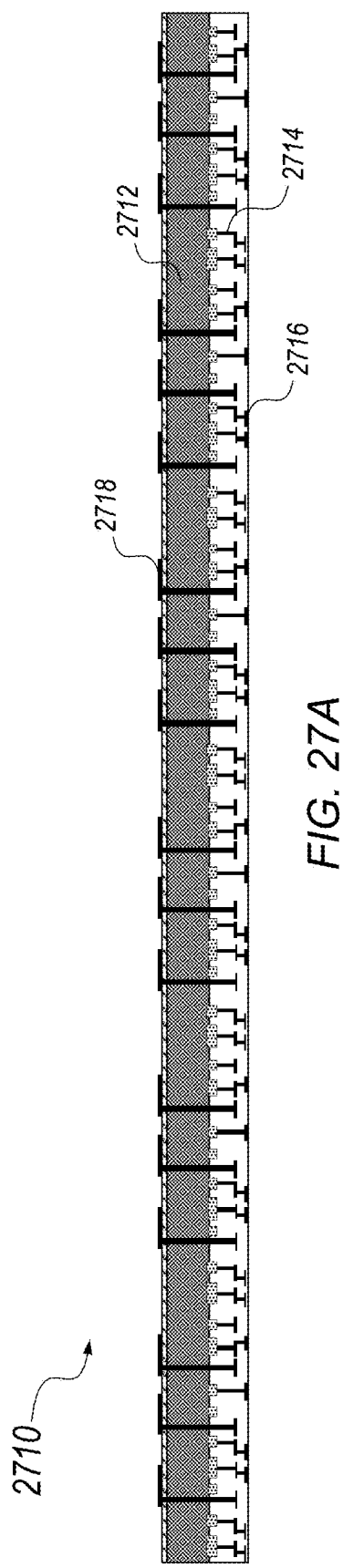
FIGS. 27A-27N illustrate an example of a process for making a wafer-scale module including multiple EPIC die stacks that are optically connected via an optical backplane according to certain embodiments.

FIGS. 27A-N illustrate an example of a process for making a wafer-scale module including multiple EPIC die stacks that are optically connected through an optical backplane according to certain embodiments. FIGS. 27A-N show an example of the process described above with respect to FIG. 26. FIG. 27A shows an example of an EIC wafer 2710 including electrical circuits 2714 fabricated thereon according to certain embodiments. In the illustrated example, EIC wafer 2710 includes a wafer 2712 (e.g., a silicon wafer). Electrical circuits 2714 (e.g., CMOS integrated circuits) may be fabricated on wafer 2712. Electrical circuits 2714 may include logic, driver, and control circuits for controlling the operations of photonic integrated circuits in a PIC wafer. As illustrated, EIC wafer 2710 may include bonding pads 2716 on the side of electrical circuits 2714 (e.g., the bottom side shown in FIG. 27A). Bonding pads 2716 may be used to bond with a PIC wafer. EIC wafer 2710 may also include bonding pads 2718 formed on the back side (e.g., the side of wafer 2712, which is the top side shown in FIG. 27A) of EIC wafer 2710. Bonding pads 2718 may be electrically connected to electrical circuits 2714 by through-silicon vias and may be used to bond EIC wafer 2710 to electrical backplanes (e.g., PCBs).

Figure 27B:
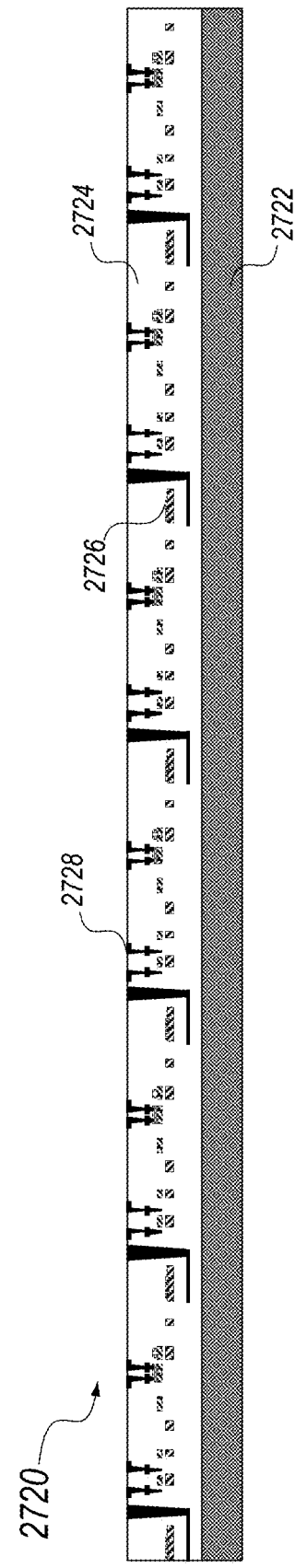

FIG. 27B shows an example of a PIC wafer 2720 according to certain embodiments. In the illustrated example, PIC wafer 2720 may include a substrate 2722 and various photonic integrated circuits 2726 formed in a dielectric layer 2724 (e.g., including one or more $SiO_2$ layers) formed on substrate 2722. As described above, photonic integrated circuits 2726 may include one or more waveguide layers, such as a silicon waveguide layer formed in a silicon-on-insulator layer, or one or more SiN waveguide layers. Photonic integrated circuits 2726 may also include, for example, grating couplers, waveguide couplers, splitters, Ge photodetectors, single photon detectors, low power BTO switches, temperature sensors, heaters, and the like. Photonic integrated circuits 2726 may perform various functions for optical quantum computing or communication, such as single photon generation, mode coupling, qubit entanglement and fusion, qubit storage, single-photon and multi-photon measurement, data communication, and the like. PIC wafer 2720 may also include thermal isolation structures (e.g., undercut regions and trenches) for thermally isolating a heat-generating device (e.g., a heater) from other components. PIC wafer 2720 may further include scattered light mitigation structures formed by metal layers and through oxide vias to, for example, isolate the single photon detectors from stray light or ambient light or isolate the grating couplers that may cause a large portion of the stray light. PIC wafer 2720 may include bonding pads 2728 formed on the top surface of PIC wafer 2720.

Figure 27C:
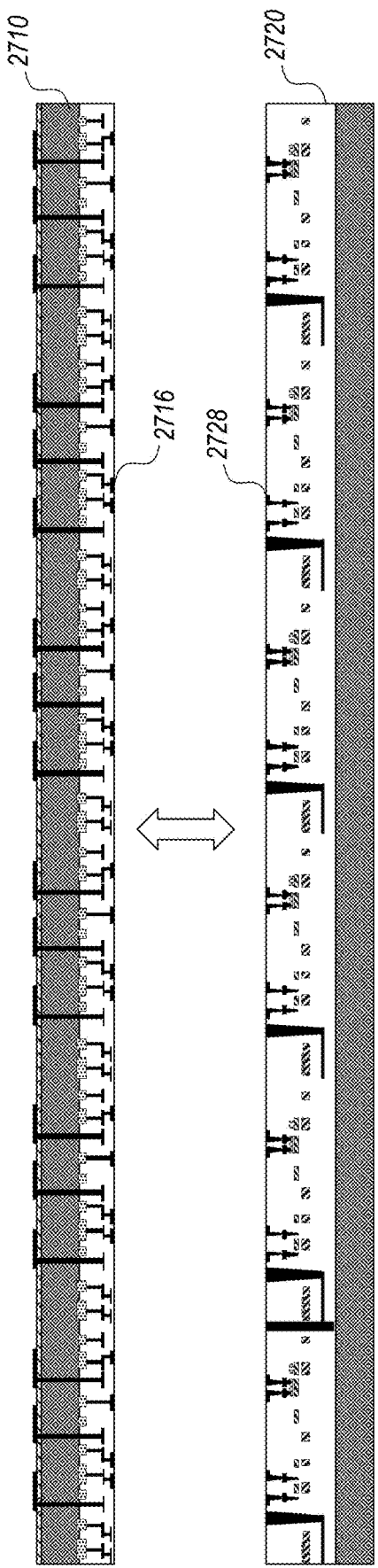
Figure 27D:
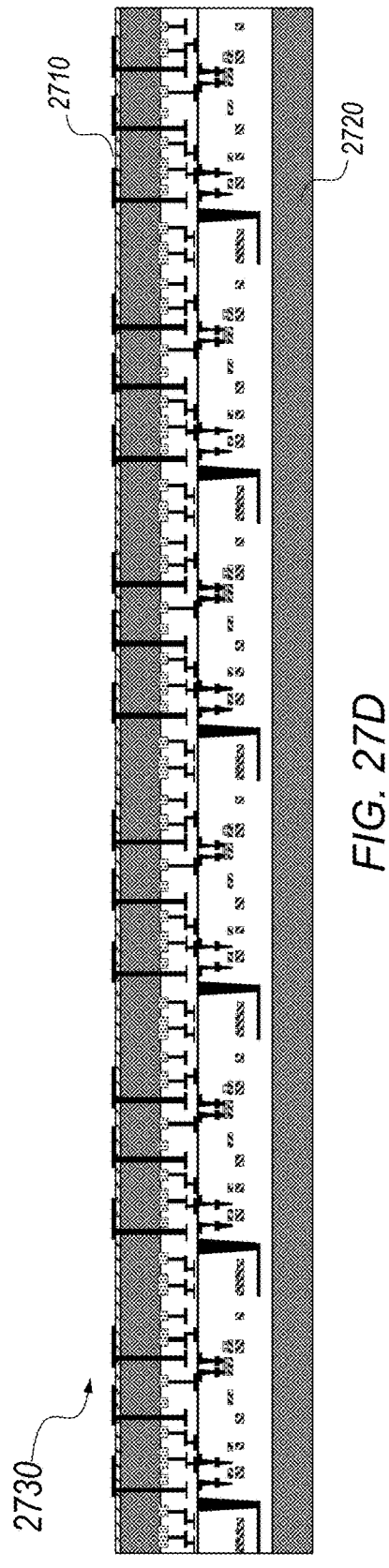

FIG. 27C shows wafer-to-wafer bonding of EIC wafer 2710 and PIC wafer 2720. EIC wafer 2710 and PIC wafer 2720 may be aligned to align bonding pads 2716 on EIC wafer 2710 with bonding pads 2728 on PIC wafer 2720, and may then be bonded by wafer-to-wafer fusion or hybrid bonding as described above with respect to, for example, FIG. 2 or FIG. 26. FIG. 27D shows a bonded wafer stack 2730 that includes EIC wafer 2710 and PIC wafer 2720 bonded face-to-face, where bonding pads 2716 on EIC wafer 2710 may be bonded to bonding pads 2728 on PIC wafer 2720, and the dielectric layers at the interface between EIC wafer 2710 and PIC wafer 2720 may also be bonded together.

Figure 27E:
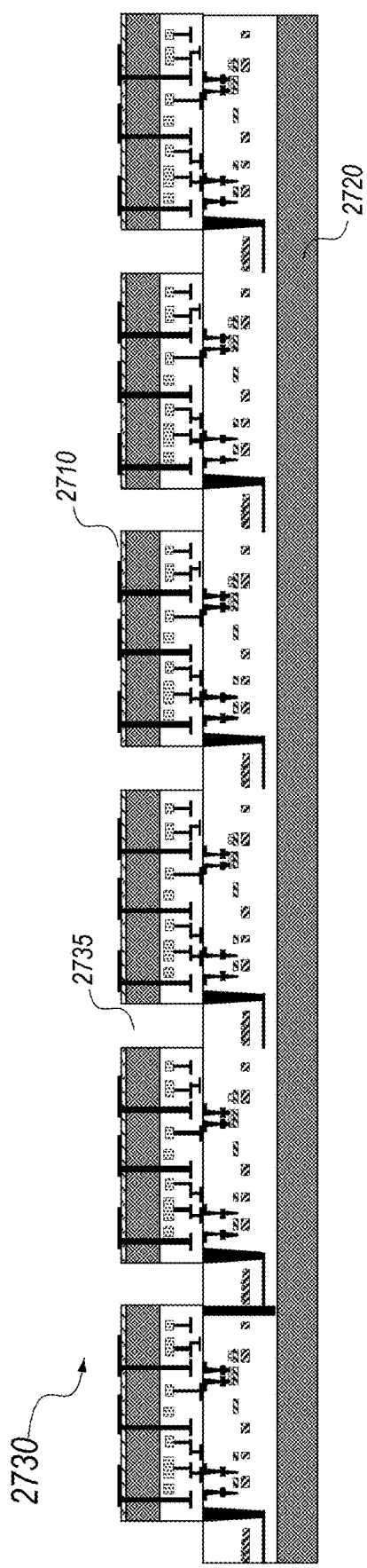

FIG. 27E shows that wafer stack 2730 may be etched, drilled, or otherwise cut to form optical ports (e.g., trenches 2735) for accessing grating couplers in PIC wafer 2720. Trenches 2735 may be formed in EIC wafer 2710 only or in both EIC wafer 2710 and a portion of PIC wafer 2720. The optical ports for accessing the grating couplers in PIC wafer 2720 may allow the testing of photonic integrated circuits 2726 in PIC wafer 2720. Electrical circuits 2714 in EIC wafer 2710 may also be tested. Regions of wafer stack 2730 with defects in the electrical integrated circuits and/or the photonic integrated circuits may be marked or otherwise identified, and may not be used in the subsequent processes.

Figure 27F:
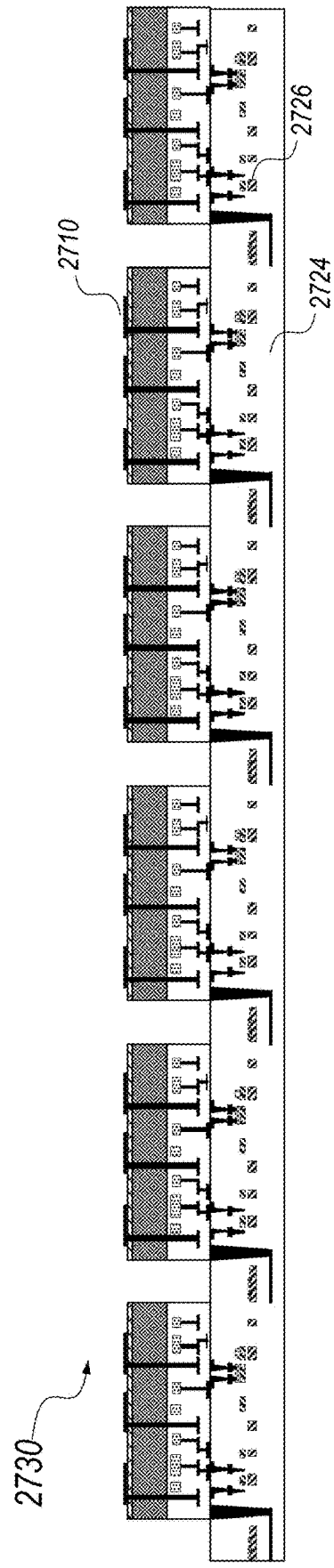

FIG. 27F shows that substrate 2722 in PIC wafer 2720 may be removed by, for example, back lapping or back grinding. Thus, wafer stack 2730 may include EIC wafer 2710 and dielectric layer 2724 with photonic integrated circuits 2726 therein.

Figure 27G:
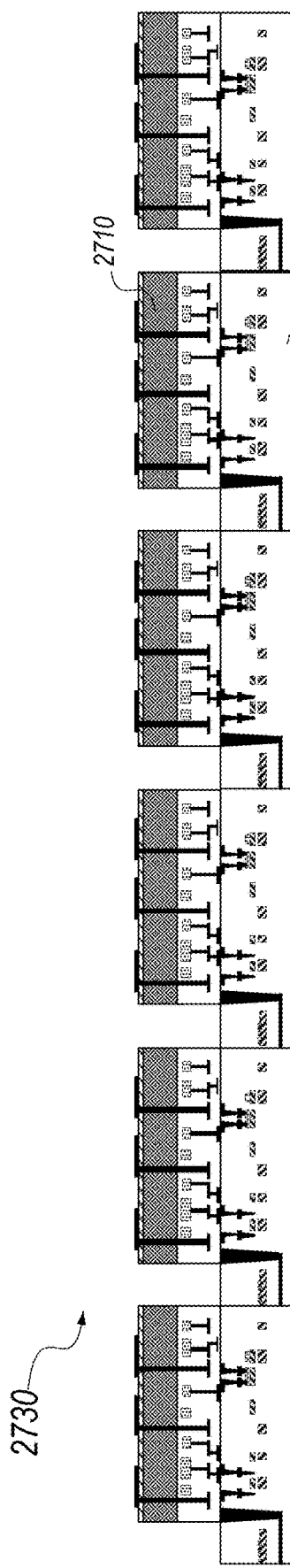
Figure 27H:
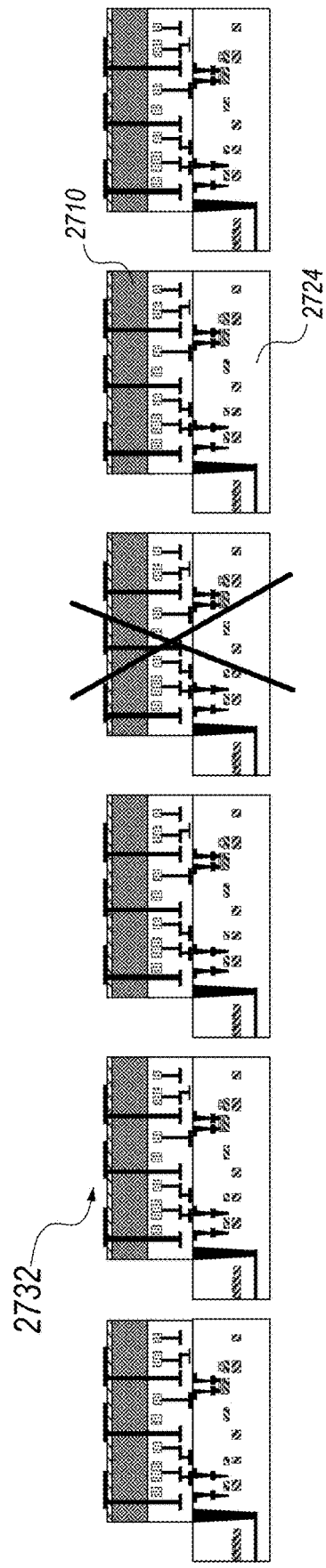

FIG. 27G and FIG. 27H show that wafer stacks 2730 may be cut by, for example, laser or plasma scribing or grinding, to separate EPIC die stacks 2732 that each include a PIC die and an EIC die. As shown in FIG. 27H, one or more EPIC die stacks 2732 that may include defects in the electrical integrated circuits and/or the photonic integrated circuits may be discarded.

FIG. 27I shows the bonding of known good EPIC die stacks 2732 to an optical backplane 2740 (e.g., an optical interposer). Optical backplane 2740 may include a dielectric layer 2744 (e.g., including one or more $SiO_2$ layers) formed on a substrate 2742 (e.g., a silicon wafer). Two or more waveguide layers, such as waveguides 2748 and low-loss waveguides 2746, may be formed in dielectric layer 2744. The two or more waveguide layers may include, for example, SiN waveguide layers having different thicknesses. The waveguides in optical backplane 2740 may include waveguide couplers (e.g., adiabatic and/or evanescent waveguide couplers) that can couple light or photons from one waveguide to another waveguide, or from one waveguide layer to another waveguide layer. Optical backplane 2740 may also include low-loss couplers for coupling light between the waveguides in optical backplane 2740 and optical fibers as described above. Optical backplane 2740 may further include, for example, one or more delay lines characterized by time delays between about 10 ps and about 50 ns, waveguide couplers (e.g., adiabatic and/or evanescent waveguide couplers) configured to couple light between optical backplane 2740 and PIC dies, one or more dispersion compensators, one or more polarization splitters, one or more polarization rotators, light isolation structures, or thermal isolation structures. Optical backplane 2740 may transmit, delay, or store single photons, qubits, qudits, entangled states of qubits, or logical qubits. The bonding of EPIC die stacks 2732 to optical backplane 2740 may be performed through an active alignment and oxide bonding (e.g., fusion bonding) process described above.

FIG. 27J shows multiple EPIC die stacks 2732 bonded to optical backplane 2740. EPIC die stacks 2732 may be spaced apart on optical backplane 2740 to leave spaces for bonding electrical backplanes (e.g., PCBs). EPIC die stacks 2732 may be optically coupled to optical backplane 2740 through waveguide couplers such that photons may be coupled from optical backplane 2740 to EPIC die stacks 2732, from EPIC die stacks 2732 to optical backplane 2740, or from one EPIC die stack 2732 to another EPIC die stack 2732 (e.g., through optical backplane 2740).

Figure 27K:
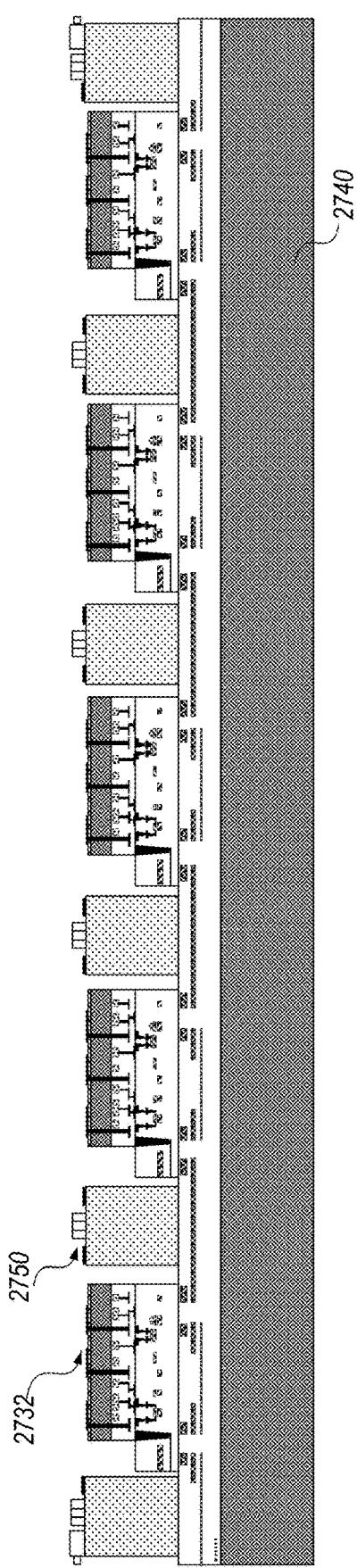

FIG. 27K shows that electrical backplanes 2750 (e.g., PCBs) are bonded to optical backplane 2740 in spaces between EPIC die stacks 2732. As described above, the method for bonding electrical backplanes 2750 to optical backplane 2740 may depend on the material of the PCBs. For example, if oxides (e.g., silicon dioxide) are used for the PCBs, a fusion bonding technique may be used. If other materials are used for the PCBs, an epoxy or an adhesive may be used to bond the PCBs to optical backplane 2740.

Figure 27L:
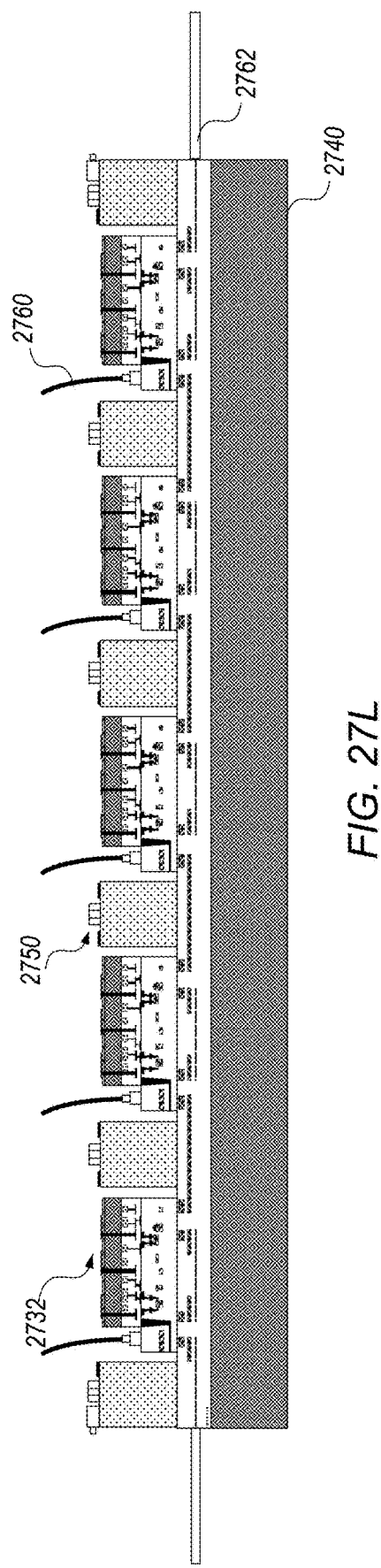

FIG. 27L shows that optical fibers are attached to the EPIC die stacks through, for example, active alignment. For example, an optical fiber 2760 may be coupled to a grating coupler in photonic integrated circuits 2726 in each EPIC die stack 2732 through the optical port (e.g., trench 2735) formed in the EIC die and/or a portion of dielectric layer 2724. Optical fibers 2760 may be used to, for example, provide pump laser pulses to EPIC die stacks 2732 or transmit communication data between EPIC die stacks 2732 and a control unit (e.g., control unit 2530). The grating couplers may couple light from optical fibers 2760 into waveguides in photonic integrated circuits 2726. One or more optical fibers 2762 may be coupled to the waveguides in optical backplane 2740 through low-loss couplers as described above. The other ends of optical fibers 2762 may be coupled to, for example, another optical backplane or another low-loss coupler in optical backplane 2740. Some optical fibers 2762 may have desired lengths to provide desired time delays, for example, for time-like fusion operations described below.

FIG. 27M shows that EPIC die stacks 2732 may be bonded to electrical backplanes 2750 through bonding wires 2770 to receive electrical power and control signals from electrical backplanes 2750. FIG. 27N shows that heat sinks 2782 and an electrical interposer 2780 are bonded to EPIC die stacks 2732 and electrical backplanes 2750. For example, heat sinks 2782 may be bonded to the EIC die of each EPIC die stack 2732 to conduct heat and cool down EPIC die stack 2732. Electrical interposer 2780 may be electrically connected to electrical backplanes 2750 by metal interconnects 2784.

As described above, the PIC dies or PIC wafers disclosed herein may include various photonic integrated circuits. The photonic integrated circuits may be arranged in various configurations and formed in various layer stack-ups. Similarly, the optical backplanes disclosed herein may also include various passive optical devices (e.g., waveguides, delay lines, couplers, dispersion compensation circuits, and polarization splitters or rotators) arranged in various configurations and in different layer stack-ups.

FIG. 28A illustrates an example of a PIC die 2800 in an EPIC die stack according to certain embodiments. PIC die 2800 may include a dielectric material layer 2810 (e.g., a SiO$_2$ layer) that may be formed in multiple process steps. Photonic integrated circuits may be fabricated during these process steps. For example, a first SiN layer may be deposited on a first dielectric layer and may be patterned by, for example, an etch step. A second dielectric layer may then be deposited on the patterned first SiN layer to form a first SiN waveguide layer, where the first and second dielectric layers may be the cladding layers for the first SiN waveguide layer. A second SiN layer may be deposited on the second dielectric layer and may then be patterned. A third dielectric layer may be deposited on the patterned second SiN layer to form a second SiN waveguide layer, where the second and third dielectric layers may be the cladding layers for the second SiN waveguide layer. Other photonic integrated circuits may also be formed in similar additive fabrication processes that may include material deposition and patterning (e.g., etching), followed by additional deposition and/or patterning.

In the example illustrated in FIG. 28A, the photonic integrated circuits formed in dielectric material layer 2810 may include, for example, one or more waveguide layers 2820, a grating coupler 2830, a switch 2840 (e.g., a piezoelectric switch, such as a lead zirconate titanate (PZT) switch), a single photon detector 2850 (e.g., an SNSPD) that includes a contact region 2852, and the like. The waveguide layers may be used to form, for example, routing waveguides, delay lines, waveguide pairs for implementing and transporting qubits and resource states, micro-ring resonators for generating photon pairs, switches, couplers, beam splitters (or other mode couplers), fusion gates, and the like. Metal layers 2862 and metal vias 2860 may also be formed in dielectric material layer 2810 to make electrical connections with active photonic integrated circuits such as switches and single photon detectors. Bonding pads 2864 may be formed at the top surface of PIC die 2800. In some embodiments, metal vias 2860 or trenches may be formed in dielectric material layer 2810 to provide optical isolation for some photonic integrated circuits, such as grating coupler 2830 and/or single photon detector 2850.

FIG. 28B illustrates a portion of an example of an optical backplane 2805 according to certain embodiments. In the illustrated example, optical backplane 2805 may include a substrate 2870 (e.g., a silicon wafer) and dielectric layers 2880. Dielectric layers 2880 may include various passive photonic integrated circuits formed therein. The passive photonic integrated circuits may include, for example, a coupler 2822 for coupling light from an optical fiber into optical backplane 2805, a waveguide layer 2884 (e.g., a SiN layer) that may include low-loss delay lines, a PIC-to-delay line coupler 2886, a PIC-to-PIC coupler 2888, routing waveguides 2890, and the like. Coupler 2882 may include a low-loss coupler, such as a tapered structure or a subwavelength grating. The low-loss delay lines may be used to provide various delays, such as about 10-100 ps, about or greater than 1 ns, about 50 ns, or longer. In some embodiments, the low-loss delay lines in waveguide layer 2844 and routing waveguides 2890 may include pairs of waveguides for qubit interconnects. In some embodiments, optical backplane 2805 may also include devices for dispersion compensation, polarization splitter/rotator, and the like. In some embodiments, optical backplane 2805 may also include thermal isolation structures and/or scattering mitigation structures. In some embodiments, optical backplane 2805 may also include phase shifters or phase stabilization circuits to improve the stability of qubits or entangled states of qubits propagating in qubit optical interconnects.

Figure 29:
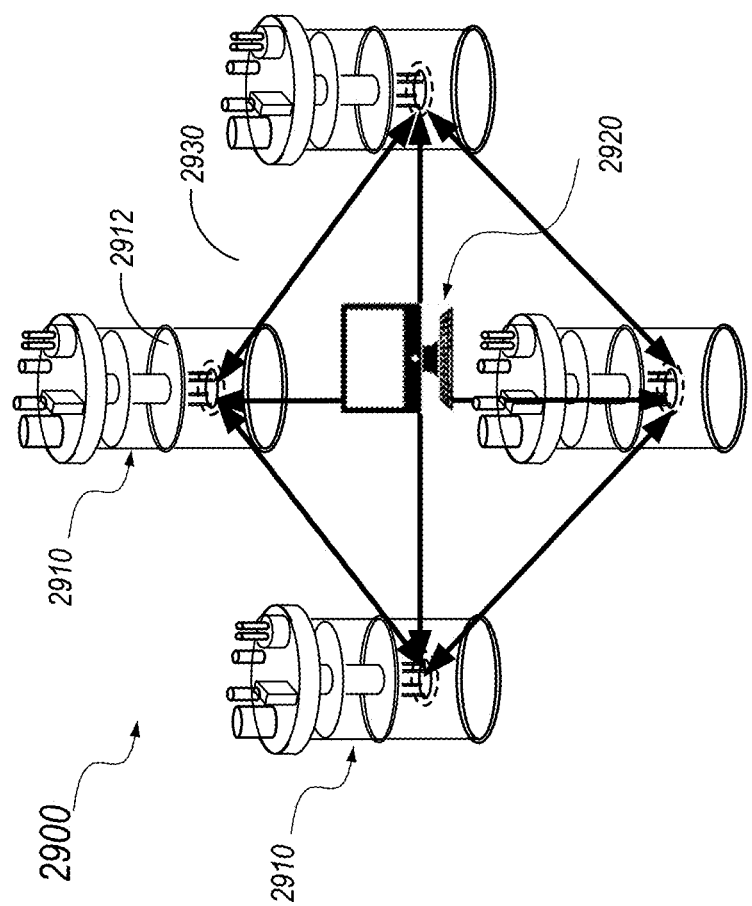
FIG. 29 illustrates an example of a system including multiple wafer-scale modules coupled together through qubit interconnects and controlled by a control unit according to certain embodiments.

FIG. 29 illustrates an example of a system 2900 including multiple wafer-scale modules 2912 (e.g., wafer-scale module 2110 or 2510 or wafer-scale module shown in FIG. 27N) coupled together through qubit interconnects 2930 and controlled by a control unit 2920 according to certain embodiments. System 2900 may be an example of a system for generating entangled states or error-corrected photonic logical qubits used in quantum computing or quantum communication, or may be an example of a quantum computing or quantum communication system. Wafer-scale modules 2912 may include, for example, one or more resource state generators, delay circuits, switch circuits, model couplers, fusion gates, photon detectors, and the like, as described above and below. Control unit 2920 may be a classical processing unit, such as a classical computer. Qubit interconnects 2930 between wafer-scale modules 2912 may be qubit interconnects implemented using, for example, optical fibers or free-space optical interconnects. The interconnect between control unit 2920 and each wafer-scale module 2912 may be a classical data communication channel that may include electrical cables or optical fibers for transmitting classical data signals, rather than qubits. At least some parts of wafer-scale modules 2912 may be in temperature-controlled chambers 2910 (e.g., a cryostat, a cryocooler, etc.). Temperature-controlled chambers 2910 may include different temperature chambers for different temperature ranges, such as cryogenic temperatures (e.g., about 4 K), low temperatures (e.g., about 50 K to about 100 K), and/or room temperatures. In some embodiments, more than one wafer-scale modules 2912 may be hosted by each temperature-controlled chamber 2910.

The wafer-scale modules described above may be used in an optical quantum computing system for generating, manipulating, and detecting qubits and entangled states of qubits. For example, each wafer-scale module described above may be used to generate one or more qubits, entangle the qubits to generate resource states, and/or perform resource state fusion operations. The wafer-scale modules may be used together to generate large entangled states of qubits or logical qubits, perform quantum computing using the logical qubits, detect the logical qubits, and the like.

Figure 30:
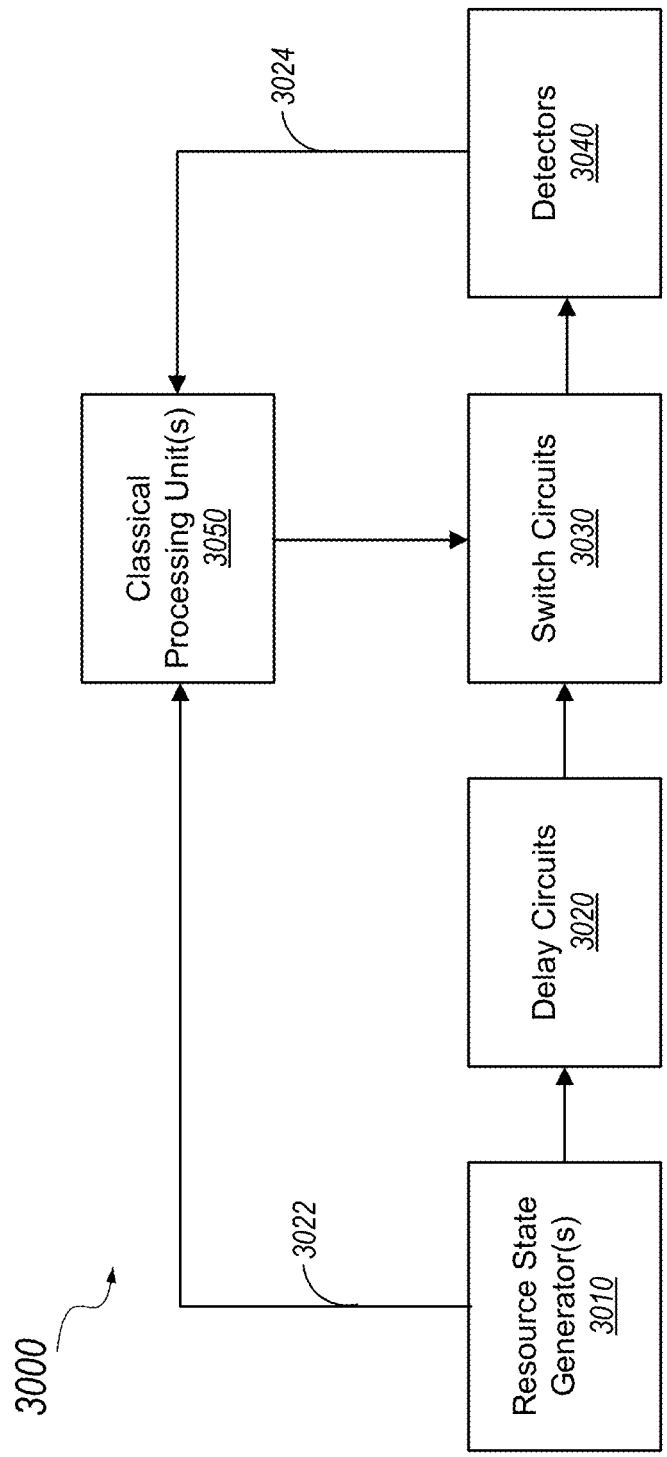
FIG. 30 includes a simplified block diagram of an example of a quantum computing system according to some embodiments.

FIG. 30 is a simplified block diagram of an example of a quantum computing system 3000 according to some embodiments. Quantum computing system 3000 may implement, for example, measurement-based quantum computing (MBQC) or fusion-based quantum computing (FBQC). Some embodiments of quantum computing system 3000 may use photonic physical qubits to generate a fault-tolerant cluster state that can be used to represent logical qubits for MBQC, while other embodiments of quantum computing system 3000 may generate measurement data reflecting entanglement structures for fault-tolerant FBQC. In the illustrated example, quantum computing system 3000 may include resource state generator(s) 3010, delay circuits 3020, switch circuits 3030, detectors 3040, and one or more classical processing units 3050.

Resource state generators 3010 may include one or more resource state generators (RSGs). The RSGs may autonomously operate, with no data input needed. Each RSG may generate one resource state per clock cycle (which can be, e.g., shorter than about 1 ns, about 1 ns, or longer than about 1 ns). Each resource state may include multiple (e.g., 7 or 9) entangled physical qubits. The resource state can be output to delay circuits 3020 at a rate of, for example, about n*N photons per clock cycle, where n is the number of qubits in each resource state and N is the number of RSGs. Resource state generators 3010 can also send classical data output (e.g., indicating success or failure of various elements of the resource state generation process) to classical processing unit 3050 via a data path 3022. In some embodiments, resource state generators 3010 can be maintained at cryogenic temperatures (e.g., 4 K). Delay circuit 3020 can include optical fibers, other waveguides, optical memory, or other components to delay or store photons corresponding to particular qubits by appropriate delay times, such as 1 clock cycle, L clock cycles, and $L^2$ clock cycles, where L may be any integer number. Delay circuits 3020 may not need to operate at cryogenic temperatures. Photons exiting delay circuits 3020 can be delivered to switch circuits 3030 via, for example, optical fibers, on-chip waveguides, or any other type of waveguides or optical interconnects.

Switch circuits 3030 may include active switches and waveguides to perform mode coupling, mode swapping, phase shift, and other operations on the qubits. In various embodiments, switch circuits 3030 may perform mode coupling operations associated with fusion operations as described below and/or basis selection operations associated with measurement of individual qubits. In some embodiments, switch circuits 3030 may be dynamically reconfigurable in response to control signals from classical processing units 3050, and thus quantum computing system 3000 may perform different computations by reconfiguring switches in switch circuits 3030. Switching circuits 3030 may deliver output photons to detectors 3040 via, for example, optical fibers, on-chip waveguides, or any other type of optical interconnects.

Detectors 3040 may include photon detectors capable of detecting single or multiple photons. Each photon detector may be coupled to one waveguide and may generate an output (classical) signal indicating whether a photon was detected. In some embodiments, some or all detectors 3040 may be capable of counting photons, and the output signal from each detector 3040 may indicate the number of photons detected by the detector 3040. In some embodiments, detectors 3040 may operate at cryogenic temperatures. Detectors 3040 may provide classical output signals indicating the number of photons, or binary signals indicating whether a photon was detected, to classical processing unit 3050 via a signal path 3024, such as optical fibers.

Classical processing unit 3050 may be a classical computer system that is capable of communicating with resource state generator(s) 3010, switch circuits 3030, and detectors 3040 using classical digital logic signals. In some embodiments, classical processing unit 3050 may determine appropriate settings for switch circuits 3030 based on a particular quantum computation (or program) to be executed. Classical processing unit 3050 may receive feedback signals (e.g., measurement outcomes) from resource state generators 3010 and detectors 3040 and can determine the result of the computation based on the feedback signals. In some embodiments, classical processing unit 3050 can use feedback signals to modify subsequent control signals sent to switch circuits 3030. Operation of classical processing unit 3050 may incorporate error correction algorithms and other techniques.

Quantum computing system 3000 of FIG. 30 is illustrative, and variations and modifications are possible. Blocks shown separately can be combined, or a single block can be implemented using multiple distinct components. Resource state generator(s) 3010, delay circuits 3020, switch circuits 3030, and detectors 3040 can implement the circuits descried above and below for generating entanglement structures. For instance, delay circuits 3020 may implement delay lines for resource state fusion, while switch circuits 3030 may implement reconfigurable switches and mode couplers associated with reconfigurable fusion, and detectors 3040 may implement destructive measurements associated with fusion operations. Quantum computing system 3000 is just one example of a quantum computing system or another photonic system that can use the wafer-scale modules described herein. Those skilled in the art will appreciate that many different systems can be implemented using the wafer-scale modules that each include PIC or EPIC dies bonded to and optically coupled to an optical backplane having low-loss waveguides.

Figure 31:
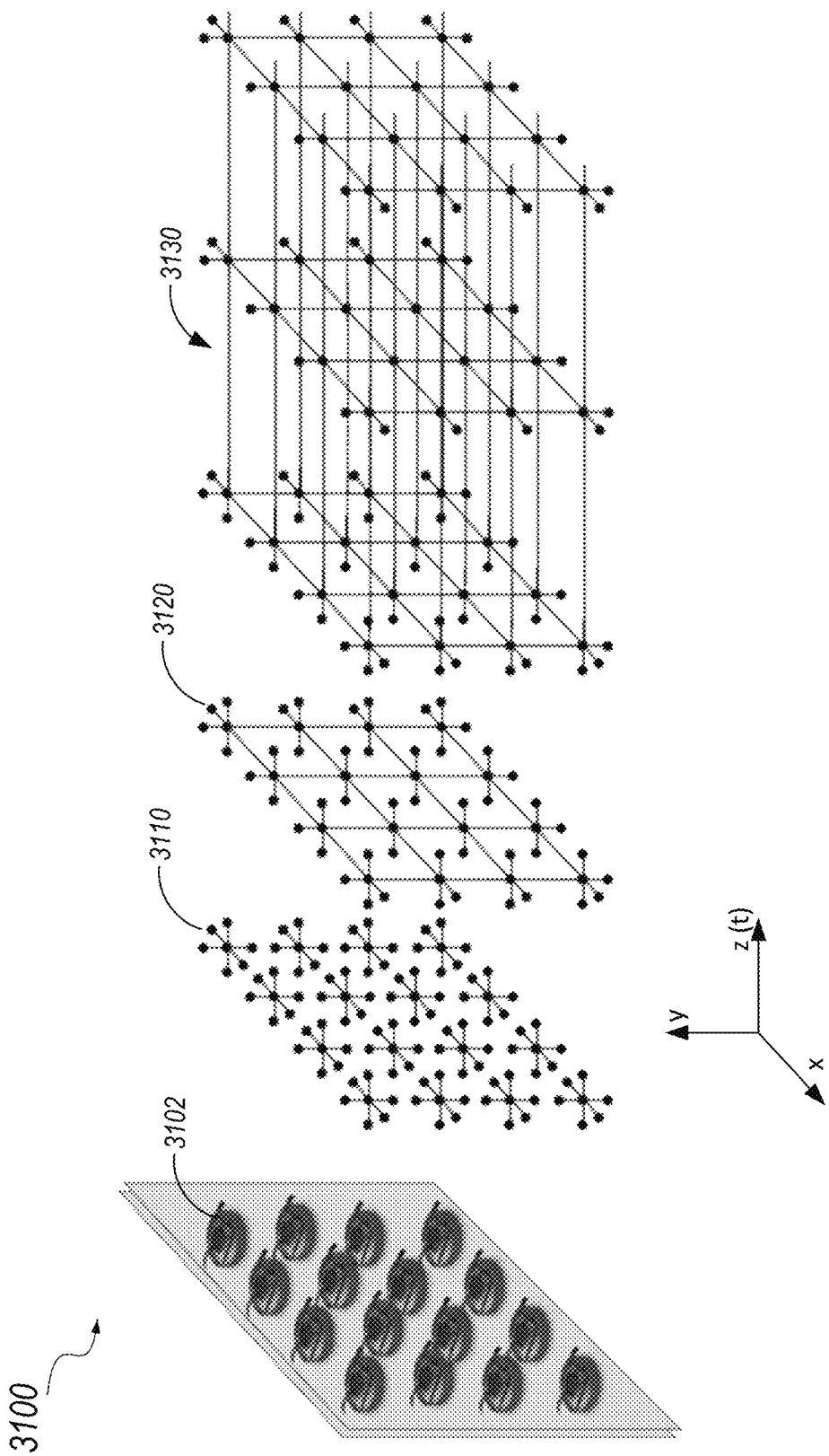
FIG. 31 illustrates an example of a system for generating a large entangled state according to some embodiments.

FIG. 31 illustrates an example of a system 3100 for generating large entangled states (e.g., error-corrected photonic logical qubits) according to some embodiments. System 3100 may be an example of an MBQC system. System 3100 may include, for example, at least a portion of resource state generators 3010, delay circuits 3020, switch circuits 3030, and detectors 3040 described above. System 3100 may include a plurality of RSGs 3102. In some embodiments, each RSG 3102 may be implemented using a wafer-scale module described above. Each RSG 3102 may generate one resource state 3110 in each clock cycle as described above with respect to FIG. 30. In the illustrated example, each resource state 3110 may include seven entangled physical qubits. Resource states 3110 generated by RSGs 3102 in one clock cycle may form a large entangled structure 3120 by space-like fusion operations in the x and y directions. Entangled structures 3120 formed in adjacent clock cycles may form a logical qubit 3130 by time-like fusion operations in the z direction (e.g., in the time domain). More detail of the space-like fusion operations and the time-like fusion operations is described below.

Figure 32A:
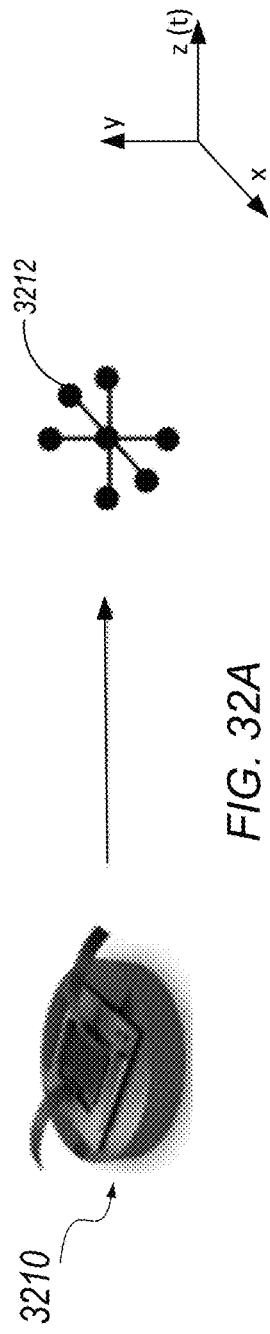
FIG. 32A illustrates an example of a resource state generated by a resource state generator according to some embodiments.

FIG. 32A illustrates an example of a resource state 3212 generated by a resource state generator 3210 according to some embodiments. In some embodiments, resource state generator 3210 may be implemented using a wafer-scale module described above. Resource state generator 3210 may include single photon sources and photonic integrated circuits for entangling the single photons. As described above, the single photon sources may each include, for instance, a resonator-based photon source that emits photon pairs, also referred to as a heralded single photon source. In one example, the photon source is driven by a pump (e.g., a laser light pulse) that is coupled into a system of optical resonators that may, through a nonlinear optical process (e.g., SFWM, SPDC, second harmonic generation, or the like), generate a pair of photons. One photon of the pair of photons may be detected by a single photon detector (e.g., an SNSPD). The detection of the photon may herald the existence of the other photon in the pair, which may then be used to generate entangled resource state. A qubit may be encoded by a single photon in a pair of modes (e.g., a dual-rail encoding), where each mode is a spatiotemporal mode that can be occupied by the photon and corresponds to the presence of a photon in a waveguide of a pair of waveguides. A photon source can be operated to emit a single photon into the waveguide to which it is coupled, thereby preparing a photonic qubit in a known state. By providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

RSG 3210 may also include mode couplers (e.g., 50:50 beam splitters or beam splitter networks) that may take a photon in any one of the input modes and delocalize the photon among each of the output modes such that the photon has equal probability of being detected in any one of the output modes. A waveguide beam splitter can be realized by bringing two waveguides into close proximity such that the evanescent field of one waveguide can couple into the other. By adjusting the separation between the two waveguides and/or the length of the coupling region, different couplings between modes can be obtained. In this manner, a waveguide beam splitter can be configured to have a desired transmissivity. For example, the beam splitter can be engineered to have a transmissivity equal to 0.5 (i.e., a 50/50 beam splitter). If other transfer matrices are desired, the reflectivity (or the transmissivity) can be engineered to be greater than 0.6, greater than 0.7, greater than 0.8, or greater than 0.9, without departing from the scope of the present disclosure. In some embodiments, entangled states of multiple photonic qubits may be created by coupling modes of two or more qubits and performing measurements on other modes. In some embodiments, cluster states of multiple entangled qubits may be formed through, for example, an entangling measurement, which is a projective measurement that can be employed to create entanglement between systems of qubits.

In the example shown in FIG. 32A, resource state 3212 may include seven entangled physical qubits, where each physical qubit may be represented by a dot and may be implemented by a pair of waveguides into which a photon may be introduced. The entanglement between physical qubits is represented by lines connecting pairs of dots. In the illustrated examples, the entanglement geometry may define a three-dimensional space, and labels x, y, and z are used to designate the different dimensions in this entanglement space. It should be understood that these dimensions need not correspond to physical dimensions and that, in some implementations, qubits may be separated in time rather than in spatial dimensions. For example, each physical qubit can be implemented using photons propagating in waveguides, and a particular section of waveguide may host photons associated with different qubits at different times.

Figure 32B:
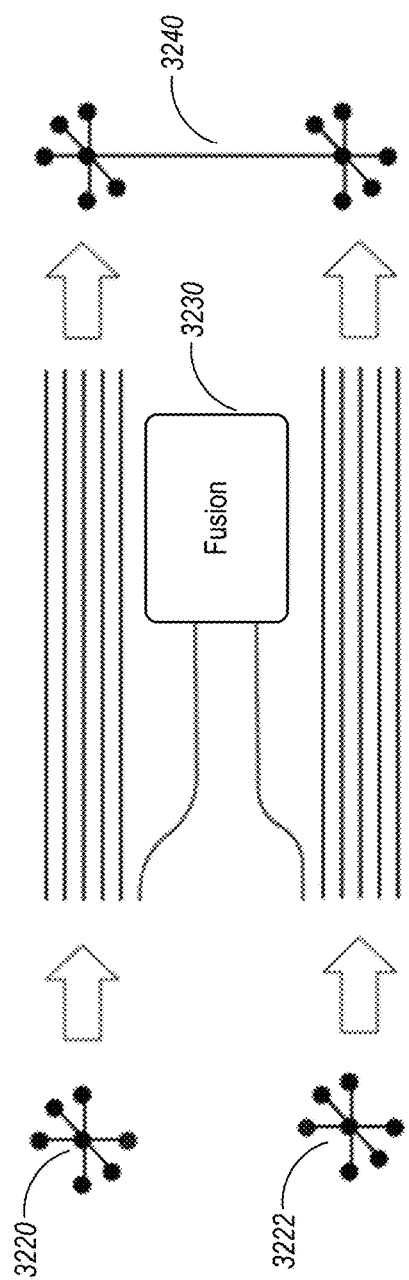
FIG. 32B illustrates an example of a space-like resource state fusion operation according to some embodiments.

FIG. 32B illustrates an example of a space-like resource state fusion operation according to some embodiments. FIG. 32B shows that a physical qubit from each of two resource states 3220 and 3222 arranged in the y direction may be passed to a fusion gate 3230. As described above, a fusion gate is a structure that receives two input qubits, each of which may be part of an entangled state. The fusion gate may perform a projective measurement operation on the input qubits that produces either one ("type I fusion") or zero ("type II fusion") output qubits in a manner such that the initial two entangled states are fused into a single entangled state. Fusion gates are specific examples of a general class of two-qubit entangling measurements and may be particularly suitable for photonic architectures. In the illustrated example, fusion gate 3230 may be a type II fusion gate, where no output qubit may be generated from the two input qubits. Thus, the resultant entangled structure 3240 may include 12 physical qubits.

Figure 32C:
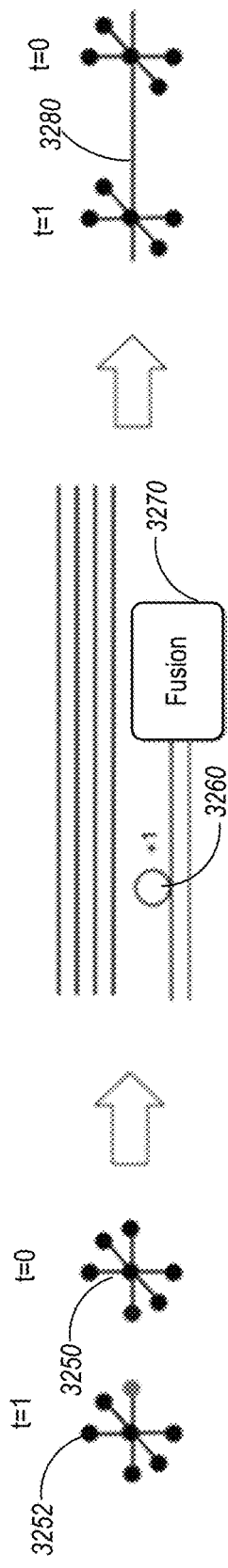
FIG. 32C illustrates an example of a time-like resource state fusion operation according to some embodiments.

FIG. 32C illustrates an example of a time-like resource state fusion operation according to some embodiments. FIG. 32C shows two resource states 3250 and 3252 generated in consecutive clock cycles. A physical qubit from resource state 3250 that is generated at a first clock cycle (t=0) may be delayed for a clock cycle by a delay line 3260, and may then be sent to a fusion gate 3270. A physical qubit in resource state 3252 that is generated at the next clock cycle (t=1) may also be passed to fusion gate 3270 to generate an entangled structure 3280. In the illustrated example, fusion gate 3270 may be a type II fusion gate, where no output qubit may be generated from the two input qubits.

FIG. 33A illustrates a block diagram of an example of a network 3300 for generating entanglement structures from resource states according to some embodiments. Network 3300 may be part of an example of an FBQC system. Network 3300 may include a plurality of network cells 3302 communicating with and controlled by a classical processing unit 3340. In some embodiments, each network cell 3302 may be implemented using a wafer-scale module described above. FIG. 33A shows the coupling among neighboring network cells 3302 in network 3300 through fusion devices 3320, 3322, and 3324. Each network cell 3302 may include an RSG 3310 that may produce a resource state that includes multiple entangled qubits in each clock cycle as described above with respect to FIGS. 31 and 32A. For example, each resource state generated in a clock cycle may include six peripheral qubits (qubits 1-6) that may be subject to fusion operations, and optionally one or more central qubits that may not be subject to fusion operations. Each network cell 3302 may also include a fusion device 3320 for resource state fusion in the x direction, a fusion device 3322 for resource state fusion in the y-direction, and a fusion device 3324 for resource state fusion in the time domain.

In the illustrated example, each network cell 3302 may provide two peripheral qubits, such as qubits 2 and 5, to fusion devices 3320 for fusion with peripheral qubits generated in the same clock cycle by neighboring network cells in the x direction as described above with respect to FIG. 32B. RSG 3302 may also provide two peripheral qubits, such as qubits 3 and 6, to fusion devices 3322 for fusion with peripheral qubits generated in the same clock cycle by neighboring network cells in the y direction as described above with respect to FIG. 32B. Therefore, resource states generated by network cells 3302 in a same clock cycle may be fused by space-like fusion operations to form a large entangled state, such as entangled structure 3120. In addition, each network cell 3302 may fuse two peripheral qubits, such as qubits 1 and 4 with qubits generated by the same RSG 3310 in different clock cycles as described above with respect to FIG. 32C. For example, a qubit 1 generated by an RSG 3310 in a clock cycle may be delayed for a clock cycle by a delay line 3330 and may then be fused with a qubit 4 generated by the same RSG 3310 in the next clock cycle. In this way, resource states generated by network cells 3302 in multiple clock cycles may be fused by time-like fusion operations to form a large entangled state, such as logical qubit 3130.

FIG. 33B illustrates an example of a fusion device 3320 according to certain embodiments. Fusion devices 3322 and 3324 may have similar structures as fusion device 3320. Fusion device 3320 may have multiple settings that can be selected to reconfigure fusion device 3320 to implement different logical features. In the illustrated example, fusion device 3320 may include a switch 3326 and two or more fusion gates 3328 for implementing two or more different logical features. Each fusion gate 3328 may include, for example, one or more mode couplers (e.g., 50/50 beam splitters) as described above.

FIG. 34A illustrates a schematic of an example of a circuit 3400 for generating entanglement structures from resource states using a single resource state generator 3410 and time-like fusion operations according to certain embodiments. Circuit 3400 may be used to implement, for example, an MBQC system. In some embodiments, circuit 3400 may be implemented using a wafer-scale module described above. RSG 3410 may produce a resource state having six peripheral qubits (e.g., qubits 1-6) that are subject to fusion operations and optionally one or more central qubits that may not be subject to fusion operations in each clock cycle. A reconfigurable fusion circuit 3420 may delay a qubit (e.g., qubit 5) of each resource state generated by RSG 3410 by one clock cycle, and then fuse the delayed qubit with a qubit (e.g., qubit 2) of a resource state generated by RSG 3410 in the next clock cycle. A reconfigurable fusion circuit 3430 may delay a qubit (e.g., qubit 3) of each resource state generated by RSG 3410 by L clock cycles, and then fuse the delayed qubit with a qubit (e.g., qubit 6) of a resource state generated by RSG 3410 after L clock cycles. Reconfigurable fusion circuit 3440 may delay a qubit (e.g., qubit 1) of each resource state generated by RSG 3410 by $L^2$ clock cycles, and then fuse the delayed qubit with a qubit (e.g., qubit 4) of a resource state generated by RSG 3410 after $L^2$ clock cycles. The switching circuits within reconfigurable fusion circuits 3420-3440 may be controlled to provide desired behavior at the boundaries of the entangled structure. For instance, in order to form a layer having a planar topology, qubit 5 of the resource state generated at the Lth clock cycle may not be delayed and fused with qubit 2 of the resource state generated at the L+1th clock cycle.

Circuit 3400 may be used to generate layers of any size. In some embodiments, the maximum size may be determined based on the length of delay lines. A layer of size $L^2$ may be generated in $L^2$ clock cycles by circuit 3400. It should also be noted that, since many photons can coexist in a delay line, as few as three physical delay lines (e.g., three optical fibers or other waveguides of lengths corresponding to delays of 1, L, and $L^2$ clock cycles) may be used in circuit 3400. More generally, the number of physical delay lines used for a given implementation can depend on the particular structure of the resource state and dimensions of the layer. Accordingly, the hardware implementation using circuit 3400 can be significantly smaller than network 3300 describe above. But it may take a longer time to generate and operate on a given number of resource states using circuit 3400.

FIG. 34B illustrates a simplified example of generating a large entangled state of qubits using circuit 3400 according to certain embodiments. FIG. 34B shows a conceptual illustration of generation of a layer of an entanglement structure. In the illustrated examples, the layer size may be $L^2=16$ (L=4), but in practice $L^2$ can be much larger (e.g., about $10^2$, about $10^4$, or about $10^6$). RSG 3410 may generate a single resource state 3412 in each clock cycle, and may generate $L^2$ resource states 3412 in $L^2$ clock cycles for generating a layer of an entanglement structure by circuit 3400 using time-like fusion operations. A three-dimensional entanglement structure can be generated using circuit 3400 by repeating the process of generating $L^2$ resource states and the time-like fusion operations for each layer.

Figure 35:
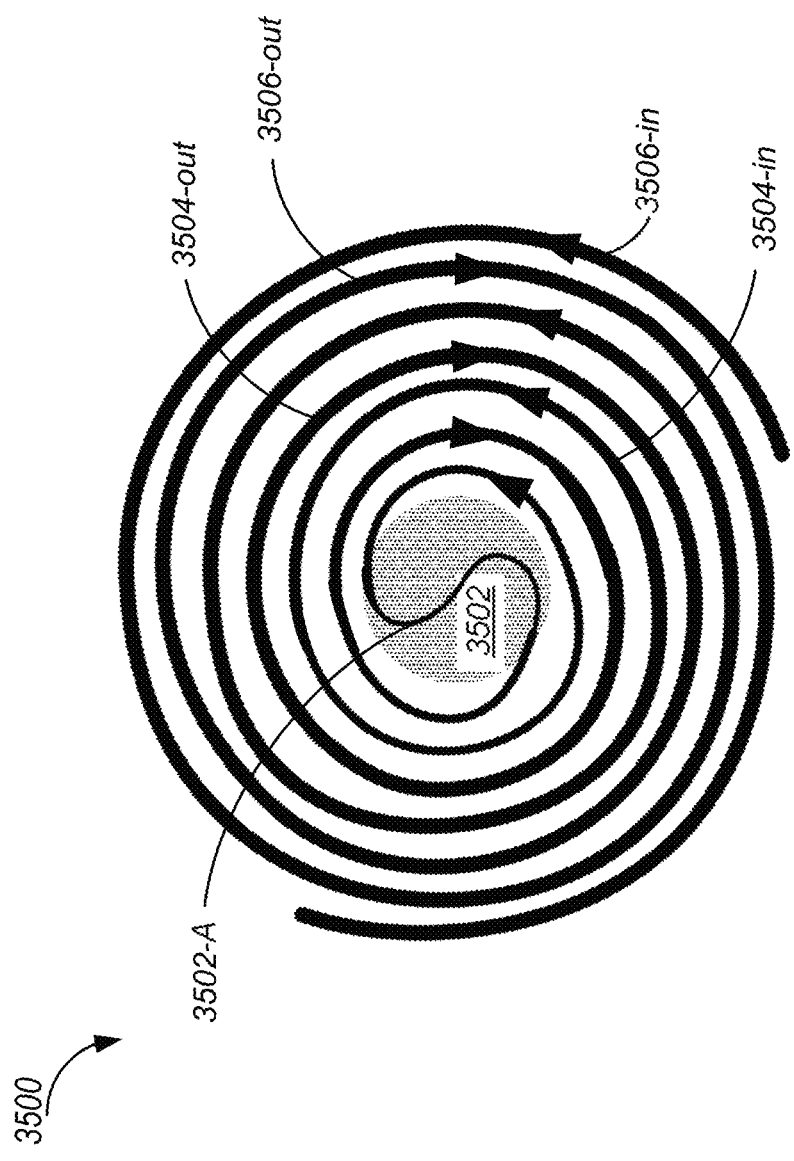
FIG. 35 is a simplified diagram illustrating a spiral optical delay device and an optical path of light propagating in the optical delay device in accordance with some embodiments.

FIG. 35 is a simplified diagram illustrating a spiral optical delay device 3500 and an optical path of light propagating in the optical delay device in accordance with some embodiments. This spiraling delay line is provided as merely one example, and other winding and/or meander delay geometries are possible without departing from the scope of the present disclosure. As shown, optical delay device 3500 includes a first multi-mode waveguide 3506-in providing a first portion of the optical path that spirals inward toward a center region 3502 of optical delay device 3500. First multi-mode waveguide 3506-in is coupled (e.g., physically, optically) to a first coupler 3504-in, which provides a second portion of the optical path that spirals further inward toward center region 3502 of optical delay device 3500. Optical delay device 3500 further includes a first single-mode waveguide 3502-A disposed (e.g., located) in center region 3502 and providing a third portion of the optical path through the center region. Optical delay device 3500 also includes a second coupler 3504-out providing a fourth portion of the optical path that spirals outward from center region 3502. Second coupler 3504-out is coupled (e.g., physically, optically) to a second multi-mode waveguide 3506-out, which provides a fifth portion of the optical path that spirals further outward from center region 3502. First single-mode waveguide 3502-A has a first end and a second end that is opposite to the first end. The first end of first single-mode waveguide 3502-A is coupled (e.g., physically, optically) to first coupler 3504-in and the second end of first single-mode waveguide 3502-A is coupled (e.g., physically, optically) to second coupler 3504-out. Lines with upward pointing arrows correspond to waveguides that spiral inward towards center region 3502 (e.g., first multi-mode waveguide 3506-in and first coupler 3504-in) and lines with downward pointing arrows correspond to waveguides that spiral outwards from center region 3502 (e.g., second multi-mode waveguide 3506-out and second coupler 3504-out).

First single-mode waveguide 3502-A is configured to allow propagation of light in a fundamental optical mode (e.g., $TE_0$). For example, first single-mode waveguide may have a width of one micrometer or less. Typically, propagation of light in higher order modes (e.g., optical modes that are not the fundamental optical mode, such as $TE_1$, $TE_2$, etc.) is prohibited in single-mode waveguides. In contrast, multi-mode waveguide 3506-in or 3506-out is configured to allow light to propagate, along the multi-mode waveguide, in one or more of a plurality of modes including the fundamental optical mode and higher order modes (e.g., light in a higher order mode as well as light in the fundamental optical mode can propagate through the multi-mode waveguide). For example, multi-mode waveguide 3506-in or 3506-out may have a width that is greater than one micrometer. In general, for propagation of light having a particular wavelength, a single-mode waveguide has a smaller width compared to a multi-mode waveguide.

First multi-mode waveguide 3506-in is configured to receive light, and to propagate the light along an inward spiral toward first coupler 3504-in. First coupler 3504-in is configured to receive the light from the first multi-mode waveguide, and to adiabatically couple the light to first single-mode waveguide 3502-A, which is configured to transmit the light toward second coupler 3504-out while changing the propagation direction of the light. Second coupler is configured to receive the light from first single-mode waveguide and to adiabatically couple the light to second multi-mode waveguide 3506-out, which is configured to propagate the light along an outward spiral to an output of optical delay device 3500. Arrows shown along the waveguides of optical delay device 3500 indicate the optical path (e.g., propagation direction, travel direction) of light in optical delay device 3500.

Figure 36:
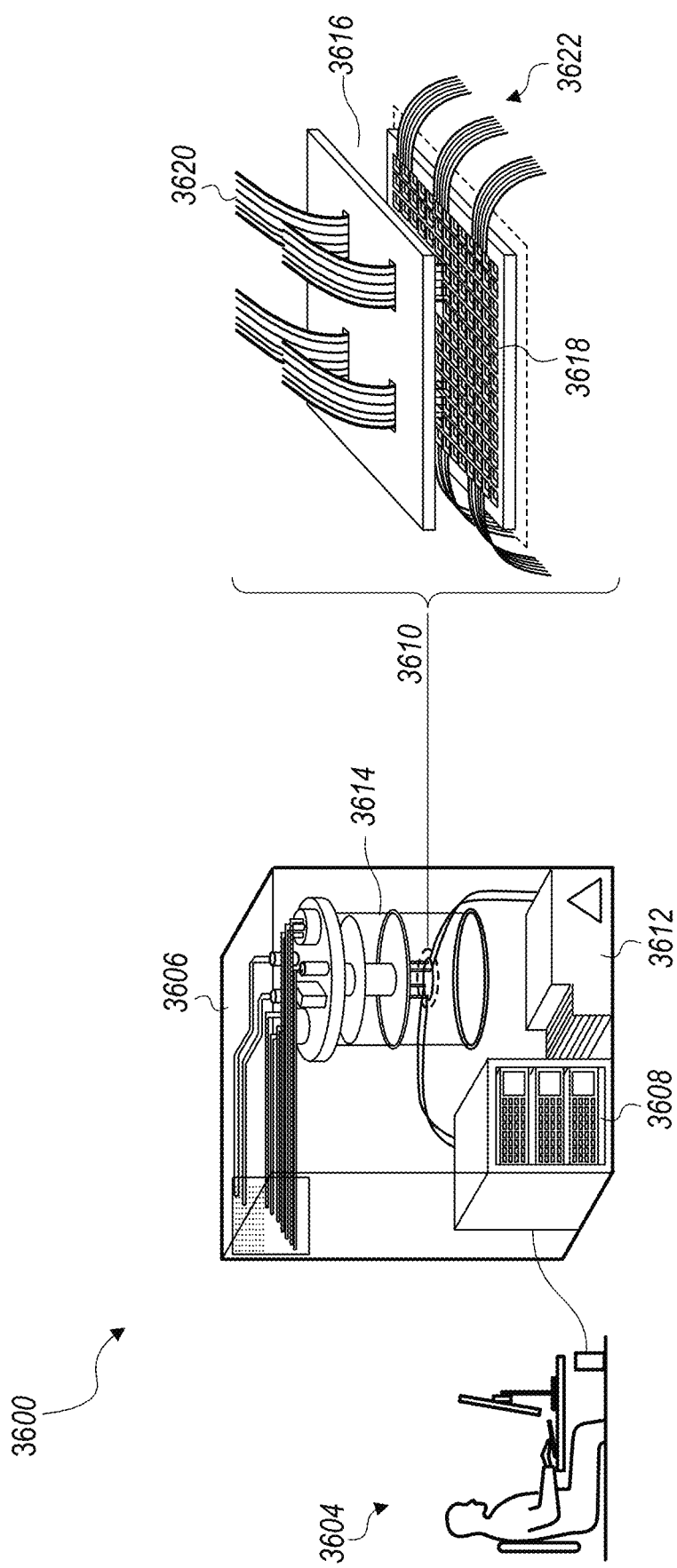
FIG. 36 is a simplified system block diagram of an example of a hybrid quantum computing system according to certain embodiments.

FIG. 36 is a simplified system block diagram of an example of a hybrid QC system 3600 including electro-optic devices (e.g., switches) according to certain embodiments. In order to operate at low temperatures, for example liquid helium temperatures, embodiments of the present disclosure integrate the electro-optic switches discussed herein into a system that includes cooling systems. Thus, embodiments of the present disclosure provide a hybrid computing system, for example, as illustrated in FIG. 36. The hybrid quantum computing (QC) system 3600 includes a user interface device 3604 that is communicatively coupled to a hybrid quantum computing subsystem 3606. The user interface device 3604 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 3604 provides an interface with which a user can interact with the hybrid QC subsystem 3606. For example, the user interface device 3604 may run software, such as a text editor, an interactive development environment (IDE), command prompt, graphical user interface, and the like so that the user can program, or otherwise interact with, the QC subsystem to run one or more quantum algorithms. In other embodiments, the hybrid QC subsystem 3606 may be pre-programmed and the user interface device 3604 may simply be an interface where a user can initiate a quantum computation, monitor the progress, and receive results from the hybrid QC subsystem 3606. Hybrid QC subsystem 3606 further includes a classical computing system 3608 coupled to one or more quantum computing chips 3610. In some examples, the classical computing system 3608 and the quantum computing chip 3610 can be coupled to other electronic components 3612, e.g., pulsed pump lasers, microwave oscillators, power supplies, networking hardware, etc.

In some embodiments that utilize cryogenic operation, the quantum computing system 3609 can be housed within a cryostat, e.g., cryostat 3614. In some embodiments, the quantum computing chip 3610 can include one or more constituent chips, e.g., hybrid electronic chip 3616 and integrated photonics chip 3618, which may include various waveguide structures and/or EO devices disclosed herein. Signals can be routed on- and off-chip any number of ways, e.g., via optical interconnects 3620 and via other electronic interconnects 3622. In addition, the hybrid quantum computing system 3600 may employ a quantum computing process, e.g., measurement-based quantum computing (MBQC) that employs one or more cluster states of qubits.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A device comprising:
   an optical backplane including at least one optical waveguide layer; and
   a plurality of die stacks on the optical backplane, each die stack of the plurality of die stacks comprising:
      a photonic integrated circuit (PIC) die including a photonic integrated circuit optically coupled to the at least one optical waveguide layer of the optical backplane; and
      an electronic integrated circuit (EIC) die bonded to the PIC die and including an electronic integrated circuit for controlling operations of the photonic integrated circuit of the PIC die,
   wherein the at least one optical waveguide layer includes waveguides optically coupled to at least two die stacks of the plurality of die stacks and configured to transport, between the at least two die stacks of the plurality of die stacks, a photonic quantum system that includes a photon in one of two or more quantum modes.

2. The device of claim 1, wherein the photonic quantum system comprises at least one of a single photon, a qubit, a qudit, an entangled state of qubits, or a logical qubit.

3. The device of claim 1, wherein the photonic integrated circuit includes a single photon source configured to generate the photon.

4. The device of claim 1, wherein the at least one optical waveguide layer includes at least one of a pair of waveguides or a waveguide configured to transport photons in two or more quantum modes.

5. The device of claim 1, wherein the at least one optical waveguide layer includes:
   a first waveguide layer including a delay line; and
   a second waveguide layer including a routing waveguide optically coupled to the at least two die stacks of the plurality of die stacks.

6. The device of claim 5, wherein the delay line is characterized by a time delay between 10 ps and 50 ns.

7. The device of claim 5, wherein the delay line is characterized by a loss between 0.03 dB/m and 2 dB/m.

8. The device of claim 1, further comprising an optical fiber, wherein both ends of the optical fiber are coupled to the optical backplane.

9. The device of claim 1, further comprising an optical fiber optically coupled to the PIC die of a die stack of the plurality of die stacks, wherein the PIC die includes a grating coupler configured to couple light from the optical fiber to at least one of a data communication photodetector or a single photon generator in the PIC die.

10. The device of claim 1, wherein the at least one optical waveguide layer includes a waveguide coupler configured to couple light from a first optical waveguide layer of the at least one optical waveguide layer to a second optical waveguide layer of the at least one optical waveguide layer.

11. The device of claim 1, wherein the optical backplane includes a waveguide coupler configured to couple light between the at least one optical waveguide layer and the PIC die in a die stack of the at least two die stacks.

12. The device of claim 11, wherein the waveguide coupler is configured to couple, between the at least one optical waveguide layer and the PIC die in a die stack of the at least two die stacks, the photonic quantum system that has the photon in one of two or more quantum modes.

13. The device of claim 1, wherein:
the optical backplane includes an optical port configured to couple light from free space or an optical fiber into the at least one optical waveguide layer; and
the optical port includes at least one of a grating coupler, an edge coupler, or a tapered structure.

14. The device of claim 1, wherein the optical backplane includes at least one of a dispersion compensator, a polarization splitter, a polarization rotator, a light isolation structure, or a thermal isolation structure.

15. The device of claim 1, wherein the PIC die includes at least one of a routing waveguide, a beam splitter, a grating coupler, a waveguide coupler, a filter, a delay line, a fusion gate, a polarization splitter, a polarization rotator, a switch, a single photon detector, a dispersion compensator, a photodetector for data communication, a heater, or a temperature sensor.

16. A system comprising:
a plurality of wafer-scale modules, each wafer-scale module of the plurality of wafer-scale modules comprising:
a substrate;
an optical backplane on the substrate and including a dielectric layer and at least one optical waveguide layer embedded in the dielectric layer; and
one or more die stacks bonded to the optical backplane, each die stack of the one or more die stacks comprising:
a photonic integrated circuit (PIC) die optically coupled to the at least one optical waveguide layer of the optical backplane; and
an electronic integrated circuit (EIC) die bonded to the PIC die and including an electronic integrated circuit for controlling operations of the PIC die; and
a plurality of optical fibers, each optical fiber of the plurality of optical fibers optically coupled to the optical backplanes of two wafer-scale modules of the plurality of wafer-scale modules.

17. The system of claim 16, further comprising an optical fiber delay line, wherein both ends of the optical fiber delay line are connected to the optical backplane of a wafer-scale module of the plurality of wafer-scale modules.

18. The system of claim 16, wherein the at least one optical waveguide layer includes waveguides configured to transmit at least one of single photons, qubits, qudits, entangled states of qubits, or logical qubits.

19. The system of claim 16, wherein:
the one or more die stacks include at least two die stacks; and
the at least one optical waveguide layer of the optical backplane optically connects the at least two die stacks.

20. The system of claim 16, wherein the at least one optical waveguide layer of the optical backplane includes at least one of:
one or more SiN waveguide layers;
two optical waveguide layers characterized by different respective layer thicknesses;
at least one delay line characterized by a time delay between 10 ps and 50 ns;
a first waveguide coupler configured to couple light from a first optical waveguide layer of the at least one optical waveguide layer to a second optical waveguide layer of the at least one optical waveguide layer;
a coupler configured to couple light between an optical fiber of the plurality of optical fibers and the at least one optical waveguide layer;
a second waveguide coupler configured to couple light between the at least one optical waveguide layer and a PIC die of the one or more die stacks;
a dispersion compensation circuit;
a polarization splitter;
a polarization rotator;
a light isolation structure; or
a thermal isolation structure.

\* \* \* \* \*